United States Patent
Goel et al.

(10) Patent No.: US 10,965,586 B2
(45) Date of Patent: Mar. 30, 2021

(54) RESILIENT NETWORK COMMUNICATION USING SELECTIVE MULTIPATH PACKET FLOW SPRAYING

(71) Applicant: Fungible, Inc., Santa Clara, CA (US)

(72) Inventors: Deepak Goel, San Jose, CA (US); Pradeep Sindhu, Los Altos Hills, CA (US); Ayaskant Pani, Fremont, CA (US); Srihari Raju Vegesna, San Jose, CA (US); Narendra Jayawant Gathoo, San Jose, CA (US); John David Huber, San Diego, CA (US); Rohit Sunkam Ramanujam, Sunnyvale, CA (US); Saurin Patel, San Jose, CA (US)

(73) Assignee: Fungible, Inc., Santa Clara, CA (US)

( * ) Notice: Subject to any disclaimer, the term of this patent is extended or adjusted under 35 U.S.C. 154(b) by 111 days.

(21) Appl. No.: 16/147,134

(22) Filed: Sep. 28, 2018

(65) Prior Publication Data

US 2019/0104057 A1    Apr. 4, 2019

Related U.S. Application Data

(60) Provisional application No. 62/638,725, filed on Mar. 5, 2018, provisional application No. 62/566,060, filed on Sep. 29, 2017.

(51) Int. Cl.
*H04L 12/26* (2006.01)
*H04L 12/707* (2013.01)
(Continued)

(52) U.S. Cl.
CPC .......... *H04L 45/22* (2013.01); *H04L 43/0817* (2013.01); *H04L 45/028* (2013.01);
(Continued)

(58) Field of Classification Search
CPC ... H04L 45/22; H04L 43/0817; H04L 45/028; H04L 45/16; H04L 45/24; H04L 47/122; H04L 47/26; H04L 69/26
See application file for complete search history.

(56) References Cited

U.S. PATENT DOCUMENTS

| | | | |
|---|---|---|---|
| 4,872,157 A | 10/1989 | Hemmady et al. |
| 4,872,159 A | 10/1989 | Hemmady et al. |
| (Continued) | | | |

FOREIGN PATENT DOCUMENTS

| | | |
|---|---|---|
| EP | 1079571 A2 | 2/2001 |
| EP | 1489796 A2 | 12/2004 |
| (Continued) | | |

OTHER PUBLICATIONS

"QFX10000 Switches System Architecture," White Paper, Juniper Networks, Apr. 2015, 15 pp.
(Continued)

*Primary Examiner* — Kibrom T Hailu
*Assistant Examiner* — Bailor C. Hsu
(74) *Attorney, Agent, or Firm* — Shumaker & Sieffert, P.A.

(57) ABSTRACT

Techniques for detecting path failures and reducing packet loss as a result of such failures are described for use within a data center or other environment. For example, a source and/or destination access node may create and/or maintain information about health and/or connectivity for a plurality of ports or paths between the source and destination device and core switches. The source access node may spray packets over a number of paths between the source access node and the destination access node. The source access node may use the information about connectivity for the paths between the source or destination access nodes and the core switches to limit the paths over which packets are
(Continued)

sprayed. The source access node may spray packets over paths between the source access node and the destination access node that are identified as healthy, while avoiding paths that have been identified as failed.

20 Claims, 20 Drawing Sheets

(51) Int. Cl.
 H04L 12/759 (2013.01)
 H04L 12/761 (2013.01)
 H04L 29/06 (2006.01)
 H04L 12/825 (2013.01)
 H04L 12/803 (2013.01)
(52) U.S. Cl.
 CPC .............. H04L 45/16 (2013.01); H04L 45/24 (2013.01); H04L 47/122 (2013.01); H04L 47/26 (2013.01); H04L 69/26 (2013.01)

(56) References Cited

U.S. PATENT DOCUMENTS

| | | | |
|---|---|---|---|
| 5,812,549 A | 9/1998 | Sethu | |
| 6,990,063 B1* | 1/2006 | Lenoski | H04Q 3/68 370/218 |
| 7,058,009 B1* | 6/2006 | Skirmont | H04L 45/00 370/217 |
| 7,102,999 B1* | 9/2006 | Sindhu | H04L 49/3072 370/235 |
| 7,289,436 B2* | 10/2007 | Schaller | H04L 41/0631 370/225 |
| 7,289,513 B1* | 10/2007 | Medved | H04L 45/22 370/244 |
| 7,342,887 B1* | 3/2008 | Sindhu | H04L 49/3072 370/235 |
| 7,623,524 B2* | 11/2009 | Muthukrishnan | H04L 47/24 370/395.41 |
| 7,633,861 B2* | 12/2009 | Willhite | H04L 12/5601 370/229 |
| 7,664,110 B1 | 2/2010 | Lovett et al. | |
| 7,733,781 B2* | 6/2010 | Petersen | H04L 12/66 370/230 |
| 7,843,907 B1 | 11/2010 | Abou-Emara et al. | |
| 7,965,624 B2* | 6/2011 | Ripa | G06F 8/34 370/217 |
| 8,599,863 B2 | 12/2013 | Davis | |
| 8,625,427 B1 | 1/2014 | Terry et al. | |
| 8,689,049 B2* | 4/2014 | Ziegler | H04L 69/40 714/15 |
| 8,737,410 B2 | 5/2014 | Davis et al. | |
| 8,798,077 B2* | 8/2014 | Mehra | H04L 45/24 370/400 |
| 8,918,631 B1 | 12/2014 | Kumar et al. | |
| 9,154,376 B2 | 10/2015 | Aziz et al. | |
| 9,262,225 B2 | 2/2016 | Davis et al. | |
| 9,282,384 B1 | 3/2016 | Graves | |
| 9,294,304 B2 | 3/2016 | Sindhu | |
| 9,294,398 B2 | 3/2016 | DeCusatis et al. | |
| 9,369,408 B1* | 6/2016 | Raghavan | H04L 49/557 |
| 9,405,550 B2 | 8/2016 | Biran et al. | |
| 9,800,495 B2 | 10/2017 | Lu et al. | |
| 9,853,901 B2 | 12/2017 | Kampmann et al. | |
| 9,866,427 B2* | 1/2018 | Yadav | H04L 49/1523 |
| 9,876,735 B2 | 1/2018 | Davis et al. | |
| 10,003,552 B2* | 6/2018 | Kumar | H04L 49/15 |
| 10,135,731 B2 | 11/2018 | Davis et al. | |
| 10,140,245 B2 | 11/2018 | Davis et al. | |
| 10,304,154 B2 | 5/2019 | Appu et al. | |
| 2002/0015387 A1 | 2/2002 | Houh | |
| 2002/0049859 A1 | 4/2002 | Bruckert et al. | |
| 2002/0075862 A1* | 6/2002 | Mayes | H04Q 11/0478 370/360 |
| 2002/0094151 A1 | 7/2002 | Li et al. | |
| 2002/0118415 A1 | 8/2002 | Dasylva et al. | |
| 2002/0126634 A1 | 9/2002 | Mansharamani et al. | |
| 2002/0126671 A1 | 9/2002 | Ellis et al. | |
| 2003/0091271 A1 | 5/2003 | Dragone | |
| 2003/0229839 A1 | 12/2003 | Wang et al. | |
| 2004/0236912 A1 | 11/2004 | Glasco | |
| 2006/0029323 A1 | 2/2006 | Nikonov et al. | |
| 2006/0277421 A1 | 12/2006 | Balestriere | |
| 2007/0073966 A1 | 3/2007 | Corbin | |
| 2007/0172235 A1 | 7/2007 | Snider et al. | |
| 2007/0192545 A1 | 8/2007 | Gara et al. | |
| 2007/0255906 A1 | 11/2007 | Handgen et al. | |
| 2008/0002702 A1 | 1/2008 | Bajic | |
| 2008/0138067 A1 | 6/2008 | Beshai | |
| 2009/0024836 A1 | 1/2009 | Shen et al. | |
| 2009/0135832 A1 | 5/2009 | Fan et al. | |
| 2009/0228890 A1 | 9/2009 | Vaitovirta et al. | |
| 2009/0303880 A1 | 12/2009 | Maltz et al. | |
| 2010/0061391 A1 | 3/2010 | Sindhu et al. | |
| 2011/0055827 A1 | 3/2011 | Lin et al. | |
| 2011/0170553 A1 | 7/2011 | Beecroft et al. | |
| 2011/0202658 A1 | 8/2011 | Okuno et al. | |
| 2011/0225594 A1 | 9/2011 | Iyengar et al. | |
| 2011/0228783 A1 | 9/2011 | Flynn et al. | |
| 2011/0289179 A1 | 11/2011 | Pekcan et al. | |
| 2011/0289180 A1 | 11/2011 | Sonnier et al. | |
| 2011/0289279 A1 | 11/2011 | Sonnier et al. | |
| 2012/0096211 A1 | 4/2012 | Davis et al. | |
| 2012/0207165 A1 | 8/2012 | Davis | |
| 2012/0254587 A1 | 10/2012 | Biran et al. | |
| 2013/0003725 A1 | 1/2013 | Hendel et al. | |
| 2013/0088971 A1 | 4/2013 | Anantharam et al. | |
| 2013/0145375 A1 | 6/2013 | Kang | |
| 2013/0191443 A1 | 7/2013 | Gan et al. | |
| 2013/0258912 A1 | 10/2013 | Zimmerman et al. | |
| 2013/0330076 A1 | 12/2013 | Liboiron-Ladouceur et al. | |
| 2014/0023080 A1 | 1/2014 | Zhang et al. | |
| 2014/0040909 A1 | 2/2014 | Winser et al. | |
| 2014/0059537 A1 | 2/2014 | Kamble et al. | |
| 2014/0161450 A1 | 6/2014 | Graves et al. | |
| 2014/0258479 A1 | 9/2014 | Tenginakai et al. | |
| 2014/0269351 A1 | 9/2014 | Graves et al. | |
| 2014/0359044 A1 | 12/2014 | Davis et al. | |
| 2015/0019702 A1 | 1/2015 | Kancherla | |
| 2015/0037032 A1 | 2/2015 | Xu et al. | |
| 2015/0117860 A1 | 4/2015 | Braun | |
| 2015/0143073 A1 | 5/2015 | Winser et al. | |
| 2015/0163171 A1 | 6/2015 | Sindhu et al. | |
| 2015/0180603 A1 | 6/2015 | Darling et al. | |
| 2015/0186313 A1 | 7/2015 | Sodhi et al. | |
| 2015/0222533 A1 | 8/2015 | Birrittella et al. | |
| 2015/0244617 A1 | 8/2015 | Nakil et al. | |
| 2015/0256405 A1 | 9/2015 | Janardhanan et al. | |
| 2015/0278148 A1 | 10/2015 | Sindhu | |
| 2015/0278984 A1 | 10/2015 | Koker et al. | |
| 2015/0280939 A1 | 10/2015 | Sindhu | |
| 2015/0281128 A1 | 10/2015 | Sindhu | |
| 2015/0324205 A1 | 11/2015 | Eisen et al. | |
| 2015/0334034 A1 | 11/2015 | Smedley et al. | |
| 2015/0334202 A1 | 11/2015 | Frydman et al. | |
| 2015/0381528 A9 | 12/2015 | Davis et al. | |
| 2016/0056911 A1 | 2/2016 | Ye et al. | |
| 2016/0164625 A1 | 6/2016 | Gronvall et al. | |
| 2016/0239415 A1 | 8/2016 | Davis et al. | |
| 2016/0241430 A1 | 8/2016 | Yadav et al. | |
| 2016/0337723 A1 | 11/2016 | Graves | |
| 2016/0380885 A1 | 12/2016 | Jani et al. | |
| 2017/0031719 A1 | 2/2017 | Clark et al. | |
| 2017/0032011 A1 | 2/2017 | Song et al. | |
| 2017/0061566 A1 | 3/2017 | Min et al. | |
| 2017/0068639 A1 | 3/2017 | Davis et al. | |
| 2017/0265220 A1* | 9/2017 | Andreoli-Fang | H04W 72/1268 |
| 2017/0346766 A1 | 11/2017 | Dutta | |
| 2018/0024771 A1 | 1/2018 | Miller et al. | |
| 2018/0115494 A1 | 4/2018 | Bhatia et al. | |
| 2018/0152317 A1 | 5/2018 | Chang et al. | |
| 2018/0239702 A1 | 8/2018 | Farmahini Farahani et al. | |

(56) References Cited

U.S. PATENT DOCUMENTS

| | | |
|---|---|---|
| 2018/0287818 A1 | 10/2018 | Goel et al. |
| 2018/0287965 A1 | 10/2018 | Sindhu et al. |
| 2018/0288505 A1 | 10/2018 | Sindhu et al. |
| 2018/0293168 A1 | 10/2018 | Noureddine et al. |
| 2018/0300928 A1 | 10/2018 | Koker et al. |
| 2018/0307494 A1 | 10/2018 | Ould-Ahmed-Vall et al. |
| 2018/0307535 A1 | 10/2018 | Suzuki et al. |
| 2018/0322386 A1 | 11/2018 | Sridharan et al. |
| 2018/0357169 A1 | 12/2018 | Lai |
| 2019/0005176 A1 | 1/2019 | Illikkal et al. |
| 2019/0012278 A1 | 1/2019 | Sindhu et al. |
| 2019/0012350 A1 | 1/2019 | Sindhu et al. |
| 2019/0013965 A1 | 1/2019 | Sindhu et al. |
| 2019/0018806 A1 | 1/2019 | Koufaty et al. |
| 2019/0042292 A1 | 2/2019 | Palermo et al. |
| 2019/0042518 A1 | 2/2019 | Marolia et al. |
| 2019/0102311 A1 | 4/2019 | Gupta et al. |
| 2019/0104057 A1 | 4/2019 | Goel et al. |
| 2019/0104206 A1 | 4/2019 | Goel et al. |
| 2019/0104207 A1 | 4/2019 | Goel et al. |
| 2019/0158428 A1 | 5/2019 | Gray et al. |
| 2019/0188079 A1 | 6/2019 | Kohli |
| 2019/0243765 A1 | 8/2019 | Sindhu et al. |
| 2019/0363989 A1 | 11/2019 | Shalev et al. |

FOREIGN PATENT DOCUMENTS

| | | |
|---|---|---|
| EP | 1501246 A2 | 1/2005 |
| EP | 2289206 A2 | 3/2011 |
| EP | 2928134 A2 | 10/2015 |
| WO | 2009114554 A2 | 9/2009 |
| WO | 2013184846 A1 | 12/2013 |
| WO | 2016037262 A1 | 3/2016 |

OTHER PUBLICATIONS

Adya et al., "Cooperative Task Management without Manual Stack Management," Proceedigns of the 2002 Usenix Annual Technical Conference, Jun. 2002, 14 pp.
Bakkum et al., "Accelerating SQL Database Operations on a GPU with CUDA," Proceedings of the 3rd Workshop on Genral-Purpose Computation on Graphics Processing Units, Mar. 14, 2010, 10 pp.
Banga et al., "Better operating system features for faster network servers," ACM Sigmetrics Performance Evaluation Review, vol. 26, Issue 3, Dec. 1998, 11 pp.
Barroso et al., "Attack of the killer Microseconds," Communications of the ACM, vol. 60, No. 4, Apr. 2017, 7 pp.
Friedman et al., "Programming with Continuations," Technical Report 151, Nov. 1983, 14 pp.
Gay et al., "The nesC Language: A Holistic Approach to Networked Embedded Systems," accessed from http://nescc.sourceforge.net, last updated Dec. 14, 2004, 11 pp.
Halbwachs et al., "The Synchronous Data Flow Programming Language LUSTRE," Proceedings of the IEEE, vol. 79, No. 9, Sep. 1991, 16 pp.
Haynes et al., "Continuations and Coroutines," Technical Report No. 158, Jun. 1984, 19 pp.
Hewitt, "Viewing Control Structures as Patterns of Passing Messages," Massachusetts Institute of Technology, Artificial Intelligence Laboratory, Dec. 1976, 61 pp.
Hseush et al., Data Path Debugging: Data-Oriented Debugging for a Concurrent Programming Language, PADD 88 Proceedings of the 1988 ACM SIGPLAN and SIGOPS workshop on Parallel and distributed debugging, May 5-6, 1988, 12 pp.
Huang et al., "Erasure Coding in Windows Azure Storage," 2012 USENIX Annual Technical Conference, Jun. 13-15, 2012, 12 pp.
Isen et al., "ESKIMO—Energy Savings using Semantic Knowledge of Inconsequential Memory Occupancy for DRAM subsystem," 42nd Annual IEEE/ACM International Symposium on Microarchitecture (MICRO), Dec. 12-16, 2009, 10 pp.
Kahn et al., "Actors as a Special Case of Concurrent Constraint Programming," ECOOP/OOPSLA '90 Proceedings, Oct. 21-25, 1990, 10 pp.
Kaminow, "Optical Integrated Circuits: A Personal Perspective," Journal of Lightwave Technology, vol. 26, No. 9, May 1, 2008, pp. 994-1004.
Kelly et al., A Block Diagram Compiler, The Bell System Technical Journal, Dec. 7, 1960, 10 pp.
Kounavis et al., "Programming the data path in network processor-based routers," Software—Practice and Experience, Oct. 21, 2003, 38 pp.
Larus et al., "Using Cohort Scheduling to Enhance Server Performance," Usenix Annual Technical Conference, Jun. 2002, 12 pp.
Levis et al., "Tiny OS: An Operating System for Sensor Networks," Ambient Intelligence, Jan. 2005, 34 pp.
Lin et al., A Parameterized Dataflow Language Extension for Embedded Streaming Systems, 2008 International Conference on Embedded Computer Systems: Architectures, Modeling, and Simulation, Jul. 21-24, 2008, 8 pp.
Mishra et al., "Thread-based vs Event-based Implementation of a Group Communication Service," Proceedings of the First Merged International Parallel Processing Symposium and Symposium on Parallel and Distributed Processing, Mar. 30-Apr. 3, 1998, 5 pp.
Schroeder et al., "Flash Reliability in Production: The Expected and the Unexpected," 14th USENIX Conference on File and Storage Technologies (FAST '16), Feb. 22/25, 2016, 15 pp.
Varela et al., "The Salsa Programming Language 2.0.0alpha Release Tutorial," Tensselaer Polytechnic Institute, Nov. 2009, 52 pp.
Von Behren et al., "Why Events Are a Bad Idea (for high-concurrency servers)," Proceedings of HotOS IX, May 2003, 6 pp.
Welsh et al., "SEDA: An Architecture for Well-Conditioned, Scalable Internet Services," Eighteenth Symposium on Operating Systems Principles, Oct. 21-24, 2001, 14 pp.
Office Action from U.S. Appl. No. 16/147,070, dated Dec. 31, 2019, 17 pp.
Response to Second Written Opinion dated Sep. 3, 2019, from International Application No. PCT/US2018/053597, filed Oct. 31, 2019, 17 pp.
International Preliminary Report on Patentability from International Application No. PCT/US2018/053597, dated Dec. 18, 2019, 45 pp.
Alizadeh et al., "CONGA: Distributed Congestion-Aware Load Balancing for Datacenters," SIGCOMM '14 Proceedings of the 2014 ACM Conference on SIGCOMM, Aug. 17-22, 2014, pp. 503-514.
Al-Fares et al., "Hedera: Dynamic Flow Scheduling for Data Center Networks," NSDI'10 Proceedings of the 7th USENIX Conference on Networked Systems Design and Implementation, Apr. 28-30, 2010, 15 pp.
Ford et al., "TCP Extensions for Multipath Operation with Multiple Addresses," Internet Engineering Task Force (IETF), RFC 6824, Jan. 2013, 64 pp.
International Search Report and Written Opinion of International Application No. PCT/US2018/053597, dated Jan. 17, 2019, 18 pp.
Response to Written Opinion dated Jan. 17, 2019, from International Application No. PCT/US2018/053597, filed Jul. 29, 2019, 5 pp.
Benson et al., "Network Traffic Characteristics of Data Centers in the Wild," IMC '10 Proceedings of the 10th ACM SIGCOMM Conference on Internet Measurement, Nov. 1-30, 2010, pp. 267-280.
Raiciu et al., "Improving Datacenter Performance and Robustness with Multipath TCP," ACM SIGCOMM Computer Communication Review—SIGCOMM '11, vol. 41, No. 4, Aug. 2011, pp. 266-277.
Benson et al., "MicroTE: Fine Grained Traffic Engineering for Data Centers," CoNEXT '11 Proceedings of the Seventh Conference on emerging Networking EXperiments and Technologies Article No. 8, Dec. 6-9, 2011, 12 pp.
Kandula et al., "Dynamic Load Balancing Without Packet Reordering," SIGCOMM Computer Communication Review, vol. 37, No. 2, Apr. 2007, pp. 53-62.
Zhu et al., "Congestion Control for Large-Scale RDMA Deployments," SIGCOMM '15 Proceedings of the 2015 ACM—Conference on Special Interest Group on Data Communication, Aug. 17-21, 2015, pp. 523-536.

(56) References Cited

OTHER PUBLICATIONS

Kandula et al., "The Nature of Datacenter Traffic: Measurements & Analysis," IMC '09 Proceedings of the 9th ACM SIGCOMM conference on Internet measurement, Nov. 4-6, 2009, pp. 202-208.
Response to Office Action dated Dec. 31, 2019, from U.S. Appl. No. 16/147,070, filed Mar. 31, 2020, 15 pp.
Oh et al., "Feedback-Based Path Failure Detection and Buffer Blocking Protection for MPTCP," IEEE/ACM Transactions on Networking, vol. 24, No. 6, Dec. 2016, 12 pp.
Second Written Opinion of International Application No. PCT/US2018/053597, dated Sep. 3, 2019, 9 pp.
Communication pursuant to PCT Rule 66.6 dated Nov. 7, 2019, from International Application No. PCT/US2018/053597, 34 pp.
Response to Communication pursuant to PCT Rule 66.6 dated Nov. 7, 2019, from International Application No. PCT/US2018/053597, filed Nov. 12, 2019, 17 pp.
Final Office Action from U.S. Appl. No. 16/147,070 dated Jul. 21, 2020, 24 pp.
Response to Final Office Action dated Jul. 21, 2020, from U.S. Appl. No. 16/147,070, filed Sep. 18, 2020, 6 pp.
Advisory Action from U.S. Appl. No. 16/147,070 dated Oct. 21, 2020, 6 pp.
Pre-Appeal Brief Request for Review and Notice of Appeal for U.S. Appl. No. 16/147,070, filed Nov. 25, 2020, 7 pages.
Final Office Action from U.S. Appl. No. 16/147,070, dated Jan. 25, 2021, 22 pages.

\* cited by examiner

| Logical Rack | Device | Stream Number | GPH Index |
|---|---|---|---|
| 0 | A | 0 (spine link) | 0 |
| 0 | A | 1 (spine link) | 3 |
| 0 | A | 2 (intra-rack link) | 1,2 |
| 0 | B | 0 (spine link) | 1 |
| 0 | B | 1 (spine link) | 2 |
| 0 | B | 2 (intra-rack link) | 0,3 |
| 1 | A | 0 (spine link) | 0 |
| 1 | A | 1 (spine link) | 2 |
| 1 | A | 2 (intra-rack link) | 3,1 |
| 1 | B | 0 (spine link) | 3 |
| 1 | B | 1 (spine link) | 1 |
| 1 | B | 2 (intra-rack link) | 0,2 |

FIG. 16A

| Anded GPH Index | Represents | Mapped To |
|---|---|---|
| 0 | Spine 0 | Index [0] |
| 1 | Spine 1 | Index [2] |
| 2 | Spine 2 | Index [3] |
| 3 | Spine 3 | Index [1] |

FIG. 16B

RESILIENT NETWORK COMMUNICATION USING SELECTIVE MULTIPATH PACKET FLOW SPRAYING

This application claims the benefit of U.S. Provisional Appl. No. 62/566,060, filed Sep. 29, 2017, and U.S. Provisional Appl. No. 62/638,725, filed Mar. 5, 2018, the entire content of each of which is incorporated herein by reference.

TECHNICAL FIELD

The disclosure relates to computer networks and, more particularly, data center networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

As one example, in a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems.

In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy. A typical data center switch fabric includes multiple tiers of interconnected switches and routers. In current implementations, packets for a given packet flow between a source server and a destination server or storage system are typically forwarded from the source to the destination along a single path through the routers and switches comprising the switching fabric. In a large scale fabric, failure rates are often significant, even if single component failure rates are quite small. Recovery from failure may involve control plane software updating forwarding tables to address detected failures. However, updating forwarding tables can take a relatively long time.

SUMMARY

Techniques for detecting path failures (e.g., either link failures, node failures, or both) and reducing packet loss as a result of failures, faults or other events are described for use within a data center or other computing environment. As one example, a source network device creates and/or maintains information about health and/or connectivity for a plurality of ports or paths between the source device and at least a subset of core switches. Similarly, a destination network device creates and/or maintains information about health and/or connectivity for a plurality of ports or paths between the destination device and the same or a different subset of core switches. The source device may, pursuant to techniques described herein, spray packets over all available paths between the source device and the destination device when transferring data from the source device to the destination device. In some examples, however, the source device may use the information about connectivity for the paths between the source device and the core switches to limit the paths over which packets are sprayed. For instance, the source device may spray packets over paths between the source device and the core switches that are identified as healthy, while avoiding paths that have been identified as failed.

Further, the source device may receive, from the destination device, information about the health and/or connectivity of paths between the destination device and the core switches. The source device may use this information to further limit the paths over which packets are sprayed when transferring data from the source device to the destination device. For example, the source device may identify, based on the information from the destination device, additional failed paths not identified in the path health information maintained by the source device, and avoid spraying packets over those paths to the destination device.

The techniques described herein may provide certain technical advantages and solutions. For instance, for examples in which the source device and the destination device independently maintain information about connectivity to the core switches, information about failed paths can be used to limit the paths over which the source device sprays data packets, thereby providing resilience and/or fast recovery when path failures arise, without having to wait for the control plane to exchange updated topology information, e.g., routing information, and appropriately update forwarding tables to reflect the network topology change. As a result, although the failed path(s) might not get repaired immediately, the fabric remains working despite the failures, and packet loss is thereby reduced.

Further, in some examples, the information about connectivity can be used for diagnostic purposes, and may, for example, be used to determine whether forwarding tables are programmed correctly. As a result, errors in routing and/or forwarding tables may be detected and addressed more quickly. Still further, the information about connectivity can be used pursuant to an adaptive routing procedure, where, for example, congested routes are flagged by a destination device so that the source device knows to avoid using the congested route. As a result, more effective routing techniques may be employed.

In one example, this disclosure describes a network system comprising: a plurality of servers, including a source server and a destination server; a switch fabric comprising a plurality of core switches; and a plurality of access nodes configured to forward packets between the servers, wherein each of the access nodes is coupled to a subset of the servers and to a subset of the core switches, and wherein the plurality of access nodes includes a source access node coupled to the source server and a destination access node coupled to the destination server, wherein, when communicating a packet flow of packets between the source server and the destination server, the source access node is configured to spray the packets of the packet flow across a plurality of data paths to the destination access node, and wherein the destination access node is configured to: identify information about destination path failures between the destination access node and the core switches, receive a data transfer request message originating at the source access node, wherein the data transfer request message identifies an amount of data that the source access node has requested to transfer, and responsive to receiving the request message, send a data transfer grant message destined for the source access node, wherein the grant message includes the information about destination path failures.

In another example, this disclosure describes a method comprising: spraying, by a source access node coupled to a source server, packets of a packet flow across a plurality of data paths to a destination access node coupled to a destination server, wherein the source access node and the destination access node are each included within a plurality of access nodes configured to forward packets between the source server and the destination server, and wherein each of the plurality of access nodes is coupled to a subset of a plurality of core switches; identifying, by the destination access node, information about destination path failures between the destination access node a plurality of the core switches; receiving, by the destination access node, a data transfer request message originating at the source access node, wherein the data transfer request message identifies an amount of data that the source access node has requested to transfer; and responsive to receiving the request message, sending, by the destination access node, a data transfer grant message destined for the source access node, wherein the grant message includes the information about destination path failures.

In another example, this disclosure describes a system comprising: a source access node coupled to a source server and coupled to a first plurality of core switches; and a destination access node coupled to a destination server and coupled to a second plurality of core switches, wherein the second plurality of core switches includes at least one of the core switches in the first plurality of core switches, and wherein the destination access node is configured to: identify information about destination path failures between the destination access node and the second plurality of core switches, receive a data transfer request message originating at the source access node, wherein the data transfer request message includes an amount of data that the source access node has requested to transfer, and responsive to receiving the request message, send a data transfer grant message destined for the source access node, wherein the grant message identifies the information about destination path failures.

The details of one or more examples are set forth in the accompanying drawings and the description below. Other features, objects, and advantages of the techniques described herein will be apparent from the description and drawings, and from the claims.

BRIEF DESCRIPTION OF DRAWINGS

FIG. 16A and FIG. 16B are tables illustrating how an example logical rack may configure a global port health vector index, and use the mapping to compute weights for WECMP nexthop, in accordance with one or more aspects of the present disclosure.

DETAILED DESCRIPTION

Figure 1:
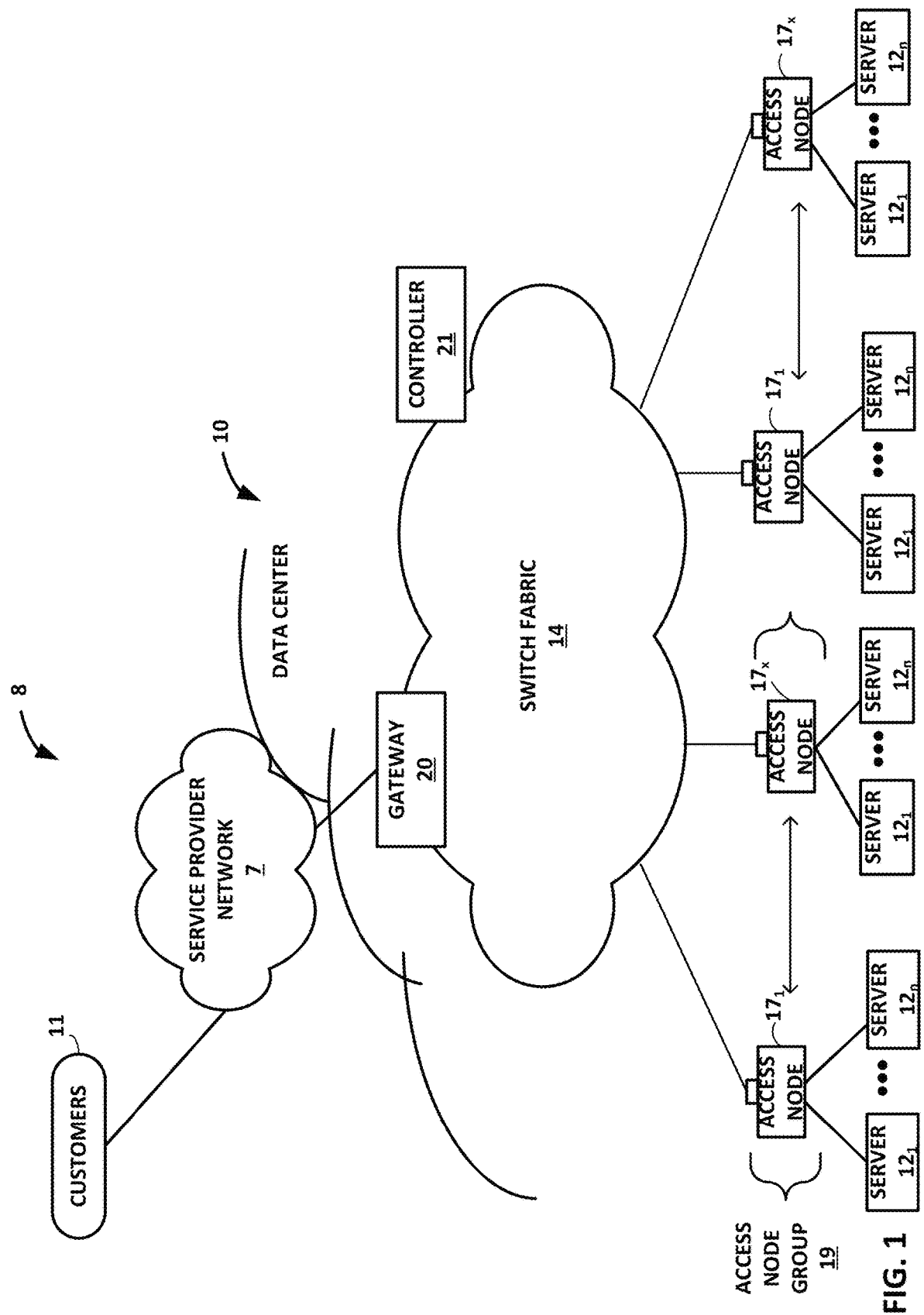
FIG. 1 is a block diagram illustrating an example network having a data center in which examples of the techniques described herein may be implemented.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet. Although described for purposes of example in reference to a data center, the techniques described herein may, in some example implementations, be applied to computer networks generally, including access networks, enterprise networks, service provider networks, distributed and/or redundant data centers or other computing environments.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage systems and application servers 12 interconnected via a high-speed switch fabric 14. In some examples, servers 12 are arranged into multiple different server groups, each including any number of servers up to, for example, n servers $12_1$-$12_N$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more aspects of this disclosure. In some examples, SDN controller 21 may operate in response to configuration input received from a network administrator.

In some examples, SDN controller 21 operates to configure access nodes 17 to logically establish one or more virtual fabrics as overlay networks dynamically configured on top of the physical underlay network provided by switch fabric 14, in accordance with the techniques described herein. Virtual fabrics and the operation of access nodes to establish virtual fabrics are described in U.S. Provisional Patent Application No. 62/638,788, filed Mar. 5, 2018, entitled "Network Access Node Virtual Fabrics Configured Dynamically Over An Underlay Network,", the entire content of which is incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of servers 12 is coupled to switch fabric 14 by an access node 17 for processing streams of information, such as network packets or storage packets. As further described herein, in one example, each access node 17 is a highly programmable I/O processor specially designed for offloading certain functions from servers 12. In one example, each of access nodes 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers.

Access nodes 17 may also be referred to as data processing units (DPUs), or devices including DPUs. In other words, the term access node may be used herein interchangeably with the term DPU. Additional example details of various example DPUs are described in U.S. patent application Ser. No. 16/031,921, filed Jul. 10, 2018, entitled "Data Processing Unit for Compute Nodes and Storage Nodes," and U.S. patent application Ser. No. 16/031,945, filed Jul. 10, 2018, entitled "Data Processing Unit for Stream Processing,", the entire content of each of which is incorporated herein by reference.

In example implementations, access nodes 17 are configurable to operate in a standalone network appliance having one or more access nodes. In other examples, each access node may be implemented as a component (e.g., electronic chip) within a device, such as a compute node, application server, storage server, and may be deployed on a motherboard of the device or within a removable card, such as a storage and/or network interface card. Further, access nodes 17 may be arranged into multiple different access node groups 19, each including any number of access nodes up to, for example, x access nodes $17_1$-$17_X$. As such, multiple access nodes 17 may be grouped (e.g., within a single electronic device or network appliance), referred to herein as an access node group 19, for providing services to a group of servers supported by the set of access nodes internal to the device. In one example, an access node group 19 may comprise four access nodes 17, each supporting four servers so as to support a group of sixteen servers.

In the example of FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. For example, as shown in FIG. 1, each access node 17 includes a set of edge-facing electrical or optical local bus interfaces for communicating with a respective group of servers 12 and one or more core-facing electrical or optical interfaces for communicating with core switches within switch fabric 14. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. Various example architectures of access nodes 17 are described herein. In some examples, the architecture of each access node 17 comprises a multiple core processor system that represents a high performance, hyper-converged network, storage, and data processor and input/output hub. In these examples, the architecture of each access node 17 is optimized for high performance and high efficiency stream processing.

More details on the data center network architecture and example access nodes are available in U.S. patent application Ser. No. 15/939,227, Mar. 28, 2018, entitled "Non-Blocking Any-to-Any Data Center Network with Packet Spraying Over Multiple Alternate Data Paths," and U.S. Patent Application Ser. No. 62/589,427, filed Nov. 21, 2017, entitled "WORK UNIT STACK DATA STRUCTURES IN MULTIPLE CORE PROCESSOR SYSTEM,", the entire content of each of which is incorporated herein by reference.

Although not shown in FIG. 1, access nodes 17 may be directly coupled to each other, such as direct coupling between access nodes in a common access node group 19, to provide direct interconnectivity between the access nodes of the same group. For example, multiple access nodes 17 (e.g., 4 access nodes) may be positioned within a common access node group 19 for servicing a group of servers (e.g., 16 servers).

As one example, each access node group 19 of multiple access nodes 17 may be configured as standalone network device, and may be implemented as a two rack unit (2RU) device that occupies two rack units (e.g., slots) of an equipment rack. In another example, access node 17 may be integrated within a server, such as a single 1RU server in which four CPUs are coupled to the forwarding ASICs described herein on a mother board deployed within a common computing device. In yet another example, one or more of access nodes 17 and servers 12 may be integrated in a suitable size (e.g., 10RU) frame that may, in such an example, become a network storage compute unit (NSCU) for data center 10. For example, an access node 17 may be integrated within a mother board of a server 12 or otherwise co-located with a server in a single chassis.

According to the techniques herein, example implementations are described in which access nodes 17 interface and utilize switch fabric 14 so as to provide resilient, full mesh (any-to-any) interconnectivity such that any of servers 12 may communicate packet data for a given packet flow to any other of the servers using any of a number of parallel data paths within the data center 10. Example network architectures and techniques are described in which access nodes, in example implementations, spray individual packets for packet flows between the access nodes and across some or all of the multiple parallel data paths in the data center switch fabric 14 and, optionally, reorder the packets for delivery to the destinations so as to provide full mesh connectivity.

As described herein, the techniques of this disclosure introduce a new data transmission protocol referred to as a Fabric Control Protocol (FCP) that may be used by the different operational networking components of any of access nodes 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of the same packet flow to all paths between a source and a destination node, and may provide any of the advantages and techniques described herein, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support.

As further described herein, access nodes 17 within an access node group, within different access node groups 19, or across different logical or physical arrangements (e.g., different logical or physical racks) may exchange information about failed or general availability of individual data paths, e.g., link or node failure. Moreover, in one example, a destination access node 17 may include within a grant message to a source access node 17 information about failed data paths between the source access node and the destination access node. As described herein, the source access node may then spray data (e.g., packets for the same packet flow) over multiple paths to the destination access node while avoiding spraying data over those paths that were identified in the grant message as including a failed path. Or in general, a destination access node group 19 may include within a grant message to a source access node group 19 information about failed paths between the source access node group and the destination access node group. The source access node group may then spray data over multiple paths to the destination access node group while avoiding spraying data over paths that include a failed path, component, or device.

The techniques may provide certain advantages. For example, the techniques may increase significantly the bandwidth utilization of the underlying switch fabric 14 and the resiliency of the underlying switch fabric 14. Moreover, in example implementations, the techniques may provide full mesh interconnectivity between the servers of the data center and may nevertheless be non-blocking and drop-free. More specifically, based on the end-to-end admission control mechanisms of FCP and packet spraying in proportion to available bandwidth, switch fabric 14 may comprise a drop-free fabric at high efficiency without use of link level flow control. When path failures (e.g., link failures, node failures, or other types of failures) occur, techniques described herein may enable a fast recovery that limits packet loss.

Although access nodes 17 are described in FIG. 1 with respect to switch fabric 14 of data center 10, in other examples, access nodes may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the access nodes. The packet switched network may use any technology, including IP over Ethernet as well as other technologies. Irrespective of the type of packet switched network, in accordance with the techniques described in this disclosure, access nodes may spray individual packets for packet flows between the access nodes and across multiple parallel data paths in the packet switched network and, optionally, reorder the packets for delivery to the destinations so as to provide full mesh connectivity.

Aspects of this disclosure relate to the disclosure of U.S. Provisional Patent Application No. 62/566,060, filed Sep. 29, 2017, entitled "Fabric Control Protocol for Data Center Networks with Packet Spraying over Multiple Alternate Data Paths,", the entire content of which is incorporated herein by reference.

Figure 2:
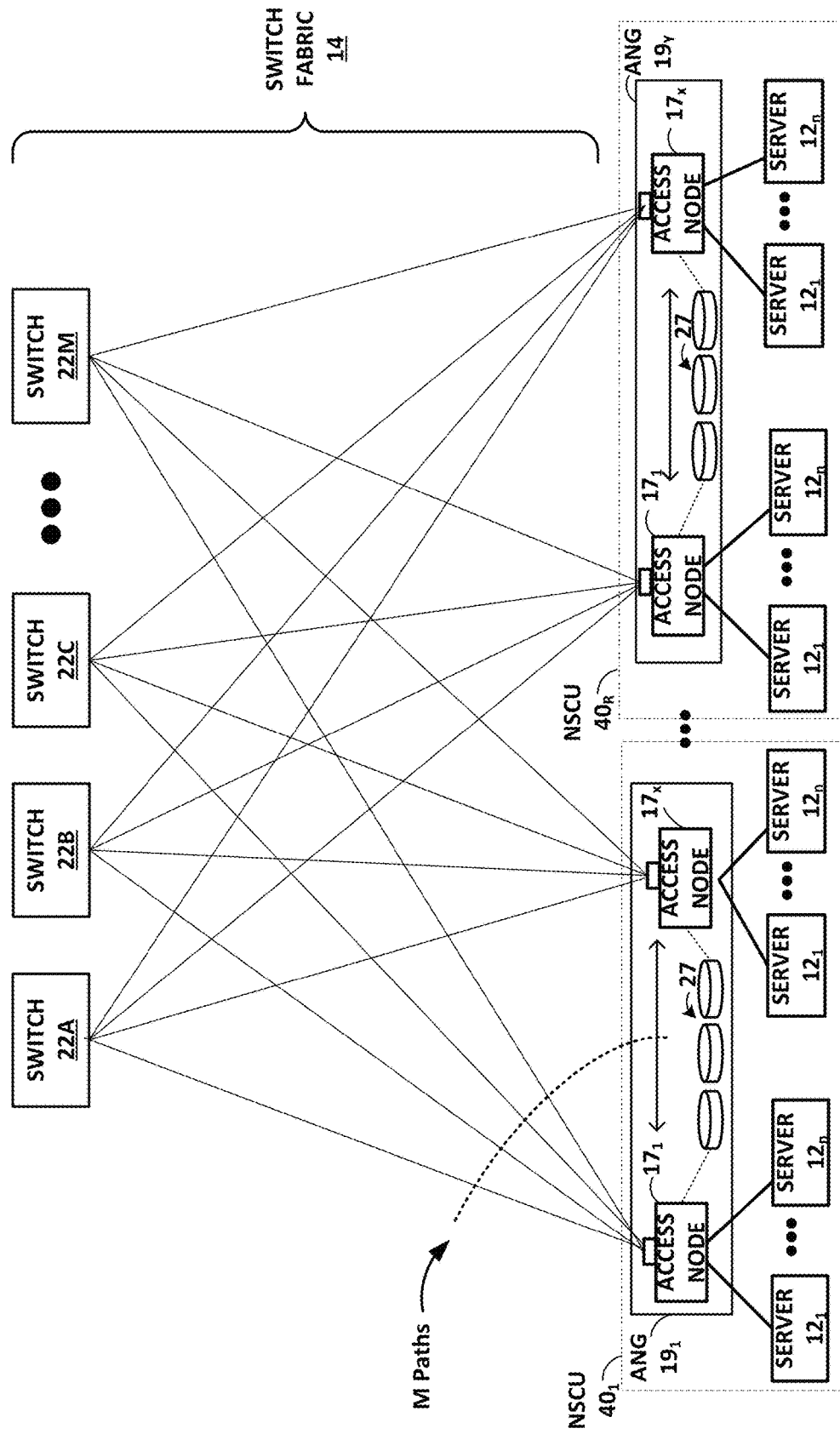
FIG. 2 is a block diagram illustrating in further detail the logical interconnectivity provided by access nodes and switch fabric within a data center.

FIG. 2 is a block diagram illustrating in further detail the logical interconnectivity provided by access nodes 17 and switch fabric 14 within the data center. As shown in this example, access nodes 17 and switch fabric 14 may be configured to provide full mesh interconnectivity such that access nodes 17 may communicate packet data for any of servers 12 to any other of the servers 12 using any of a number of M parallel data paths to any of core switches 22A-22M (collectively "core switches 22"). Moreover, according to the techniques described herein, access nodes 17 and switch fabric 14 may be configured and arranged in a way such that the M parallel data paths in switch fabric 14 provide reduced L2/L3 hops and full mesh interconnections (e.g., bipartite graph) between servers 12, even in massive data centers having tens of thousands of servers. Note that in this example, switches 22 are not connected to each other, which makes it much more likely that any failure of one or more of the switches will be independent of each other. In other examples, the switch fabric itself may be implemented using multiple layers of interconnected switches as in a CLOS network.

In some example implementations, each access node 17 may, therefore, have multiple parallel data paths for reaching any given other access node 17 and the servers 12 reachable through those access nodes. In some examples, rather than being limited to sending all of the packets of a given flow along a single path in the switch fabric, switch fabric 14 may be configured such that access nodes 17 may, for any given packet flow between servers 12, spray the packets of the packet flow across all or a subset of the M parallel data paths of switch fabric 14 by which a given destination access node 17 for a destination server 12 can be reached.

According to the disclosed techniques, access nodes 17 may spray the packets of individual packet flows across the M paths end-to-end forming a virtual tunnel between a source access node and a destination access node. In this way, the number of layers included in switch fabric 14 or the number of hops along the M parallel data paths, might not matter for implementation of the packet spraying techniques described in this disclosure.

The technique of spraying packets of individual packet flows across all or a subset of the M parallel data paths of switch fabric 14, however, enables the number of layers of network devices within switch fabric 14 to be reduced, e.g., to a bare minimum of one. Further, it enables fabric architectures in which the switches are not connected to each other, reducing the likelihood of failure dependence between two switches and thereby increasing the reliability of the switch fabric. Flattening switch fabric 14 may reduce cost by eliminating layers of network devices that require power and reduce latency by eliminating layers of network devices that perform packet switching. In one example, the flattened topology of switch fabric 14 may result in a core layer that includes only one level of spine switches, e.g., core switches 22, that might not communicate directly with one another but form a single hop along the M parallel data paths. In this example, any access node 17 sourcing traffic into switch fabric 14 may reach any other access node 17 by a single, one-hop L3 lookup by one of core switches 22.

An access node 17 sourcing a packet flow for a source server 12 may use any technique for spraying the packets across the available parallel data paths, such as available bandwidth, random, round-robin, hash-based or other mechanism that may be designed to maximize, for example, utilization of bandwidth or otherwise avoid congestion. In some example implementations, flow-based load balancing need not necessarily be utilized and more effective bandwidth utilization may be used by allowing packets of a given packet flow (e.g., packets having the same source and destination or, for example, packets having the same five tuple) sourced by a server 12 to traverse different paths of switch fabric 14 between access nodes 17 coupled to the source and destinations servers. The respective destination access node 17 associated with the destination server 12 may be configured to reorder the variable length IP packets of the packet flows and deliver the packets to the destination server in the sequence in which they were sent. In other examples, the respective destination access node 17 associated with the destination server 12 may not need to reorder the packets of the packet flows prior to delivering the packets to the destination server.

In some example implementations, each access node 17 implements at least four different operational networking components or functions: (1) a source component operable to receive traffic from server 12, (2) a source switching component operable to switch source traffic to other source switching components of different access nodes 17 (possibly of different access node groups) or to core switches 22, (3) a destination switching component operable to switch inbound traffic received from other source switching components or from cores switches 22 and (4) a destination component operable to reorder packet flows and provide the packet flows to destination servers 12.

In this example, servers 12 are connected to source components of the access nodes 17 to inject traffic into the switch fabric 14, and servers 12 are similarly coupled to the destination components within the access nodes 17 to receive traffic therefrom. Because of the full-mesh, parallel data paths provided by switch fabric 14, each source switching component and destination switching component within a given access node 17 need not perform L2/L3 switching. Instead, access nodes 17 may apply spraying algorithms to spray packets of a packet flow, e.g., based on available bandwidth, randomly, round-robin, quality of service (QoS)/scheduling or otherwise, to efficiently forward packets without requiring packet analysis and lookup operations.

Destination switching components of access nodes 17 may provide a limited lookup necessary only to select the proper output port for forwarding packets to local servers 12. As such, with respect to full routing tables for the data center, only core switches 22 may need to perform full lookup operations. Thus, switch fabric 14 provides a highly-scalable, flat, high-speed interconnect in which servers 12 are, in some examples, effectively one L2/L3 hop from any other server 12 within the data center.

Access nodes 17 may need to connect to a fair number of core switches 22 in order to communicate packet data to any other of access nodes 17 and the servers 12 accessible through those access nodes. In some cases, to provide a link multiplier effect, access nodes 17 may connect to core switches 22 via top of rack (TOR) Ethernet switches, electrical permutation devices, or optical permutation (OP) devices (not shown in FIG. 2). To provide an additional link multiplier effect, source components of the access nodes 17 may be configured to spray packets of individual packet flows of the traffic received from server 12 across a set of the other access nodes 17 included in one or more access node groups 19. In one example, access node 17 may achieve an 8× multiplier effect from inter-access node spraying, and an additional 8× multiplier effect from OP devices to connect to up to sixty-four core switches 22.

Flow-based routing and switching over Equal Cost Multi-Path (ECMP) paths through a network may be susceptible to highly variable load-dependent latency. For example, the network may include many small bandwidth flows and a few large bandwidth flows. In the case of routing and switching over ECMP paths, the source access node may select the same path for two of the large bandwidth flows leading to large latencies over that path. In order to avoid this issue and keep latency low across the network, an administrator may be forced to keep the utilization of the network below 25-30%, for example. The techniques described in this disclosure of configuring access nodes 17 to spray packets of individual packet flows across all available paths enables higher network utilization, e.g., 85-90%, while maintaining bounded or limited latencies. The packet spraying techniques enable a source access node 17 to fairly distribute packets of a given flow across all the available paths while taking link failures into account. In this way, regardless of the bandwidth size of the given flow, the load can be fairly spread across the available paths through the network to avoid over utilization of a particular path. The disclosed techniques enable the same amount of networking devices to pass three times the amount of data traffic through the network while maintaining low latency characteristics and reducing a number of layers of network devices that consume energy. In some examples, access nodes 17 may share information about failed data paths, thereby enabling a source access node to use such information to prevent packet loss resulting from spraying packets over failed data paths. Accordingly, and as further described herein, the packet spraying techniques described herein may include limiting the paths over which packets are sprayed.

As shown in the example of FIG. 2, in some example implementations, access nodes 17 may be arranged into multiple different access node groups $19_1$-$19_Y$ (ANGs in FIG. 2), each including any number of access nodes 17 up to, for example, x access nodes $17_1$-$17X$. As such, multiple access nodes 17 may be grouped and arranged (e.g., within a single electronic device or network appliance), referred to herein as an access node group (ANG) 19, for providing services to a group of servers supported by the set of access nodes internal to the device.

As described, each access node group 19 may be configured as standalone network device, and may be implemented as a device configured for installation within a compute rack, a storage rack or a converged rack. In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as high-speed solid-state hard drives, configured to provide network accessible storage for use by applications executing on the servers. Each access node group 19 including its set of access nodes 17, storage devices 27, and the set of servers 12 supported by the access nodes 17 of that access node group may be referred to herein as a network storage compute unit (NSCU) 40.

In some examples, access node groups 19 may share information about failed data paths, thereby enabling a source access node group to use such information to prevent packet loss resulting from spraying packets over failed data paths between different access node groups. The information shared may include information maintained by one access node group, but not readily available to another access node group. Accordingly, and as further described herein, the packet spraying techniques described herein may include limiting the paths over which packets are sprayed.

Figure 3:
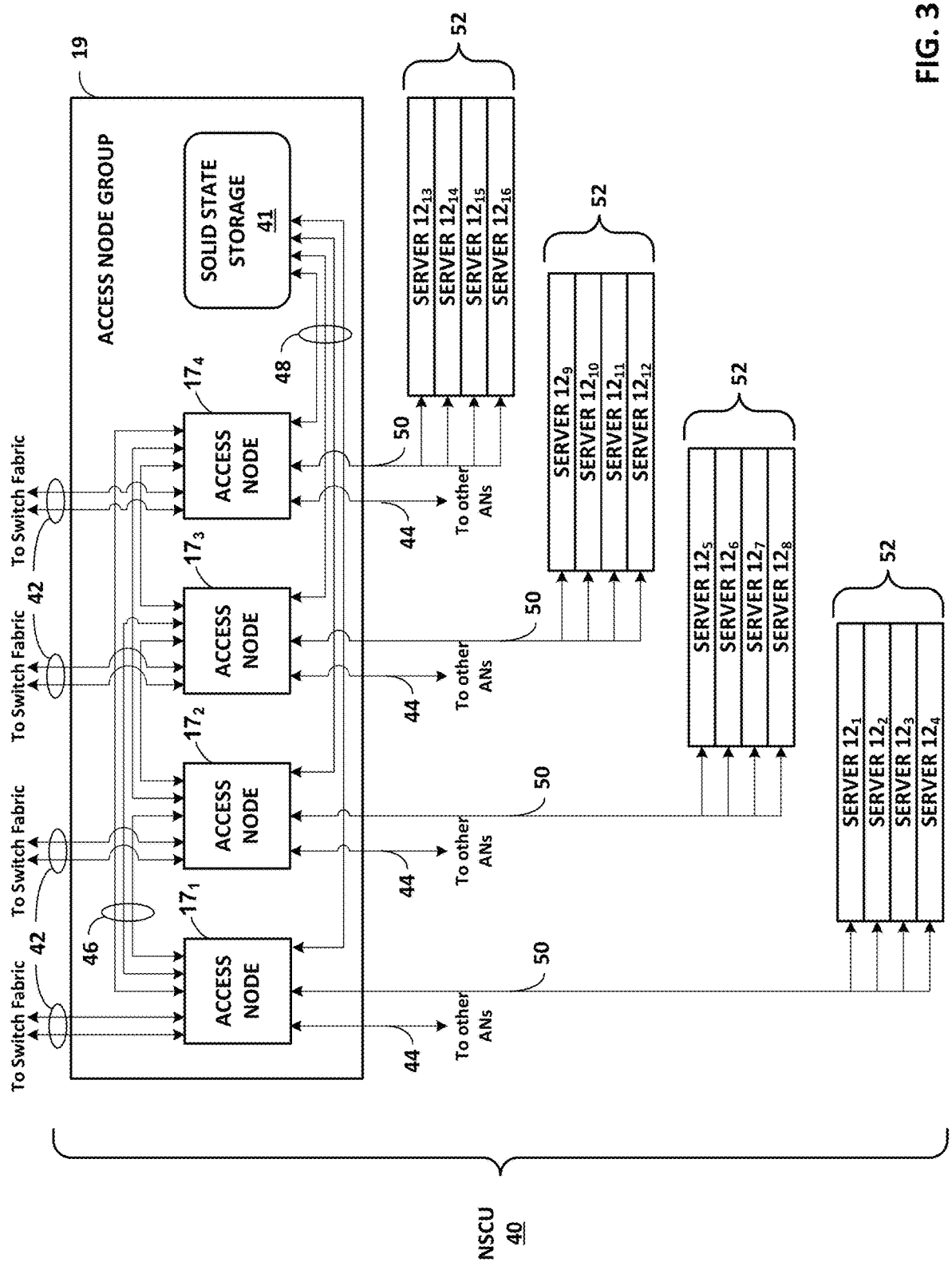
FIG. 3 is a block diagram illustrating one example of network storage compute unit (NSCU) 40 including an access node group and its supported servers.

FIG. 3 is a block diagram illustrating one example of network storage compute unit (NSCU) 40 including an access node group 19 and its supported servers 52. Access node group 19 may be configured to operate as a high-performance I/O hub designed to aggregate and process network and storage I/O to multiple servers 52. In the particular example of FIG. 3, access node group 19 includes four access nodes $17_1$-$17_4$ (collectively, "access nodes 17") connected to a pool of local solid state storage 41. In the illustrated example, access node group 19 supports a total of sixteen server nodes $12_1$-$12_{16}$ (collectively, "server nodes 12") with each of the four access nodes 17 within access node group 19 supporting four of server nodes 12. In some examples, each of the four server nodes 12 supported by each of the access nodes 17 may be arranged as a server 52. In some examples, the "servers 12" described throughout this application may be dual-socket or dual-processor "server nodes" that are arranged in groups of two or more within a standalone server device, e.g., servers 52.

Although access node group 19 is illustrated in FIG. 3 as including four access nodes 17 that are all connected to a single pool of solid state storage 41, an access node group may be arranged in other ways. In one example, each of the four access nodes 17 may be included on an individual access node sled that also includes solid state storage and/or other types of storage for the access node. In this example, an access node group may include four access node sleds each having an access node and a set of local storage devices.

In one example implementation, access nodes 17 within access node group 19 connect to servers 52 and solid state storage 41 using Peripheral Component Interconnect express (PCIe) links 48, 50, and connect to other access nodes and the datacenter switch fabric 14 using Ethernet links 42, 44, 46. For example, each of access nodes 17 may support six high-speed Ethernet connections, including two externally-available Ethernet connections 42 for communicating with the switch fabric, one externally-available Ethernet connection 44 for communicating with other access nodes in other access node groups, and three internal Ethernet connections 46 for communicating with other access nodes 17 in the same access node group 19. In one example, each of externally-available connections 42 may be a 100 Gigabit Ethernet (GE) connection. In this example, access node group 19 has 8×100 GE externally-available ports to connect to the switch fabric 14.

Within access node group 19, connections 42 may be copper, i.e., electrical, links arranged as 8×25 GE links between each of access nodes 17 and optical ports of access node group 19. Between access node group 19 and the switch fabric, connections 42 may be optical Ethernet connections coupled to the optical ports of access node group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to access node group 19 may carry 4×100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of access nodes 17 include one Ethernet connection 44 for communication with other access nodes within other access node groups, and three Ethernet connections 46 for communication with the other three access nodes within the same access node group 19. In some examples, connections 44 may be referred to as "inter-access node group links" and connections 46 may be referred to as "intra-access node group links."

Ethernet connections 44, 46 provide full-mesh connectivity between access nodes within a given structural unit. In one example, such a structural unit may be referred to herein as a logical rack (e.g., a half-rack or a half physical rack) that includes two NSCUs 40 having two AGNs 19 and supports an 8-way mesh of eight access nodes 17 for those AGNs. In this particular example, connections 46 would provide full-mesh connectivity between the four access nodes 17 within the same access node group 19, and connections 44 would provide full-mesh connectivity between each of access nodes 17 and four other access nodes within one other access node group of the logical rack (i.e., structural unit). In addition, access node group 19 may have enough, e.g., sixteen, externally-available Ethernet ports to connect to the four access nodes in the other access node group.

In the case of an 8-way mesh of access nodes, i.e., a logical rack of two NSCUs 40, each of access nodes 17 may be connected to each of the other seven access nodes by a 50 GE connection. For example, each of connections 46 between the four access nodes 17 within the same access node group 19 may be a 50 GE connection arranged as 2×25 GE links. Each of connections 44 between the four access nodes 17 and the four access nodes in the other access node group may include four 50 GE links. In some examples, each of the four 50 GE links may be arranged as 2×25 GE links such that each of connections 44 includes 8×25 GE links to the other access nodes in the other access node group. This example is described in more detail below with respect to FIG. 5.

In another example, Ethernet connections 44, 46 provide full-mesh connectivity between access nodes within a given structural unit that is a full-rack or a full physical rack that includes four NSCUs 40 having four AGNs 19 and supports a 16-way mesh of access nodes 17 for those AGNs. In this example, connections 46 provide full-mesh connectivity between the four access nodes 17 within the same access node group 19, and connections 44 provide full-mesh connectivity between each of access nodes 17 and twelve other access nodes within three other access node group. In addition, access node group 19 may have enough, e.g., forty-eight, externally-available Ethernet ports to connect to the four access nodes in the other access node group.

In the case of a 16-way mesh of access nodes, each of access nodes 17 may be connected to each of the other fifteen access nodes by a 25 GE connection, for example. In other words, in this example, each of connections 46 between the four access nodes 17 within the same access node group 19 may be a single 25 GE link. Each of connections 44 between the four access nodes 17 and the twelve other access nodes in the three other access node groups may include 12×25 GE links.

As shown in FIG. 3, each of access nodes 17 within an access node group 19 may also support a set of high-speed PCIe connections 48, 50, e.g., PCIe Gen 3.0 or PCIe Gen 4.0 connections, for communication with solid state storage 41 within access node group 19 and communication with servers 52 within NSCU 40. Each of servers 52 includes four server nodes 12 supported by one of access nodes 17 within access node group 19. Solid state storage 41 may be a pool of Non-Volatile Memory express (NVMe)-based solid state drive (SSD) storage devices accessible by each of access nodes 17 via connections 48.

In one example, solid state storage 41 may include twenty-four SSD devices with six SSD devices for each of access nodes 17. The twenty-four SSD devices may be arranged in four rows of six SSD devices with each row of SSD devices being connected to one of access nodes 17. Each of the SSD devices may provide up to 16 Terabytes (TB) of storage for a total of 384 TB per access node group 19. As described in more detail below, in some cases, a physical rack may include four access node groups 19 and their supported servers 52. In that case, a typical physical rack may support approximately 1.5 Petabytes (PB) of local solid state storage. In another example, solid state storage 41 may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like.

In the above described example in which each of the access nodes 17 is included on an individual access node sled with local storage for the access node, each of the access node sleds may include four SSD devices and some additional storage that may be hard drive or solid state drive devices. In this example, the four SSD devices and the additional storage may provide approximately the same amount of storage per access node as the six SSD devices described in the previous example.

In one example, each of access nodes 17 supports a total of 96 PCIe lanes. In this example, each of connections 48 may be an 8×4-lane PCI Gen 3.0 connection via which each of access nodes 17 may communicate with up to eight SSD devices within solid state storage 41. In addition, each of connections 50 between a given access node 17 and the four server nodes 12 within the server 52 supported by the access node 17 may be a 4×16-lane PCIe Gen 3.0 connection. In this example, access node group 19 has a total of 256 external facing PCIe links that interface with servers 52. In some scenarios, access nodes 17 may support redundant server connectivity such that each of access nodes 17 connects to eight server nodes 12 within two different servers 52 using an 8×8-lane PCIe Gen 3.0 connection.

In another example, each of access nodes 17 supports a total of 64 PCIe lanes. In this example, each of connections 48 may be an 8×4-lane PCI Gen 3.0 connection via which each of access nodes 17 may communicate with up to eight SSD devices within solid state storage 41. In addition, each of connections 50 between a given access node 17 and the four server nodes 12 within the server 52 supported by the access node 17 may be a 4×8-lane PCIe Gen 4.0 connection. In this example, access node group 19 has a total of 128 external facing PCIe links that interface with servers 52.

Figure 4:
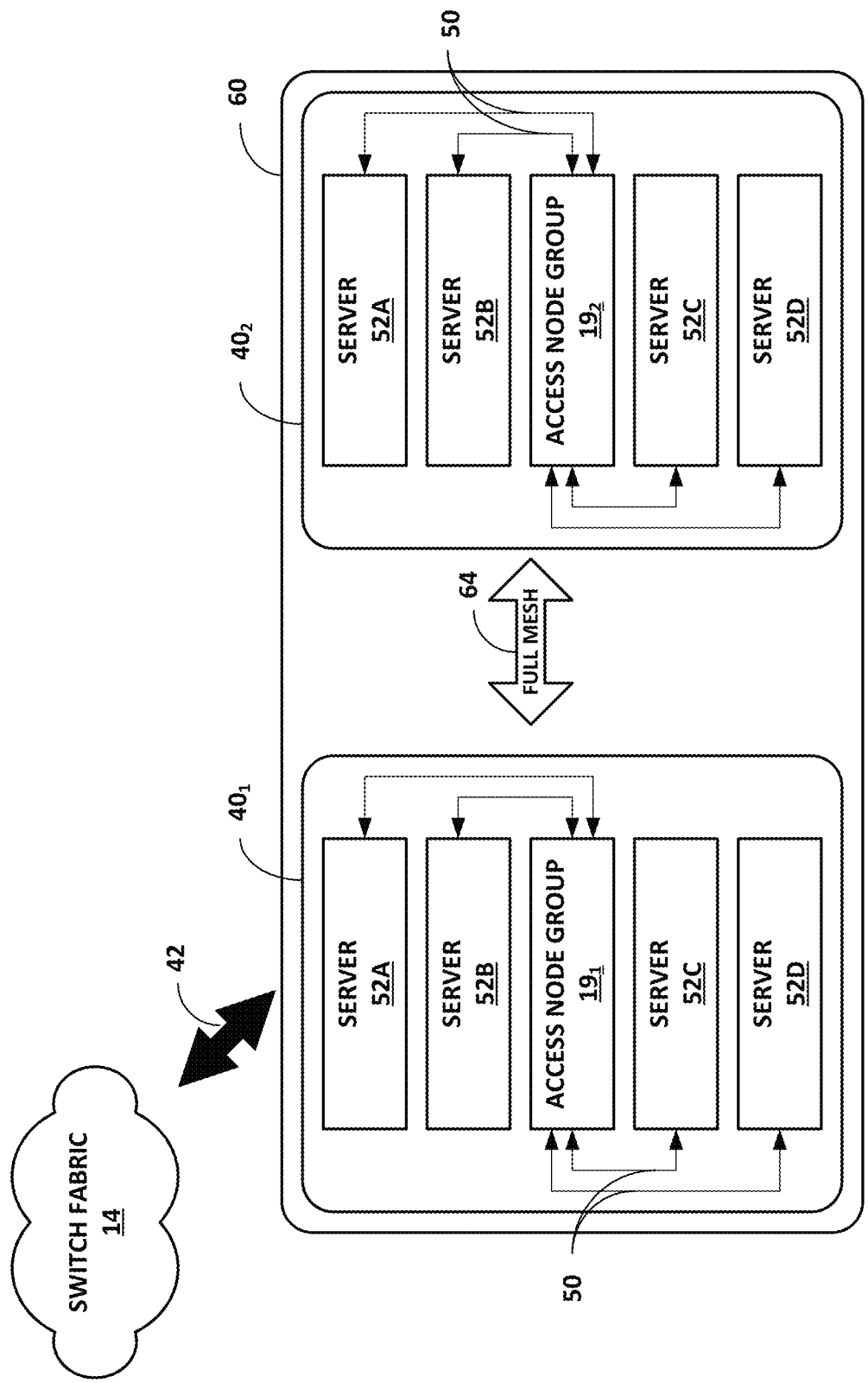
FIG. 4 is a block diagram illustrating an example logical rack arrangement including two NSCUs from FIG. 3.

FIG. 4 is a block diagram illustrating an example logical rack arrangement 60 including two NSCUs 401 and 402 from FIG. 3. In some examples, each of NSCUs 40 may be referred to as a "compute sandwich" based on the structural arrangement of access node group 19 "sandwiched" between two servers 52 on the top and two servers 52 on the bottom. For example, server 52A may be referred to as a top second server, server 52B may be referred to as a top server, server 52C may be referred to as a bottom server, and server 52D may be referred to as a bottom second server. Each of servers 52 may include four server nodes, and each server node may be a dual-socket or dual-processor server sled.

Each of access node groups 19 connects to servers 52 using PCIe links 50, and to switch fabric 14 using Ethernet links 42. Access node groups $19_1$ and $19_2$ may each include four access nodes connected to each other using Ethernet links and local solid state storage connected to the access nodes using PCIe links as described above with respect to FIG. 3. The access nodes within access node groups $19_1$ and $19_2$ are connected to each other in a full mesh 64, which is described in more detail with respect to FIG. 5.

In addition, each of access node groups 19 supports PCIe connections 50 to servers 52. In one example, each of connections 50 may be a 4×16-lane PCIe Gen 3.0 connection such that access node group 19 has a total of 256 externally-available PCIe links that interface with servers 52. In another example, each of connections 50 may be a 4×8-lane PCIe Gen 4.0 connection for communication between access nodes within access node group 19 and server nodes within servers 52. In either example, connections 50 may provide a raw throughput of 512 Gigabits per access node 19 or approximately 128 Gigabits of bandwidth per server node without accounting for any overhead bandwidth costs.

As discussed above with respect to FIG. 3, each of NSCUs 40 supports 8×100 GE links 42 from access node group 19 to switch fabric 14. Each of NSCUs 40 thus provides support for up to sixteen server nodes in four servers 52, local solid state storage, and 800 Gbps of full duplex (i.e., bidirectional) network bandwidth. Each of access node groups 19 may, therefore, provide true hyper-convergence of compute, storage, networking and security of servers 52. Logical rack 60, including two NSCUs 40, therefore, provides support for up to thirty-two server nodes in eight servers 52, local solid state storage at access node groups 19, and 16×100 GE links 42 to switch fabric 14, which results in 1.6 Terabits per second (Tbps) of full duplex network bandwidth.

Figure 5:
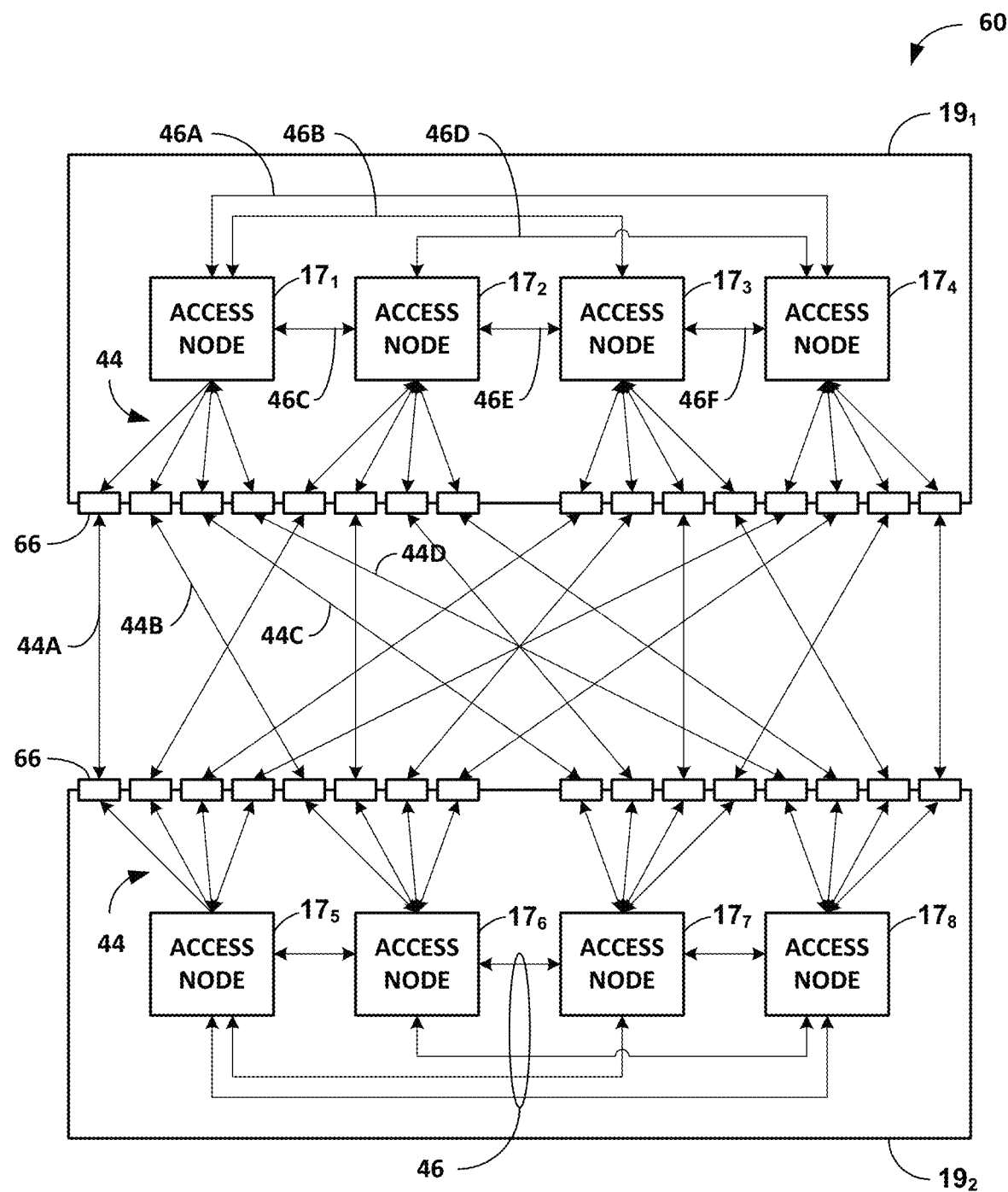
FIG. 5 is a block diagram illustrating an example of full mesh connectivity between two access node groups within a logical rack.

FIG. 5 is a block diagram illustrating an example of full mesh connectivity between two access node groups $19_1$, $19_2$ within a logical rack 60. As illustrated in FIG. 5, access node group $19_1$ includes four access nodes $17_1$-$17_4$ and access node group $19_2$ also include four access nodes $17_5$-$17_8$. Each of access nodes 17 connects to the other access nodes within the logical rack in a mesh fabric topology. The eight access nodes 17 included in the mesh topology may be referred to as an access node "cluster." In this way, each of access nodes 17 is able to spray incoming packets to each of the other access nodes in the cluster.

In the illustrated configuration of an 8-way mesh interconnecting two access node groups 19, each access node 17 connects via full mesh connectivity to each of the other seven access nodes in the cluster. The mesh topology between access nodes 17 includes intra-access node group links 46 between the four access nodes included in the same access node group 19, and inter-access node group links 44 between access nodes $17_1$-$17_4$ in access node group $19_1$ and access nodes $17_5$-$17_8$ in access node group $19_2$. Although illustrated as a single connection between each of access nodes 17, each of connections 44, 46 are bidirectional such that each access node connects to each other access node in the cluster via a separate link.

Each of access nodes $17_1$-$17_4$ within first access node group $19_1$ has three intra-access node group connections 46 to the other access nodes in first access node group $19_1$. As illustrated in first access node group $19_1$, access node $17_1$ supports connection 46A to access node $17_4$, connection 46B to access node $17_3$, and connection 46C to access node $17_2$. Access node $17_2$ supports connection 46A to access node $17_1$, connection 46D to access node $17_4$, and connection 46E to access node $17_3$. Access node $17_3$ supports connection 46B to access node $17_1$, connection 46E to access node $17_2$, and connection 46F to access node $17_4$. Access node $17_4$ supports connection 46A to access node $17_1$, connection 46D to access node $17_2$, and connection 46F to access node $17_3$. The access nodes $17_5$-$17_8$ are similarly connected within second access node group $19_2$.

Each of access nodes $17_1$-$17_4$ within first access node group $19_1$ also has four inter-access node group connections 44 to the access nodes $17_5$-$17_8$ in second access node group $19_2$. As illustrated in FIG. 5, first access node group $19_1$ and second access node group $19_2$ each has sixteen externally-available ports 66 to connect to each other. For example, access node $17_1$ supports connections 44A, 44B, 44C, and 44D through four external facing ports 66 of first access node group $19_1$ to four externally-available ports 66 of second access node group $19_2$ to reach access nodes $17_5$-$17_8$. Specifically, access node $17_1$ supports connection 44A to access node $17_5$ within second access node group $19_2$, connection 44B to access node $17_6$ within second access node group $19_2$, connection 44C to access node $17_7$ within second access node group $19_2$, and connection 44D to access node $17_8$ within second access node group $19_2$. The remaining access nodes $17_2$-$17_4$ within first access node group $19_1$ are similarly connected to access nodes $17_5$-$17_8$ within second access node group $19_2$. In addition, in the reverse direction, the access nodes $17_5$-$17_8$ are similarly connected to access nodes $17_1$-$17_4$ within first access node group $19_1$.

Each of access nodes 17 may be configured to support up to 400 Gigabits of bandwidth to connect to other access nodes in the cluster. In the illustrated example, each of access nodes 17 may support up to eight 50 GE links to the other access nodes. In this example, since each of access nodes 17 only connects to seven other access nodes, 50 Gigabits of bandwidth may be leftover and used for managing the access node. In some examples, each of connections 44, 46 may be single 50 GE connections. In other examples, each of connections 44, 46 may be 2×25 GE connections. In still other examples, each of intra-access node group connections 46 may be 2×25 GE connections, and each of inter-access node group connections 44 may be single 50 GE connections to reduce a number of inter-box cables. For example, from each access node $17_1$-$17_4$ within first access node group $19_1$, 4×50 GE links go off box to connect to access nodes $17_5$-$17_8$ in second access node group $19_2$. In some examples, the 4×50 GE links may be taken out from each of the access nodes 17 using DAC cables.

Figure 6:
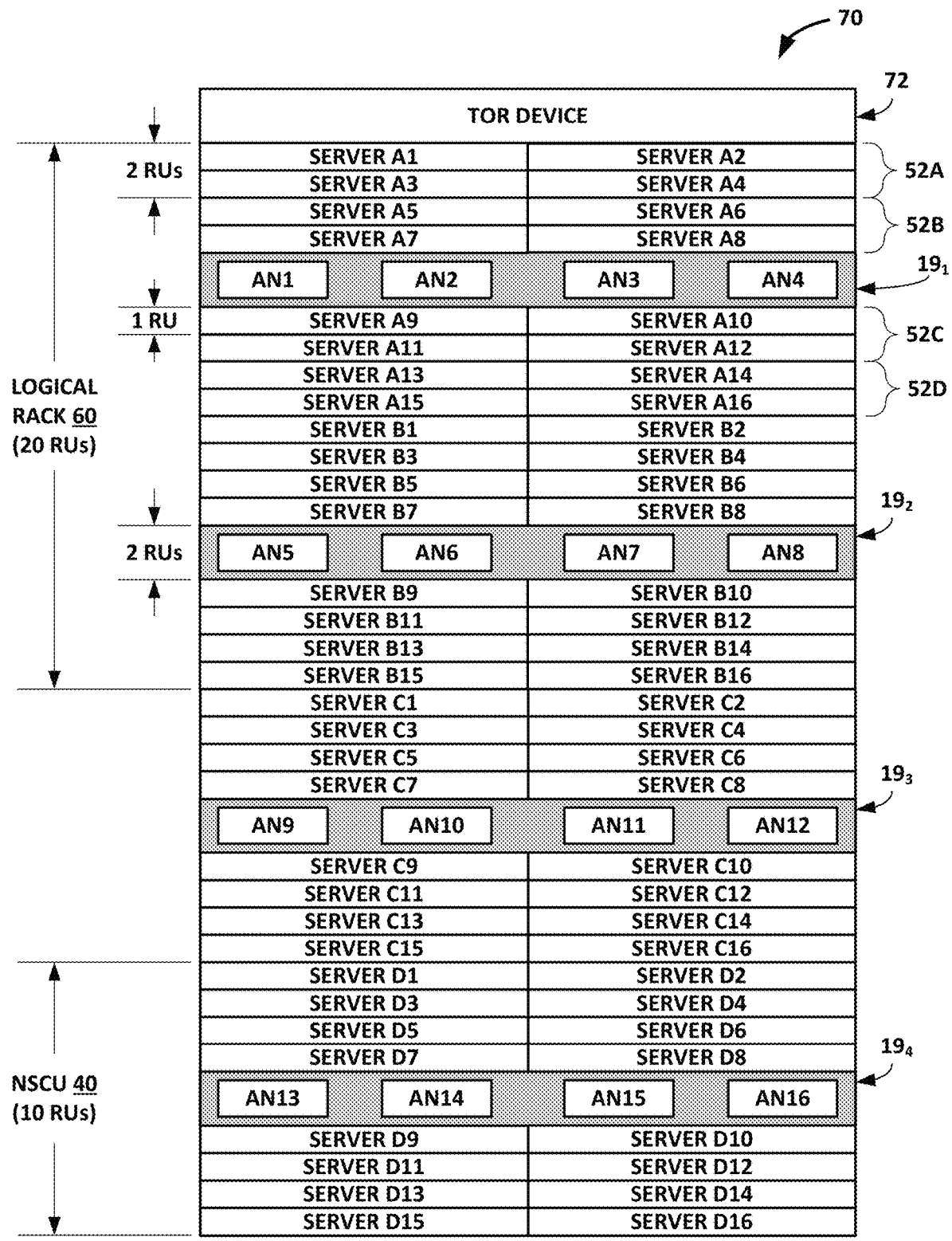
FIG. 6 is a block diagram illustrating an example arrangement of a full physical rack including two logical racks from FIG. 4.

FIG. 6 is a block diagram illustrating an example arrangement of a full physical rack 70 including two logical racks 60 from FIG. 4. In the illustrated example of FIG. 6, rack 70 has 42 rack units or slots in vertical height including a 2 rack unit (2RU) top of rack (TOR) device 72 for providing connectivity to devices within switch fabric 14. In one example, TOR device 72 comprises a top of rack Ethernet switch. In other examples, TOR device 72 comprises an optical permutor. In some examples, rack 70 might not include an additional TOR device 72 and instead have the typical 40 rack units.

In the illustrated example, rack 70 includes four access node groups $19_1$-$19_4$ that are each separate network appliances 2RU in height. Each of the access node groups 19 includes four access nodes and may be configured as shown in the example of FIG. 3. For example, access node group $19_1$ includes access nodes AN1-AN4, access node group $19_2$ includes access nodes AN5-AN8, access node group $19_3$ includes access nodes AN9-AN12, and access node group $19_4$ includes access nodes AN13-AN16. Access nodes AN1-AN16 may be substantially similar to access nodes 17 described above.

In this example, each of the access node groups 19 supports sixteen server nodes. For example, access node group $19_1$ supports server nodes A1-A16, access node group $19_2$ supports server nodes B1-B16, access node group $19_3$ supports server nodes C1-C16, and access node group $19_4$ supports server nodes D1-D16. A server node may be a dual-socket or dual-processor server sled that is ½Rack in width and 1RU in height. As described with respect to FIG. 3, four of the server nodes may be arranged into a server 52 that is 2RU in height. For example, server 52A includes server nodes A1-A4, server 52B includes server nodes A5-A8, server 52C includes server nodes A9-A12, and server 52D includes server nodes A13-A16. Server nodes B1-B16, C1-C16, and D1-D16 may be similarly arranged into servers 52.

Access node groups 19 and servers 52 are arranged into NSCUs 40 from FIGS. 3-4. NSCUs 40 are 10RU in height and each include one 2RU access node group 19 and four 2RU servers 52. As illustrated in FIG. 6, access node groups 19 and servers 52 may be structured as a compute sandwich, in which each access node group 19 is "sandwiched" between two servers 52 on the top and two servers 52 on the bottom. For example, with respect to access node group $19_1$, server 52A may be referred to as a top second server, server 52B may be referred to as a top server, server 52C may be referred to as a bottom server, and server 52D may be referred to as a bottom second server. In the illustrated structural arrangement, access node groups 19 are separated by eight rack units to accommodate the bottom two 2RU servers 52 supported by one access node group and the top two 2RU servers 52 supported by another access node group.

NSCUs 40 may be arranged into logical racks 60, i.e., half physical racks, from FIG. 5. Logical racks 60 are 20RU in height and each include two NSCUs 40 having full mesh connectivity. In the illustrated example of FIG. 6, access node group $19_1$ and access node group $19_2$ are included in the same logical rack 60 along with their respective supported server nodes A1-A16 and B1-B16. As described in more detail above with respect to FIG. 5, access nodes AN1-AN8 included the same logical rack 60 are connected to each other in an 8-way mesh. Access nodes AN9-AN16 may be similarly connected in an 8-way mesh within another logical rack 60 includes access nodes groups $19_3$ and $19_4$ along with their respective server nodes C1-C16 and D1-D16.

Logical racks 60 within rack 70 may be connected to the switch fabric directly or through an intermediate top of rack device 72. As noted above, in one example, TOR device 72 comprises a top of rack Ethernet switch. In other examples, TOR device 72 comprises an optical permutor that transports optical signals between access nodes 17 and core switches 22 and that is configured such that optical communications are "permuted" based on wavelength so as to provide full-mesh connectivity between the upstream and downstream ports without any optical interference.

In the illustrated example, each of the access node groups 19 may connect to TOR device 72 via one or more of the 8×100 GE links supported by the access node group to reach the switch fabric. In one case, the two logical racks 60 within rack 70 may each connect to one or more ports of TOR device 72, and TOR device 72 may also receive signals from one or more logical racks within neighboring physical racks. In other examples, rack 70 might not itself include TOR device 72, but instead logical racks 60 may connect to one or more TOR devices included in one or more neighboring physical racks.

For a standard rack size of 40RU it may be desirable to stay within a typical power limit, such as a 15 kilowatt (kW) power limit. In the example of rack 70, not taking the additional 2RU TOR device 72 into consideration, it may be possible to readily stay within or near the 15 kW power limit even with the sixty-four server nodes and the four access node groups. For example, each of the access node groups 19 may use approximately 1 kW of power resulting in approximately 4 kW of power for access node groups. In addition, each of the server nodes may use approximately 200 W of power resulting in around 12.8 kW of power for servers 52. In this example, the 40RU arrangement of access node groups 19 and servers 52, therefore, uses around 16.8 kW of power.

As further described herein, access nodes 17 within different logical racks 60 may exchange information about failed data paths. For instance, in FIG. 6, a destination access node ("AN16") may include within a grant message to a source access node ("AN1") information about failed data paths between the source access node and the destination access node. The source access node may then spray data over multiple paths to the destination access node while avoiding spraying data over those paths that were identified in the grant message as a failed path. Further, the source access node may also avoid spraying data over those paths that the source access node independently determines are failed paths. In this way, the source access node avoids spraying data over paths that are identified as failed by either the source access node or the destination access node.

Figure 7A:
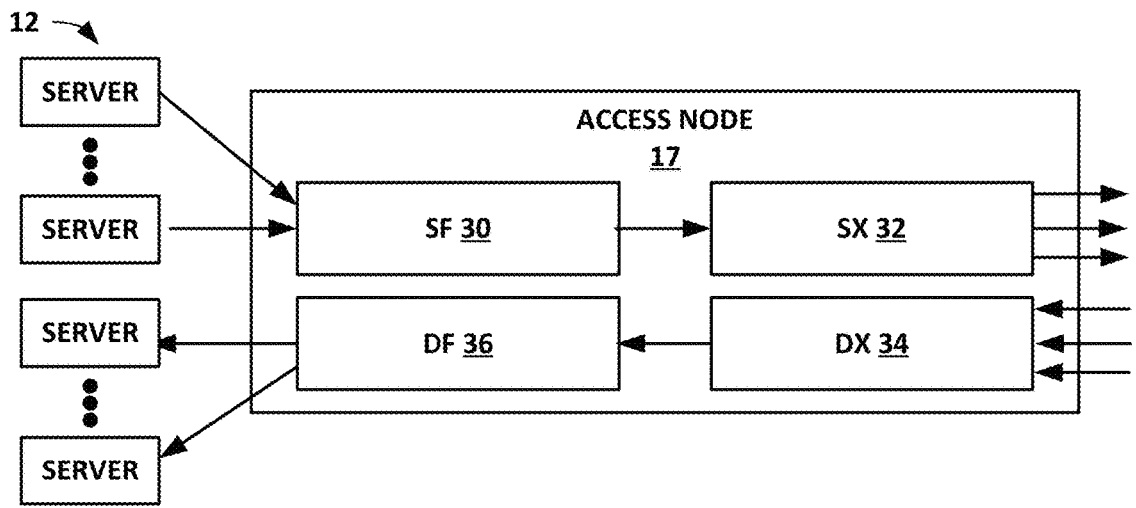
FIG. 7A is a block diagram showing a logical view of the networking data paths and operations within an access node.

FIG. 7A is a block diagram showing a logical view of the networking data paths and operations within an access node 17. As shown in the example of FIG. 7A, in some example implementations, each access node 17 implements at least four different operational networking components or functions: (1) a source (SF) component 30 operable to receive traffic from a set of servers 12 supported by the access node, (2) a source switching (SX) component 32 operable to switch source traffic to other source switching components of different access nodes 17 (possibly of different access node groups) or to core switches 22, (3) a destination switching (DX) component 34 operable to switch inbound traffic received from other source switching components or from cores switches 22 and (4) a destination (DF) component 36 operable to reorder packet flows and provide the packet flows to destination servers 12.

In some examples, the different operational networking components of access node 17 may perform flow-based switching and ECMP based load balancing for Transmission Control Protocol (TCP) packet flows. Typically, however, ECMP load balances poorly as it randomly hashes the flows to paths such that a few large flows may be assigned to the same path and severely imbalance the fabric. In addition, ECMP relies on local path decisions and does not use any feedback about possible congestion or link failure downstream for any of the chosen paths.

The techniques described in this disclosure introduce a new data transmission protocol referred to as a Fabric Control Protocol (FCP) that may be used by the different operational networking components of access node 17. FCP is an end-to-end admission control protocol in which a sender explicitly requests a receiver with the intention to transfer a certain number of bytes of payload data. In response, the receiver issues a grant based on its buffer resources, QoS, and/or a measure of fabric congestion.

For example, the FCP includes admission control mechanisms through which a source node requests permission before transmitting a packet on the fabric to a destination node. For example, the source node sends a request message to the destination node requesting a certain number of bytes to be transferred, and the destination node sends a grant message to the source node after reserving the egress bandwidth. In addition, instead of the flow-based switching and ECMP forwarding used to send all packets of a TCP flow on the same path to avoid packet reordering, the FCP enables packets of an individual packet flow to be sprayed to all available links between a source node and a destination node. The source node assigns a packet sequence number to each packet of the flow, and the destination node may use the packet sequence numbers to put the incoming packets of the same flow in order.

SF component 30 of access node 17 is considered a source node of the fabric. According to the disclosed techniques, for FCP traffic, SF component 30 is configured to spray its input bandwidth (e.g., 200 Gbps) over links to multiple SX components of access nodes within a logical rack. For example, as described in more detail with respect to FIG. 7B, SF component 30 may spray packets of the same flow across eight links to SX component 32 and seven other SX components of other access nodes within a logical rack. In some examples, SF component 30 may limit the links over which packets are sprayed based on information, accessible to access node 17, indicating that some links are inoperable or have failed. In such an example, SF component 30 may refrain from including in the links over which packets are sprayed those links that are identified as inoperable or failed. For non-FCP traffic, SF component 30 is configured to select one of the connected SX components to which to send packets of the same flow.

SX component 32 of access node 17 may receive incoming packets from multiple SF components of access nodes within the logical rack, e.g., SF component 30 and seven other SF components of other access nodes within the logical rack. For FCP traffic, SX component 32 is also configured to spray its incoming bandwidth over links to multiple core switches in the fabric. For example, as described in more detail with respect to FIG. 8, SX component 32 may spray its bandwidth across eight links to eight core switches. In some cases, SX component 32 may spray its bandwidth across eight links to four or eight intermediate devices, e.g., TOR Ethernet switches, electrical permutation devices, or optical permutation devices, which in turn forward traffic to the core switches. For non-FCP traffic, SX component 32 is configured to select one of the core switches to which to send packets of the same packet flow. Since the incoming bandwidth to SX component 32 and the outgoing bandwidth from SX component 32 is same (e.g., 200 Gbps), congestion should not occur at the SX stage even for a large number of packet flows.

DX component 34 of access node 17 may receive incoming packets from multiple core switches either directly or via one or more intermediate devices, e.g., TOR Ethernet switches, electrical permutation devices, or optical permutation devices. For example, DX component 34 may receive incoming packets from eight core switches, or four or eight intermediate devices. DX component 34 is configured to select a DF component to which to send the received packets. For example, DX component 34 may be connected to DF component 36 and seven other DF components of other access nodes within the logical rack. In some case, DX component 34 may become a congestion point because DX component 34 may receive a large amount of bandwidth (e.g., 200 Gbps) that is all to be sent to the same DF component. In the case of FCP traffic, DX component 34 may avoid long term congestion using the admission control mechanisms of FCP.

DF component 36 of access node 17 may receive incoming packets from multiple DX components of access nodes within the logical rack, e.g., DX component 34 and seven other DX components of other access nodes within the logical rack. DF component 36 is considered a destination node of the fabric. For FCP traffic, DF component 36 is configured to recorder packets of the same flow prior to transmitting the flow to a destination server 12.

In some examples, SX component 32 and DX component 34 of access node 17 may use the same forwarding table to perform packet switching. In this example, the personality of access node 17 and the nexthop identified by the forwarding table for the same destination IP address may depend on a source port type of the received data packet. For example, if a source packet is received from a SF component, access node 17 operates as SX component 32 and determines a nexthop to forward the source packet over the fabric toward a destination node. If a packet is received from a fabric-facing port, access node 17 operates as DX component 34 and determines a final nexthop to forward the incoming packet directly to a destination node. In some examples, the received packet may include an input tag that specifies its source port type.

Figure 7B:
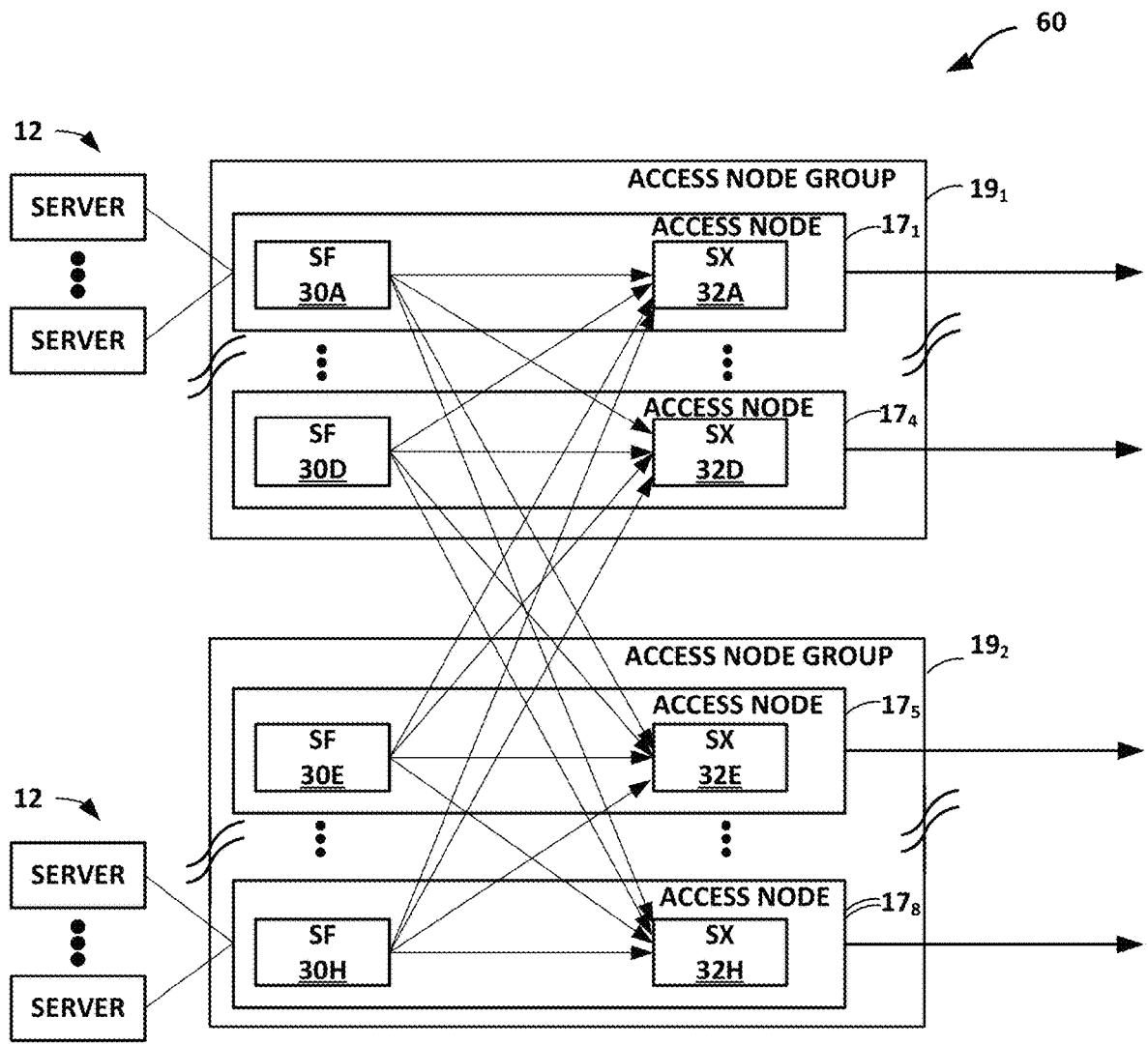
FIG. 7B is a block diagram illustrating an example first-level network fanout achieved between a set of access nodes within a logical rack.

A source access node 17 may maintain data reflecting failed data paths or ports between the source access node and switches 22. SF component 30 may, when spraying packets of the same flow over fabric 14, avoid spraying packets over data paths to a destination access node that are identified as failed. Further, in some examples, the destination access node 17 may also maintain data reflecting its own failed data paths or ports between the destination access node and switches 22. An SF component 30 (or an SX component 32) within the destination access node may include, in a grant message to the source access node, information about the failed data paths between the destination access node and switches 22. After the source access node receives the grant message, the SF component 30 of the source access node may, when spraying packets over fabric 14, further take into account the information about failed data paths received in the grant message. Accordingly, the source access node may also avoid spraying packets over data paths from the destination access node to the switches 22 that are identified as failed. In this way, the SF components 30 of both the source and destination access nodes may operate to provide an intelligent, resilient multi-path spraying of packets of the same flow based on failed data path information maintained by and/or accessible to both the source and destination access nodes. FIG. 7B is a block diagram illustrating an example first-level network fanout achieved between a set of access nodes $17_1$-$17_8$ within a logical rack 60. In the illustrated example of FIG. 7B, logical rack 60 includes two access node groups $19_1$ and $19_2$ containing eight access nodes $17_1$-$17_8$ and server nodes 12 supported by each of the access nodes.

As shown in FIG. 7B, SF components 30A-30H and SX components 32A-32H of access nodes 17 within logical rack 60 have full mesh connectivity in that each SF component 30 is connected to all of the SX components 32 of the eight access nodes 17 within logical rack 60. As described above, the eight access nodes 17 within logical rack 60 may be connected to each other by an 8-way mesh of electrical Ethernet connections. In the case of FCP traffic, SF components 30 of access nodes 17 within logical rack 60 apply spraying algorithms to spray packets for any given packet flow across all available links to SX components 32. In this way, SF components 30 need not necessarily perform a full lookup operation for L2/L3 switching of outbound packets of packet flows originating from servers 12. In other words, packets for a given packet flow may be received by an SF component 30, such as SF component 30A, and sprayed across some or all of the links to SX components 32 for the logical rack 60. In this way, access nodes 17 for a logical rack achieve a first-level fan out of, in this example, 1:8 and may do so, in some examples, without incurring any L2/L3 forwarding lookup relative to keying information in the packet headers. As such, packets for a single packet flow need not follow the same path when sprayed by a given SF component 30.

In some examples, and as further described herein, SF components 30 of access nodes 17 may limit the links to SX components over which packets are sprayed. In such an example, SF components may identify one or more links that have been assessed as failed, and SF components of access nodes 17 may avoid spraying packets over such links. In some examples, SF components may identify failed links based on information maintained in a data structure associated with an access node group.

Thus, according to the disclosed techniques, upon receiving source traffic from one of servers 12, SF component 30A implemented by access node $17_1$, for example, performs an 8-way spray of packets of the same flow across all available links to SX components 32 implemented by access nodes 17 included in logical rack 60. More specifically, SF component 30A sprays across one internal SX component 32A of the same access node $17_1$ and seven external SX components 32B-32H of the other access nodes $17_2$-$17_8$ within logical rack 60. In some implementations, this 8-way spray between SFs 30 and SXs 32 within logical rack 60 may be referred to as a first-stage spray. As described in other portions of this disclosure, a second-stage spray may be performed over a second-level network fanout within the switch fabric between access nodes 17 and core switches 22. For example, the second-stage spray may be performed through an intermediate device, such as a TOR Ethernet switch, an electric permutation device, or an optical permutation device.

In some examples, as described in more detail above, the first four access nodes $17_1$-$17_4$ may be included in a first access node group $19_1$ and the second four access nodes $17_4$-$17_8$ may be included in a second access node group $19_2$. The access nodes 17 within the first and second access node groups 19 may be connected to each other via a full-mesh in order to allow the 8-way spray between SFs 30 and SXs 32 within logical rack 60. In some examples, logical rack 60 including the two access nodes groups together with their supported servers 12 may be referred to as a half-rack or a half physical rack. In other examples, more or fewer access nodes may be connected together using full-mesh connectivity. In one example, sixteen access nodes 17 may be connected together in a full-mesh to enable a first-stage 16-way spray within a full physical rack.

Figure 8:
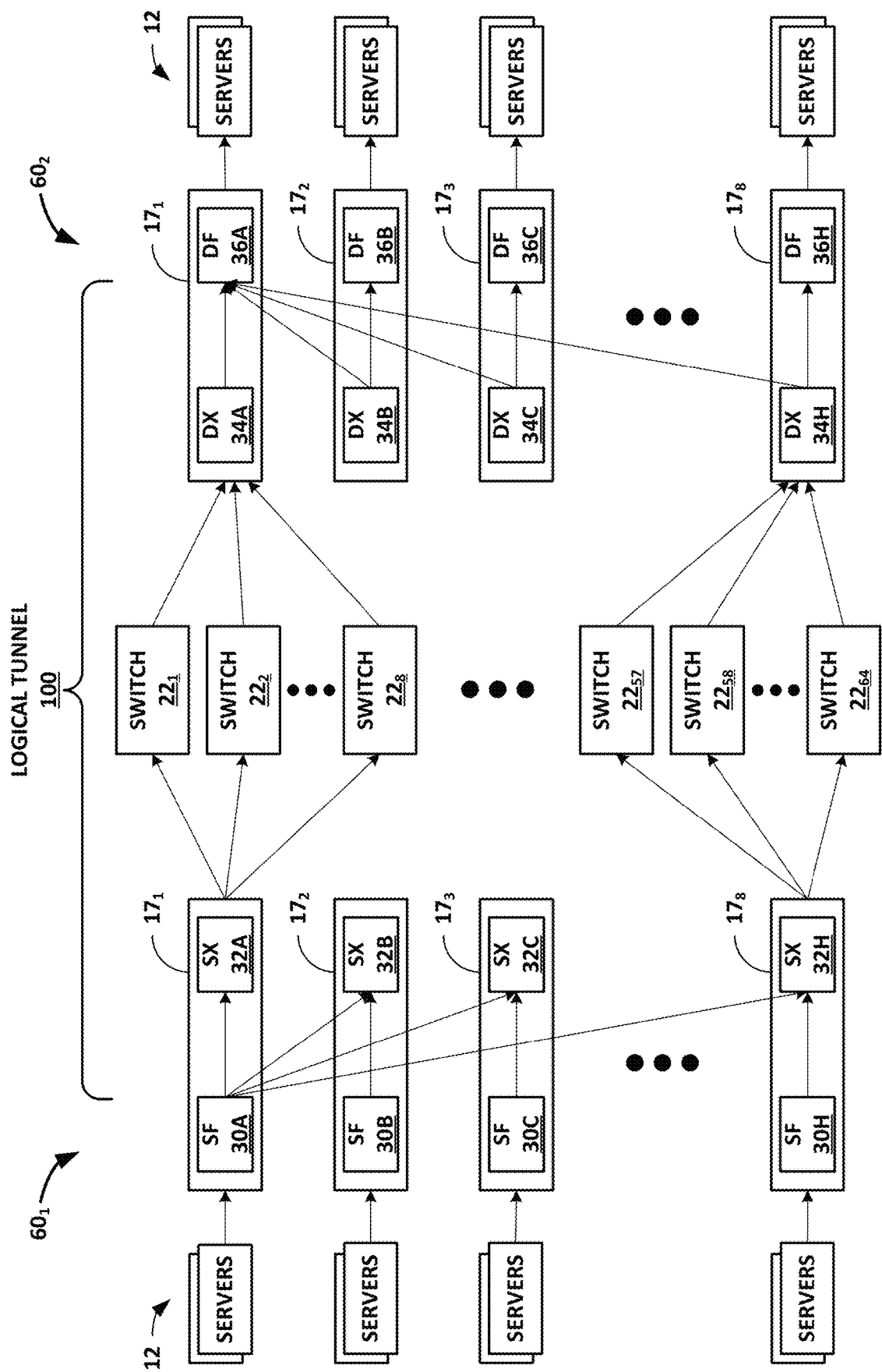
FIG. 8 is a block diagram illustrating an example multi-level network fanout across a data center switch fabric between access nodes.

FIG. 8 is a block diagram illustrating an example multi-level network fanout across a data center switch fabric between access nodes 17. In the illustrated example of FIG. 8, each of the logical racks 60 includes eight access nodes $17_1$-$17_8$ and server nodes 12 supported by each of the access nodes. The first logical rack $60_1$ is connected to the second logical rack $60_2$ through core switches 22 within the switch fabric. In some examples, the first logical rack $60_1$ and the second logical rack $60_2$ may be the same logical rack.

According to the disclosed techniques, the switch fabric comprises a FCP-based flow control and network communications within a network fabric. The network fabric may be visualized as including multiple channels, e.g., a request channel, a grant channel, a FCP data channel and a non-FCP data channel, as described in more detail with respect to FIG. 11. As illustrated in FIG. 8, the FCP data channel carries data packets via a logical tunnel 100 that includes all paths between a source node, e.g., SF component 30A of access node $17_1$, in a first logical rack $60_1$ and a destination node, e.g., DF component 36A of access node $17_1$, in a second logical rack $60_2$. The FCP data channel carries the data packets using the FCP protocol. The FCP packets are sprayed over the fabric from the source node to the destination node through a suitable load balancing scheme. FCP packets are not expected to be delivered in order, but the destination node may perform packet reordering. For example, packets of a traffic flow received from a source server 12 by SF component 30A of access node $17_1$ may be sprayed over some or all possible links within logical tunnel 100 toward DF component 36A of access node $17_1$. In some examples, DF component 36A is configured to reorder the received packets to recreate the packet flow prior to transmitting the packet flow to the destination server 12. In other examples, DF component 36A may not need to reorder the received packets of the packet flow prior to transmitting the packet flow to the destination server 12.

The request channel within the network fabric may be used to carry FCP request messages from the source node to the destination node. Similar to the FCP data packets, the FCP request messages may be sprayed over all available paths toward the destination node, but the request messages do not need to be reordered. In response, the grant channel within the network fabric may be used to carry FCP grant messages from the destination node to source node. The FCP grant messages may also be sprayed over all available paths toward the source node, and the grant messages do not need to be reordered. The non-FCP data channel within the network fabric carries data packets that do not use the FCP protocol. The non-FCP data packets may be forwarded or routed using ECMP based load balancing, and, for a given flow identified by a five tuple, the packets are expected to be delivered in order to the destination node.

The example of FIG. 8 illustrates both the first-level network fanout between the access nodes 17 within first logical rack $60_1$, as described above with respect to FIG. 7B, and a second-level network fanout between the access nodes 17 and the core switches 22. As described above with respect to FIGS. 3-4, the eight access nodes 17 within first logical rack $60_1$ are connected to core switches 22 using either electrical or optical Ethernet connections. The eight access nodes 17 within second logical rack $60_2$ are similarly connected to the core switches 22. In some examples, each of access nodes 17 may connect to eight of core switches 22. In the case of FCP traffic, SX components 32 of access nodes 17 within first logical rack $60_1$ apply spraying algorithms to spray packets for any given packet flow across all available paths to the core switches 22. In this way, the SX components 32 might not perform a full lookup operation for L2/L3 switching of received packets.

Upon receiving source FCP traffic from one of the servers 12, an SF component 30A of access node $17_1$ in the first logical rack $60_1$ performs an 8-way spray of packets of the FCP traffic flow across all available paths to SX components 32 implemented by the access nodes 17 in the first logical rack $60_1$. As further illustrated in FIG. 8, each of the SX components 32 then sprays the packets of the FCP traffic flow across all available paths to the core switches 22. In the illustrated example, the multi-level fanout is 8-by-8 and, therefore, supports up to sixty-four core switches $22_1$-$22_{64}$. In other examples, in which the first-level fanout is 1:16 within a full physical rack, the multi-level fanout may be 16-by16 and support up to 256 core switches.

Although illustrated in FIG. 8 as occurring directly between the access nodes 17 and the core switches 22, the second-level fanout may be performed through one or more TOR devices, such as top of rack Ethernet switches, optical permutation devices, or electrical permutation devices. The multi-level network fanout enables packets of a traffic flow received at any of the access nodes 17 within the first logical rack $60_1$ to reach core switches 22 for further forwarding to any of the access nodes 17 within the second logical rack $60_2$.

According to the disclosed techniques, in one example implementation, each of SF components 30 and SX components 32 uses an FCP spray engine configured to apply a suitable load balancing scheme to spray the packets of a given FCP packet flow across all available paths to a destination node. In some examples, the load balancing scheme may direct each of the FCP packets of the packet flow to one of the parallel data paths selected based on available bandwidth (i.e., least loaded path). In other examples, the load balancing scheme may direct each of the FCP packets of the packet flow to a randomly, pseudo-randomly, or round-robin selected one of the parallel data paths. In a further example, the load balancing scheme may direct each of the FCP packets of the packet flow to a weighted randomly selected one of the parallel data paths in proportion to available bandwidth in the switch fabric. In the example of the least loaded path selection, the FCP spray engine may track a number of bytes transmitted on each path in order to select a least loaded path on which to forward a packet. In addition, in the example of the weighted random path selection, the FCP spray engine may track path failures downstream to provide flow fairness by spraying packets in proportion to bandwidth weight on each active path. For example, if one of core switches $22_1$-$22_8$ connected to SX component 32A fails, then the path weights between SF component 30A and SX components 32 change to reflect the smaller proportion of switch fabric bandwidth available behind access node $17_1$ within first logical rack $60_1$. In this example, SF component 30A will spray to SX components 32 in proportion to the available bandwidth behind access nodes 17 within first logical rack $60_1$. More specifically, SF component 30A will spray fewer packets to SX component 32A then the other SX components 32 based on the reduced switch fabric bandwidth behind access node $17_1$ within first logical rack $60_1$ due to the failure of one of the connected core switches $22_1$-$22_8$. In this way, the spray of packets might not be uniform across the available paths toward the destination node, but bandwidth will be balanced across the active paths even over relatively short periods.

In this example, the source node, e.g., SF component 30A of access node $17_1$, within first logical rack $60_1$ sends a request message to the destination node, e.g., DF component 36A of access node $17_1$, within second logical rack $60_2$ requesting a certain weight or bandwidth and the destination node sends a grant message to the source node after reserving the egress bandwidth. The source node also determines whether any link failures have occurred between core switches 22 and logical rack $60_2$ that includes the destination node. The source node may then use all active links in proportion to the source and destination bandwidths. As an example, assume there are N links between the source node and the destination node each with source bandwidth $Sb_i$ and destination bandwidth $Db_i$ where i=1 . . . N. The actual bandwidth from the source nodes to the destination node is equal to min(Sb, Db) determined on a link-by-link basis in order to take failures into account. More specifically, the source bandwidth (Sb) is equal to $\Sigma_{i=1}^{N} Sb_i$, and destination bandwidth (Db) is equal to $\Sigma_{i=1}^{N} Db_i$, and the bandwidth $(b_i)$ of each link is equal to $\min(Sb_i, Db_i)$. The weight of the bandwidth used on each link is equal to $b_i/\Sigma_{i=1}^{N} b_i$.

In the case of FCP traffic, SF components 30 and SX components 32 use the FCP spray engine to distribute packets of the FCP traffic flow based on the load on each link toward the destination node, proportion to its weight. The spray engine maintains credit memory to keep track of credits (i.e., available bandwidth) per nexthop member link, uses packet length included in an FCP header to deduct credits (i.e., reduce available bandwidth), and associates a given packet to the one of the active links having the most credits (i.e., the least loaded link). In this way, for FCP packets, the SF components 30 and SX components 32 spray packets across member links of a nexthop for a destination node in proportion to the member links' bandwidth weights.

In another example implementation, each of SF components 30 or SX components 32 modifies a UDP portion of a header for each of the FCP packets of a packet flow in order to force the packet spraying downstream to core switches 22. More specifically, each of SF components 30 or SX components 32 is configured to randomly set a different UDP source port in the UDP portion of the header for each of the FCP packets of the packet flow. Each of core switches 22 computes a hash of N-fields from the UDP portion of the header for each of the FCP packets and, based on the randomly set UDP source port for each of the FCP packets, selects one of the parallel data paths on which to spray the FCP packet. This example implementation enables spraying by core switches 22 without modifying core switches 22 to understand the FCP.

Core switches 22 operate as the single hop along logical tunnel 100 between the source node, e.g., SF component 30A of access node $17_1$, in first logical rack $60_1$ and the destination node, e.g., DF component 36A of access node $17_1$, in the second logical rack $60_2$. Core switches 22 perform a full lookup operation for L2/L3 switching of the received packets. In this way, core switches 22 may forward all the packets for the same traffic flow toward the destination node, e.g., DF component 36A of access node $17_1$, in the second logical rack $60_2$ that supports the destination server 12. Although illustrated in FIG. 8 as occurring directly between the core switches 22 and destination access node $17_1$ of second logical rack $60_2$, the core switches 22 may forward all the packets for the same traffic flow to an intermediate TOR device that has connectivity to the destination node. In some examples, the intermediate TOR device may forward all the packet for the traffic flow directly to DX component 34A implemented by access node $17_1$ of second logical rack $60_2$. In other examples, the intermediate TOR device may be an optical or electrical permutation device configured to provide another fanout over which the packets can be sprayed between input and output ports of the permutation device. In this example, all or some portion of the DX components 34 of access nodes 17 of second logical rack $60_2$ may receive sprayed packets of the same traffic flow.

DX components 34 and DF components 36 of access nodes 17 within second logical rack $60_2$ also have full mesh connectivity in that each DX component 34 is connected to all of the DF components 36 within second logical rack $60_2$. When any of DX components 34 receive the packets of the traffic flow from core switches 22, the DX components 34 forward the packets on a direct path to DF component 36A of access node $17_1$. DF component 36A may perform a limited lookup necessary only to select the proper output port for forwarding the packets to the destination server 12. In response to receiving the packets of the traffic flow, DF component 36A of access node $17_1$ within second logical rack $60_2$ may reorder the packets of the traffic flow based on sequence numbers of the packets. As such, with respect to full routing tables for the data center, only the core switches 22 may need to perform full lookup operations. Thus, the switch fabric provides a highly-scalable, flat, high-speed interconnect in which servers are effectively one L2/L3 hop from any other server 12 within the data center.

More details on the data center network architecture and interconnected access node illustrated in FIGS. 1-8 are available in U.S. patent application Ser. No. 15/939,227, filed Mar. 28, 2018, entitled "Non-Blocking Any-to-Any Data Center Network with Packet Spraying Over Multiple Alternate Data Paths,", the entire content of which is incorporated herein by reference.

A brief description of FCP and one example of its operation with respect to FIG. 8 is included here. In the example of FIG. 8, access nodes 17 are fabric end points (FEPs) to the network fabric, which is made up of switching elements, e.g., core switches 22, arranged in a leaf-spine topology. The network fabric allows one access node 17 to communicate with another one through multiple paths. Core switches 22 inside the network have shallow packet buffers. The cross-sectional bandwidth of the network fabric is equal to or greater than the sum of all end point bandwidths. In this way, if each access node 17 limits the incoming data rate to the network fabric, none of the paths inside the network fabric should be congested long term with very high probability.

As described above, FCP data packets are sent from a source node, e.g., SF component 30A of access node $17_1$ within first logical rack $60_1$, to a destination node, e.g., DF component 36A of access node $17_2$ within second logical rack $60_2$, via logical tunnel 100. Before any traffic is sent over tunnel 100 using FCP, the connection must be established between the end points. A control plane protocol executed by access nodes 17 may be used to set up a pair of tunnels, one in each direction, between the two FCP end points. The FCP tunnels are optionally secured (e.g., encrypted and authenticated). Tunnel 100 is considered to be unidirectional from the source node to the destination node, and a FCP partner tunnel may be established in the other direction from the destination node to the source node. The control plane protocol negotiates the capabilities (e.g., block size, maximum transmission unit (MTU) size, etc.) of both end points, and establishes the FCP connection between the end points by setting up tunnel 100 and its partner tunnel and an initializing queue state context for each tunnel.

Each of the end points is assigned a source tunnel ID and a corresponding destination tunnel ID. At each end point, a queue ID for a given tunnel queue is derived based on the assigned tunnel ID and priority. For example, each FCP end point may allocate a local tunnel handle from a pool of handles and communicate the handle to its FCP connection partner end point. The FCP partner tunnel handle is stored in a lookup table and referenced from the local tunnel handle. For the source end point, e.g., access node $17_1$ within first logical rack $60_1$, a source queue is identified by the local tunnel ID and priority, and a destination tunnel ID is identified from the lookup table based on the local tunnel ID. Similarly, for the destination end point, e.g., access node $17_1$ within second logical rack $60_2$, a destination queue is identified by the local tunnel ID and priority, and a source tunnel ID is identified from the lookup table based on the local tunnel ID.

FCP tunnel queues are defined as buckets of independent traffic streams that use FCP to transport payload across the network fabric. An FCP queue for a given tunnel is identified by the tunnel ID and priority, and the tunnel ID is identified by the source/destination end point pair for the given tunnel. Alternatively, the end points may use a mapping table to derive the tunnel ID and priority based on an internal FCP queue ID for the given tunnel. In some examples, an network fabric tunnel, e.g., logical tunnel 100, may support 1, 2, 4, or 8 queues per tunnel. The number of queues per tunnel is a network fabric property and may be configured at the time of deployment. All tunnels within the fabric may support the same number of queues per tunnel. Each end point may support a maximum of 16,000 queues.

When the source node is communicating with the destination node, the source node encapsulates the packets using an FCP over UDP encapsulation. The FCP header carries fields identifying tunnel IDs, queue IDs, packet sequence numbers (PSNs) for packets, and request, grant, and data block sequence numbers between the two end points. At the destination node, the incoming tunnel ID is unique for all packets from the specific source node. The tunnel encapsulation carries the packet forwarding as well as the reordering information used by the destination node. A single tunnel carries packets for one or multiple queues between the source and destination nodes. Only the packets within the single tunnel are reordered based on sequence number tags that span across the queues of the same tunnel. The source node tags the packets with tunnel PSNs when they are sent over the tunnel toward the destination node. The destination node may reorder the packets based on the tunnel ID and the PSNs. At the end of the reorder, the destination node strips the tunnel encapsulation and forwards the packets to the respective destination queues.

An example of how an IP packet entering FCP tunnel 100 at a source end point is transmitted to a destination end point is described here. A source server 12 having an IP address of A0 sends an IP packet for a destination server 12 having an IP address of B0. The source FCP endpoint, e.g., access node $17_1$ within first logical rack $60_1$, transmits an FCP request packet with source IP address A and destination IP address B. The FCP request packet has an FCP header to carry the Request Block Number (RBN) and other fields. The FCP request packet is transmitted over UDP over IP. The destination FCP end point, e.g., access node $17_1$ within second logical rack $60_2$, sends a FCP grant packet back to the source FCP end point. The FCP grant packet has an FCP header to carry the Grant Block Number (GBN) and other fields. The FCP grant packet may include information about failed ports and/or failed data paths for connections between access node $17_1$ within the second logical rack $60_2$ and some or all of the switches 22. The FCP grant packet is transmitted over UDP over IP. The source end point transmits the FCP data packet after receiving the FCP grant packet. The source end point appends a new (IP+UDP+FCP) data header on the input data packet. The destination end point removes the appended (IP+UDP+FCP) data header before delivering the packet to the destination host server.

Figure 9:
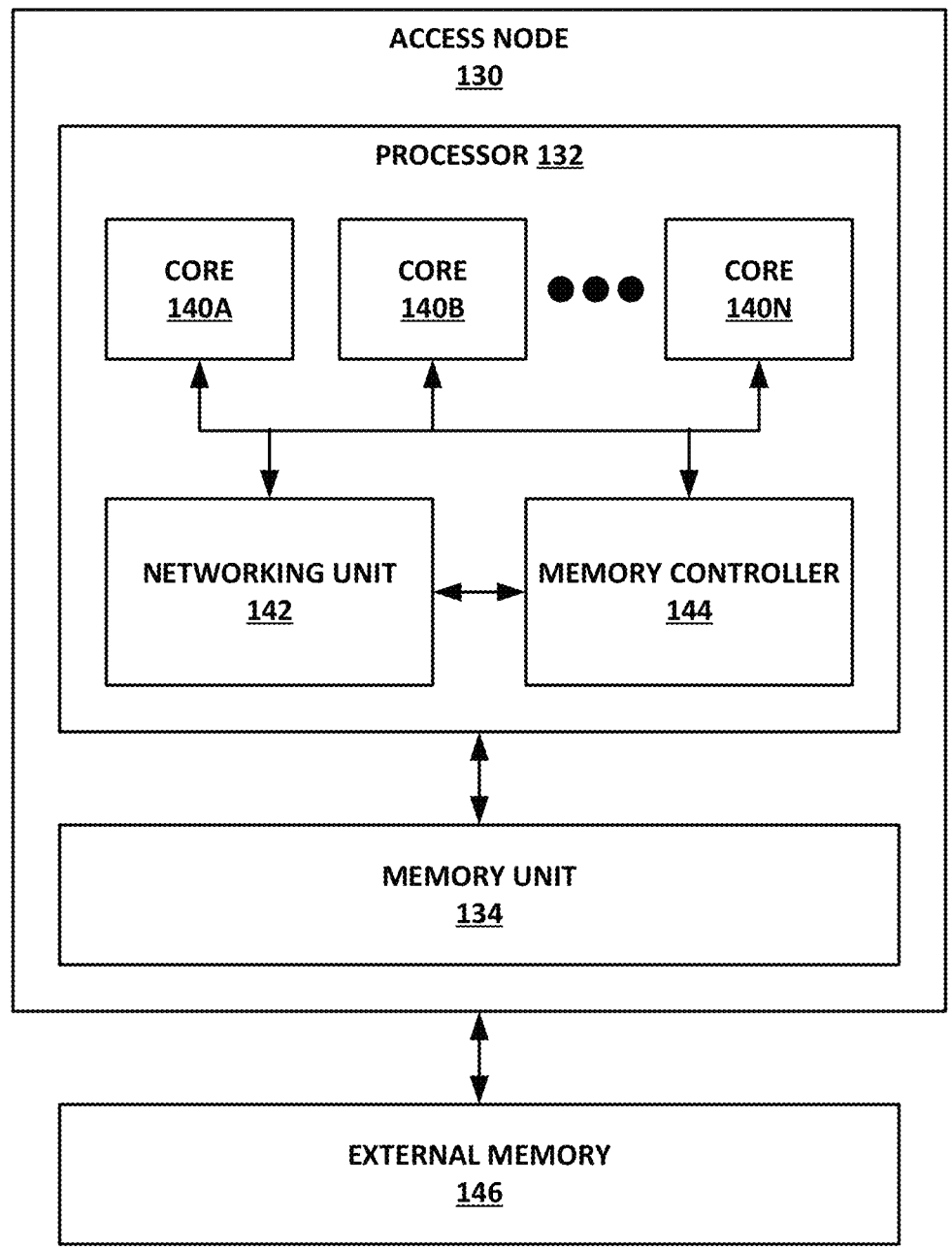
FIG. 9 is a block diagram illustrating an example access node including a networking unit and two or more processing cores.

In some examples, when transferring the FCP data packets, the source access node avoids use of paths within tunnel 100 that it has determined are failed paths or that have been identified as failed paths in the information included within the FCP grant packet. Such information may include failed paths that are external to switch fabric 14, such as any failed paths between DX components 34 and DF components 36 within an access node group 19 or a logical rack 60. FIG. 9 is a block diagram illustrating an example access node 130 including a networking unit 142 and two or more processing cores 140A-140N (collectively "cores 140"). Access node 130 generally represents a hardware chip implemented in digital logic circuitry. As various examples, access node 130 may be provided as an integrated circuit mounted on a motherboard of a computing device or installed on a card connected to the motherboard of the computing device via PCIe, or the like. In some examples, access node 130 may be an integrated circuit within an access node group (e.g., one of access node groups 19) configured as a standalone network device for installation within a compute rack, a storage rack, or a converged rack.

Access node 130 may operate substantially similar to any of the access nodes 17 of FIGS. 1-8. Thus, access node 130 may be communicatively coupled to a data center fabric (e.g., switch fabric 14), one or more server devices (e.g., server nodes 12 or servers 52), storage media (e.g., solid state storage 41 of FIG. 3), one or more network devices, random access memory, or the like, e.g., via PCIe, Ethernet (wired or wireless), or other such communication media in order to interconnect each of these various elements.

In the illustrated example of FIG. 9, access node 130 includes a multi-core processor 132 having a plurality of cores 140 coupled to an on-chip memory unit 134. In some examples, memory unit 134 may include a cache memory. In other examples, memory unit 134 may include two types of memory or memory devices, namely coherent cache memory and non-coherent buffer memory. More details on the bifurcated memory system are available in U.S. patent application Ser. No. 15/949,892, filed Apr. 10, 2018, and titled "Relay Consistent Memory Management in a Multiple Processor System,", the entire content of which is incorporated herein by reference.

Processor 132 includes a plurality of cores 140. In some examples, processor 132 may include at least two processing cores. In one specific example, processor 132 may include six processing cores 140. Access node 130, or alternatively, processor 132 also includes a networking unit 142 and a memory controller 144. As illustrated in FIG. 9, each of cores 140, networking unit 142, memory controller 144 and memory unit 134 are communicatively coupled to each other. In addition, access node 130 is coupled to an off-chip external memory 146. External memory 146 may comprise random access memory (RAM) or dynamic random access memory (DRAM).

In this example, access node 130 represents a high performance, hyper-converged network, storage, and data processor and input/output hub. Cores 140 may comprise one or more of MIPS (microprocessor without interlocked pipeline stages) cores, ARM (advanced RISC (reduced instruction set computing) machine) cores, PowerPC (performance optimization with enhanced RISC—performance computing) cores, RISC-V (RISC five) cores, or CISC (complex instruction set computing or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

As described herein, a processing architecture utilizing access node 130 may be especially efficient for stream processing applications and environments. For example, stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

In some examples, the plurality of cores 140 may be capable of processing a plurality of events related to each data packet of one or more data packets, received by networking unit 142, in a sequential manner using one or more "work units." In general, work units are sets of data exchanged between cores 140 and networking unit 142 where each work unit may represent one or more of the events related to a given data packet of a stream. As one example, a work unit (WU) is a container that is associated with a stream state and used to describe (i.e. point to) data within a stream (stored). For example, work units may dynamically originate within a peripheral unit coupled to the multi-processor system (e.g. injected by a networking unit, a host unit, or a solid state drive interface), or within a processor itself, in association with one or more streams of data, and terminate at another peripheral unit or another processor of the system. The work unit is associated with an amount of work that is relevant to the entity executing the work unit for processing a respective portion of a stream. In some examples, one or more processing cores 40 of access node 130 may be configured to execute program instructions using a work unit (WU) stack.

In some examples, in processing the plurality of events related to each data packet, a first one of the plurality of cores 140, e.g., core 140A, may process a first event of the plurality of events. Moreover, first core 140A may provide to a second one of plurality of cores 140, e.g., core 140B, a first work unit of the one or more work units. Furthermore, second core 140B may process a second event of the plurality of events in response to receiving the first work unit from first core 140B.

Access node 130 may act as a combination of a switch/router and a number of network interface cards. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. In this way, access node 130 supports one or more high-speed network interfaces, e.g., Ethernet ports, without the need for a separate network interface card (NIC). Although not illustrated in FIG. 9, access node 130 may include one or more interfaces for connectivity to host devices (e.g., servers) and data storage devices, e.g., solid state drives (SSDs) via PCIe lanes. Access node 130 may also include one or more high bandwidth interfaces for connectivity to off-chip external memory 146.

In some examples, processor 132 may further include one or more accelerators (not shown) configured to perform acceleration for various data-processing functions, such as look-ups, matrix multiplication, cryptography, compression, regular expressions, or the like. For example, the accelerators may comprise hardware implementations of look-up engines, matrix multipliers, cryptographic engines, compression engines, regular expression interpreters, or the like.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to a coherent cache memory or a non-coherent buffer memory of memory unit 134. In some examples, memory controller 144 may map the accesses based on one or more of an address range, an instruction or an operation code within the instruction, a special access, or a combination thereof.

More details on access nodes, including their operation and example architectures, are available in U.S. patent application Ser. No. 16/031,676, filed Jul. 10, 2018, entitled "Access Node for Data Centers,", the entire content of which is incorporated herein by reference.

Figure 10:
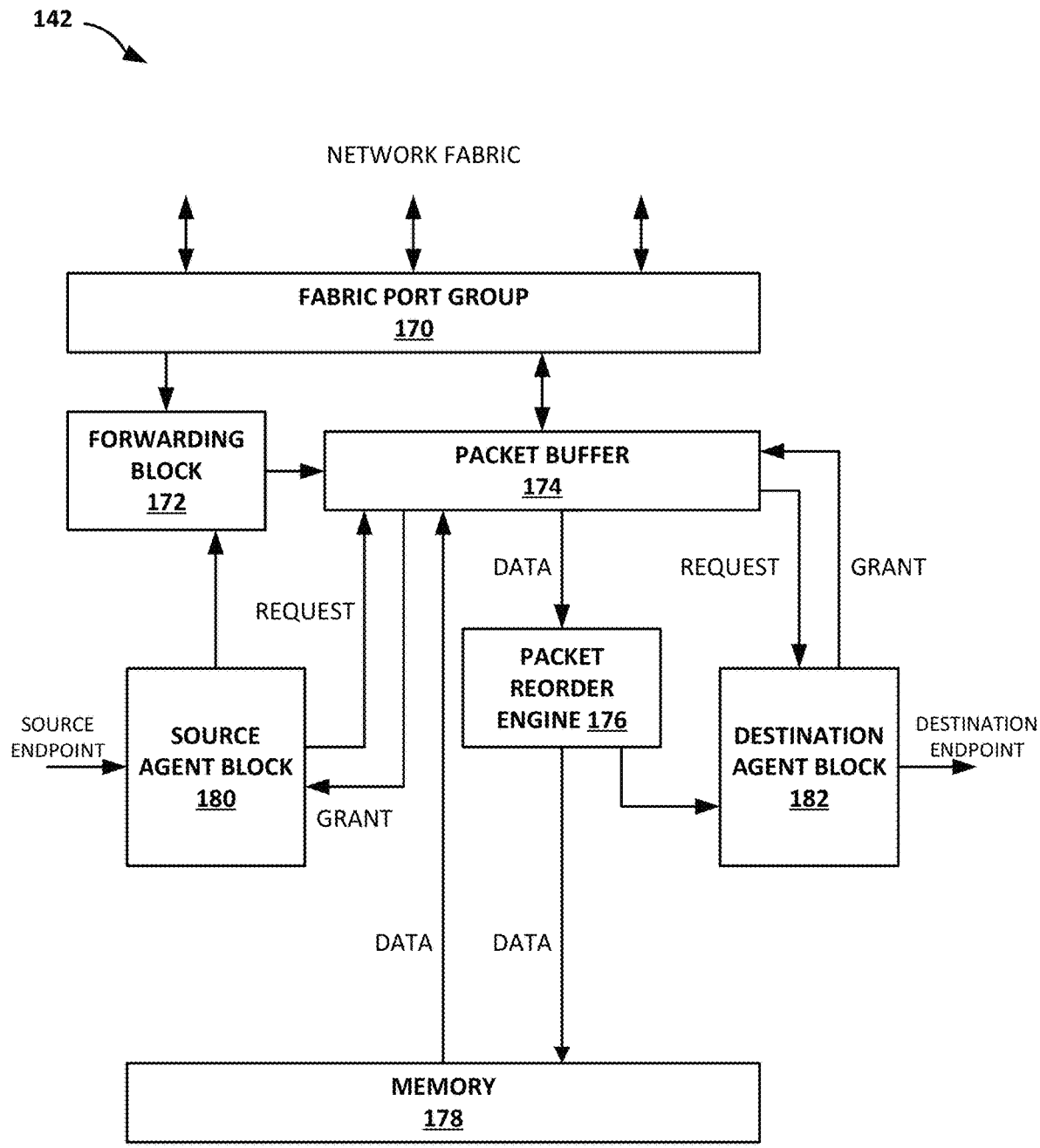
FIG. 10 is a block diagram illustrating an example networking unit of an access node.

FIG. 10 is a block diagram illustrating an example networking unit 142 of access node 130 from FIG. 9, in more detail. Networking unit (NU) 142 exposes Ethernet ports, also referred to herein as fabric ports, to connect access node 130 to the switch fabric. NU 142 connects to processing cores 140 and external servers and/or storage devices, such as SSD devices, via endpoint ports. NU 142 supports switching packets from one fabric port to another fabric port without storing the complete packet (i.e., transit switching), which helps to achieve low latency for transit traffic. In this way, NU 142 enables creation of a fabric of access nodes with or without external switching elements. NU 142 may fulfill the following roles: (1) transmit packets from PCIe devices (servers and/or SSDs) to the switch fabric, and receive packets from the switch fabric and send them to the PCIe devices; (2) support switching packets from one fabric port to another fabric port; (3) support sending network control packets to an access node controller; and (4) implement FCP tunneling.

As illustrated in FIG. 10, NU 142 includes a fabric port group (FPG) 170. In other examples, NU 142 may include multiple FPGs 170. FPG 170 includes two or more fabric ports connected to the switch network. FPG 170 is configured to receive Ethernet packets from the switch fabric and transmit packets to the switch fabric. FPG 170 may be responsible for generating and receiving link pause and priority flow control (PFC) frames. In the receive direction, FPG 170 may have a flexible parser to parse incoming bytes and generate a parsed result vector (PRV). In the transmit direction, FPG 170 may have a packet rewrite sub-unit to modify the outgoing packets based on the rewrite instructions stored with the packet.

NU 142 has a single forwarding block 172 to forward the packets coming from the fabric ports of FPG 170 and from the endpoint ports of source agent block 180. Forwarding block 172 has a fixed pipeline that is configured to process one PRV, received from FPG 170 and/or source agent block 180, every cycle. The forwarding pipeline of forwarding block 172 may include the following processing sections: attributes, ingress filter, packet lookup, nexthop resolution, egress filter, packet replication, and statistics.

In the attributes processing section, different forwarding attributes, such as virtual layer 2 interface, virtual routing interface, and traffic class, are determined. These forwarding attributes are passed to further processing sections in the pipeline. In the ingress filter processing section, a search key can be prepared from different fields of a PRV and searched against programmed rules. The ingress filter block can be used to modify the normal forwarding behavior using the set of rules. In the packet lookup processing section, certain fields of the PRV are looked up in tables to determine the nexthop index. The packet lookup block supports exact match and longest prefix match lookups.

In the nexthop resolution processing section, nexthop instructions are resolved and the destination egress port and the egress queue are determined. The nexthop resolution block supports different nexthops such as final nexthop, indirect nexthop, equal cost multi-path (ECMP) nexthop, and weighted cost multi-path (WCMP) nexthop. The final nexthop stores the information of the egress stream and how egress packets should be rewritten. The indirect nexthop may be used by software to embed an address of the nexthop in memory, which can be used to perform an atomic nexthop update.

The WECMP nexthop may have multiple members and be used to spray packets over all links between SF components and SX components of access nodes (see, e.g., SF components 30 and SX components 32 of FIG. 8). Due to failure of links between rack and spine switches, SFs may need to spray among SXs based on the active links for a destination rack IP address. For FCP traffic, the FCP spray engine sprays packets based on the load on each link proportional to its weight. The WECMP nexthop stores an address of the credits memory, and the FCP spray engine selects the link with the most credits and deducts its credits based on packet length. The ECMP nexthop may have multiple members and be used to spray packets over all links connected to spine switches of access nodes (see, e.g., core switches 22 of FIG. 8). For FCP traffic, the FCP spray engine again sprays packets based on the load on each link proportional to its weight. The ECMP nexthop stores an address of the credits memory, and the FCP spray engine selects the link with the most credits and deducts its credits based on packet length.

In the egress filter processing section, packets are filtered based on the egress port and the egress queue. The egress filter block cannot change the egress destination or egress queue, but can sample or mirror packets using the rule sets. If any of the processing stages has determined to create a copy of a packet, the packet replication block generates its associated data. NU 142 can create only one extra copy of the incoming packet. The statistics processing section has a set of counters to collect statistics for network management purpose. The statistics block also supports metering to control packet rate to some of the ports or queues.

NU 142 also includes a packet buffer 174 to store packets for port bandwidth oversubscription. Packet buffer 174 may be used to store three kinds of packets: (1) transmit packets received from processing cores 140 on the endpoint ports of source agent block 180 to be transmitted to the fabric ports of FPG 170; (2) receive packets received from the fabric ports of FPG 170 to be transmitted to the processing cores 140 via the endpoint ports of destination agent block 182; and (3) transit packets coming on the fabric ports of FPG 170 and leaving on the fabric ports of FPG 170.

Packet buffer 174 keeps track of memory usage for traffic in different directions and priority. Based on a programmed profile, packet buffer 174 may decide to drop a packet if an egress port or queue is very congested, assert flow control to a work unit scheduler, or send pause frames to the other end. The key features supported by packet buffer 174 may include: cut-through for transit packets, weighted random early detection (WRED) drops for non-explicit congestion notification (ECN)-aware packets, ECN marking for ECN aware packets, input and output based buffer resource management, and PFC support.

Packet buffer 174 may have the following sub-units: packet writer, packet memory, cell link list manager, packet queue manager, packet scheduler, packet reader, resource manager, and cell free pool. The packet writer sub-unit collects flow control units (flits) coming from FPG 170, creates cells and writes to the packet memory. The packet writer sub-unit gets a Forwarding Result Vector (FRV) from forwarding block 172. The packet memory sub-unit is a collection of memory banks. In one example, the packet memory is made of 16K cells with each cell having a size of 256 bytes made of four microcells each having a size of 64 bytes. Banks inside the packet memory may be of 2pp (1 write port and 1 read port) type. The packet memory may have raw bandwidth of 1 Tbps write and 1 Tbps read bandwidth. FPG 170 has guaranteed slots to write and to read packets from the packet memory. The endpoint ports of source agent block 180 and destination agent block 182 may use the remaining bandwidth.

The cell link list manager sub-unit maintains a list of cells to represent packets. The cell link list manager may be built of 1 write and 1 read port memory. The packet queue manager sub-unit maintains a queue of packet descriptors for egress nodes. The packet scheduler sub-unit schedules a packet based on different priorities among the queues. For example, the packet scheduler may be a three-level scheduler: Port, Channel, Queues. In one example, each FPG port of FPG 170 has sixteen queues, and each endpoint port of source agent block 180 and destination agent block 182 has eight queues.

For scheduled packets, the packet reader sub-unit reads cells from packet memory and sends them to FPG 170. In some examples, the first 64 bytes of the packet may carry rewrite information. The resource manager sub-unit keeps track of usage of packet memory for different pools and queues. The packet writer block consults the resource manager block to determine if a packet should be dropped. The resource manager block may be responsible to assert flow control to a work unit scheduler or send PFC frames to the ports. The cell free pool sub-unit manages a free pool of packet buffer cell pointers. The cell free pool allocates cell pointers when the packet writer block wants to write a new cell to the packet buffer memory, and deallocates cell pointers when the packet reader block dequeues a cell from the packet buffer memory.

NU 142 includes source agent control block 180 and destination agent control block 182 that, collectively, are responsible for FCP control packets. In other examples, source agent control block 180 and destination control block 182 may comprise a single control block. Source agent control block 180 generates FCP request messages for every tunnel. In response to FCP grant messages received in response to the FCP request messages, source agent block 180 instructs packet buffer 174 to send FCP data packets based on the amount of bandwidth allocated by the FCP grant messages. In some examples, NU 142 includes an endpoint transmit pipe (not shown) that sends packets to packet buffer 174. The endpoint transmit pipe may perform the following functions: packet spraying, packet fetching from memory 178, packet segmentation based on programmed MTU size, packet encapsulation, packet encryption, and packet parsing to create a PRV. When packet spraying, the endpoint transmit pipe may spray packets, including packets for the same packet flow, over multiple paths, and in some examples, the endpoint transmit pipe may determine, based on information included within the FCP grant message, whether some of those multiple paths should be avoided. Further, in some examples, the endpoint transmit pipe may be included in source agent block 180 or packet buffer 174.

Destination agent control block 182 generates FCP grant messages for every tunnel. In response to received FCP request messages, destination agent block 182 updates a state of the tunnel and sends FCP grant messages allocating bandwidth on the tunnel, as appropriate. In response to FCP data packets received in response to the FCP grant messages, packet buffer 174 sends the received data packets to packet reorder engine 176 for reordering and reassembly before storage in memory 178. Memory 178 may comprise an on-chip memory or an external, off-chip memory. Memory 178 may comprise RAM or DRAM. In some examples, NU 142 includes an endpoint receive pipe (not shown) that receives packets from packet buffer 174. The endpoint receive pipe may perform the following functions: packet decryption, packet parsing to create a PRV, flow key generation based on the PRV, determination of one of processing cores 140 for the incoming packet and allocation of a buffer handle in buffer memory, send the incoming FCP request and grant packets to destination agent block 182, and write the incoming data packets to buffer memory with the allocated buffer handle.

Figure 11:
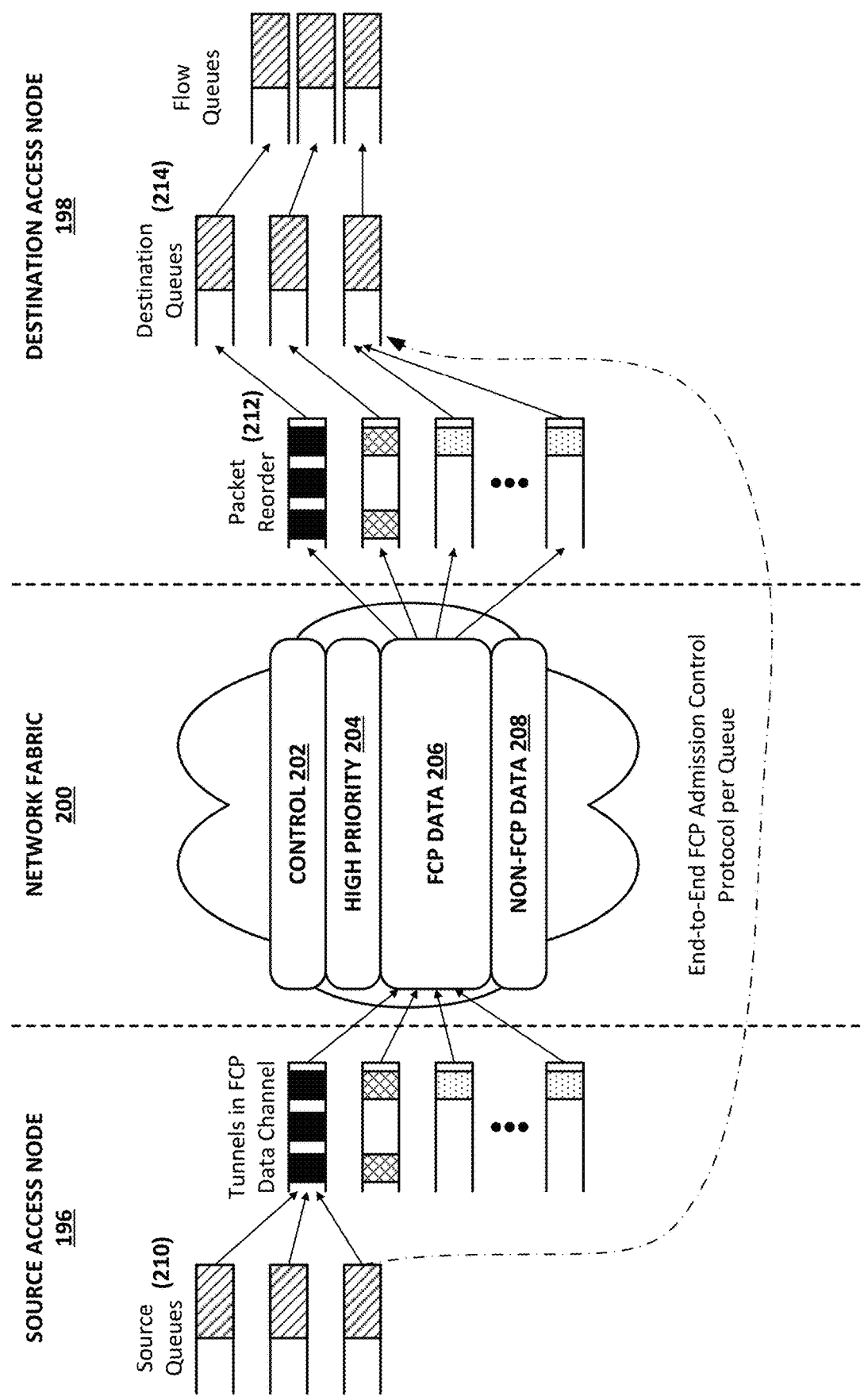
FIG. 11 is a conceptual diagram illustrating an example network fabric between a source access node and a destination access node.

FIG. 11 is a conceptual diagram illustrating example FCP-based flow control and network communication within a network fabric 200, such as a data center switch fabric or other packet-based network. As illustrated, when using FCP, network fabric 200 is be visualized as a fabric with multiple channels between a source access node 196 and a destination access node 198. The FCP data channel 206 carries traffic for multiple tunnels and for multiple queues within each tunnel. Each channel is designated for specific type of traffic. The various channels and their attributes are described below.

The control channel 202 has a strict priority over all other channels. The expected use for this channel is to carry grant messages. The grant messages are sprayed over all available paths towards the requesting or source access node, e.g., source access node 196. They are not expected to arrive at the requesting node in order. The control channel 202 is rate limited to minimize overhead on network fabric 200. The high priority channel 204 has a higher priority over data and non-FCP channels. The high priority channel 204 is used to carry FCP request messages. The messages are sprayed over all available paths towards the granting or destination node, e.g., destination access node 198 and are not expected to arrive at the granting node in order. The high priority channel 204 is rate limited to minimize overhead on the fabric.

The FCP data channel 206 carries data packets using FCP. The data channel 206 has a higher priority over a non-FCP data channel. The FCP packets are sprayed over network fabric 200 through a suitable load balancing scheme. The FCP packets are not expected to be delivered at destination access node 198 in order and destination access node 198 is expected to have a packet reorder implementation. The non-FCP data channel 208 carries data packets that do not use FCP. The non-FCP data channel 208 has the lowest priority over all other channels. The FCP data channel 206 carries a strict priority over the non-FCP data channel 208. The non-FCP packets, therefore, use opportunistic bandwidth in the network and, depending upon the requirements, the FCP data rate can be controlled through request/grant pacing schemes allowing non-FCP traffic to gain a required share of the bandwidth. The non-FCP data packets are forwarded/routed using ECMP based load balancing and for a given flow (identified by a five tuple) the packets are expected to be always delivered in order at destination access node 198. The non-FCP data channel 208 may have multiple queues with any prioritization/QoS applied at the time of scheduling the packets to the fabric. The non-FCP data channel 208 may support 8-queues per link-port based on priority of the packet flow.

The FCP data packets are sent between source access node 196 and destination access node 198 via a logical tunnel. The tunnel is considered unidirectional and, for a destination, the incoming tunnel identifier (ID) is unique for all packets from a specific source node. The tunnel encapsulation carries the packet forwarding as well as the reordering information. A single tunnel carries packets for one or multiple source queues (210) between source access node 196 and destination access node 198. Only the packets within a tunnel are reordered based on sequence number tags that span across queues of the same tunnel. The packets are tagged with a tunnel packet sequence number (PSN) when they are sent from the source access node 196. The destination access node 198 reorders the packets based on the tunnel ID and PSN (212). The tunnel encapsulation is stripped at the end of reorder and packets are forwarded to respective destination queues (214).

The queues are defined as buckets of independent traffic streams that use FCP to transport payload across network fabric 200. An FCP queue is identified by the [Tunnel-ID, Priority] whereas the Tunnel ID is identified by the source/ destination access node pair. Alternatively, the access nodes 196, 198 may use a mapping table to derive Tunnel ID, and queue/priority pair based on internal FCP queue ID. A FCP fabric tunnel may support 1, 2, 4, or 8 queues per tunnel. The number of queues per tunnel is a FCP fabric property and should be configured at the time of deployment. An access node may support a maximum of 16K queues. All tunnels within the network fabric 200 may support the same number of queues per tunnel.

As indicated above, the FCP messages include request, grant, and data messages. The request message is generated when source access node 196 wishes to transfer a certain amount of data to destination access node 198. The request message carries a destination tunnel ID, queue ID, request block number (RBN) of the queue, and metadata. The request message is sent over high priority channel 204 on the network fabric 200 and the message is sprayed over all available paths. The metadata may be used to indicate a request retry among other things. The grant message is generated when destination access node 198 responds to a request from source access node 196 to transfer a certain amount of data. The grant message carries the source tunnel ID, queue ID, grant block number (GBN) of the queue, metadata (scale factor, etc.), and timestamp. In some examples, the grant message may also include information about the health and/or connectivity of the ports of destination access node 198, and/or the health and/or connectivity of data paths between destination access node 198 and fabric 200 and/or source access node 196.

The grant message is sent over control channel 202 on the fabric 200 and the message is sprayed over all available paths. Where information about the health of ports and/or paths is available (e.g., received in an FCP grant message), the data messages, including packets for the same packet flow, may be sprayed over only those paths that are identified as valid or healthy. FCP data packets carry an FCP header containing the destination tunnel ID, queue ID, packet sequence number (PSN) and data block number (DBN), and metadata. The FCP data packets may have an average size of ~800B. The maximum transmission unit (MTU) for FCP may be ~1.6 KB-2 KB to minimize packet latency jitter in the fabric. The control packet structure of request and grant messages and the FCP data packet structure are described in U.S. Provisional Patent Application No. 62/566,060, filed Sep. 29, 2017, the entire content of which is incorporated herein by reference.

Figure 12:
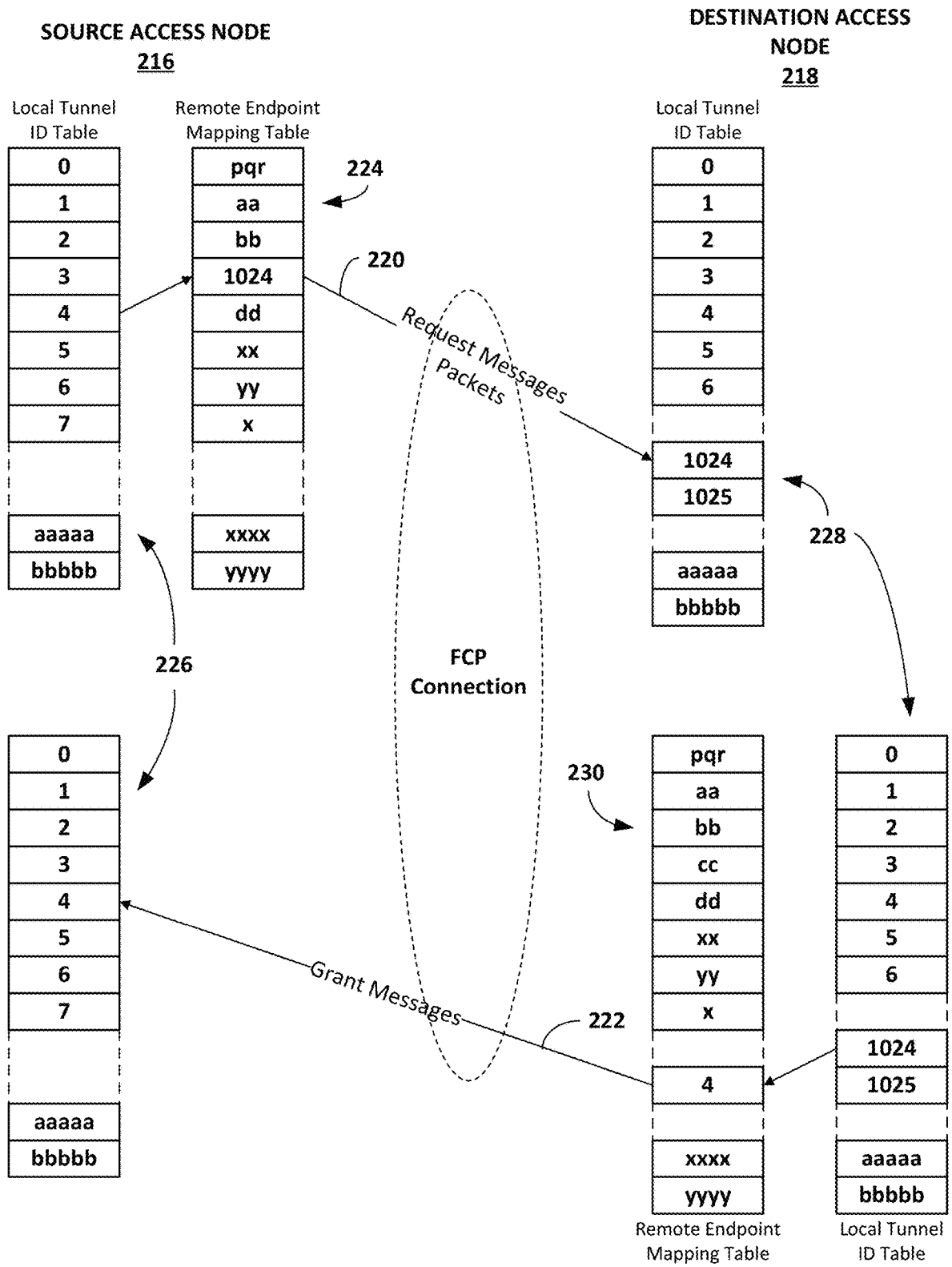
FIG. 12 is a conceptual diagram illustrating an example fabric control protocol queue pair structure between source and destination access nodes.

FIG. 12 is a conceptual diagram illustrating an example FCP queue pair structure between source and destination access nodes. FCP is an end-to-end admission control protocol. The sender explicitly requests the receiver with intention to transfer a certain number of payload data. The receiver issues a grant based on its buffer resources, QoS, a measure of fabric congestion, and/or information about the health and/or operability of the ports of the receiver or the paths leading from the receiver. A fabric endpoint (FEP) node is a node that connects to the fabric made of switching elements (leaf-spine topology). The fabric allows one endpoint to communicate with the other one through multiple paths. Switching elements inside the fabric have shallow packet buffers. The cross-section bandwidth of the fabric is equal or more to the sum of all fabric endpoints' bandwidth. If each fabric endpoint limits the incoming data rate to the fabric, none of the paths inside fabric should be congested for long term with high probability.

As illustrated in FIG. 12, FCP sets up a pair of tunnels 220, 222 between two FCP endpoints (i.e., source access node 216 and destination access node 218) as each tunnel 220, 222 is considered to be uni-directional. Each node 216, 218 has been assigned a source tunnel ID and a corresponding destination tunnel ID. The queue ID is derived based on assigned Tunnel-ID, priority at each of the endpoints. When one endpoint is communicating with the other endpoint, it encapsulates the packets using a UDP+FCP encapsulation. Each node 216, 218 communicates from a local queue to a remote queue through the set of tunnels 220, 222. The FCP header carries fields identifying tunnel IDs, queue-ID, packet sequence numbers for packets, and request, grant, and data block sequence numbers between source access node 216 and destination access node 218.

Before any traffic may be sent using FCP, a connection must be established between the two endpoints 216, 218. A control plane protocol negotiates the capabilities of both the endpoints (e.g., block size, MTU size, etc.) and establishes a FCP connection between them by setting up tunnels 220, 222 and initializing queue state context. Each endpoint 216, 218 allocates a local tunnel handle from a pool of handles and communicates the handle to its the FCP connection partner (e.g., in FIG. 12, destination access node 218 is the FCP connection partner of the source access node 216). The local tunnel handle may be stored in a local tunnel ID table (e.g., local tunnel ID table 226 of source access node 216 and local tunnel ID table 228 of destination access node 218). The FCP partner tunnel handle is stored in a lookup table (e.g., mapping table 224 of source access node 216, and mapping table 230 of destination access node 218) and referenced from the local tunnel handle.

For the sender, the source queue is identified by [local Tunnel-ID, Priority], and the destination tunnel ID is identified by the MAP[local Tunnel ID]. For the receiver, the queue is identified by [local Tunnel ID, priority]. As illustrated in FIG. 12, source access node 216 has a source or local tunnel ID of "4" in local tunnel ID table 226, which maps to a remote or destination tunnel ID of "1024" in mapping table 224. Conversely, destination access node 218 has a source or local tunnel ID of "1024" in local tunnel ID table 228, which maps to a remote or destination tunnel ID of "4" in mapping table 230.

Figure 13A:
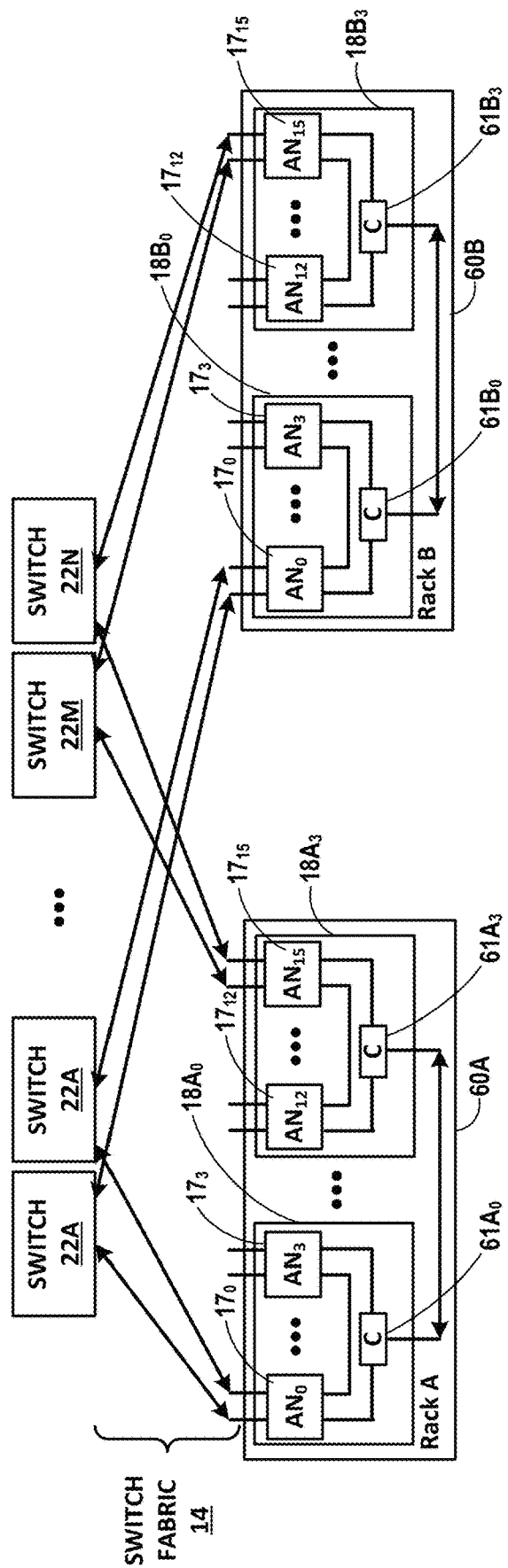
FIG. 13A and FIG. 13B are block diagrams illustrating an example arrangement of a plurality of logical racks connected to a plurality of example core switches, in accordance with one or more aspects of the present disclosure.
Figure 13B:
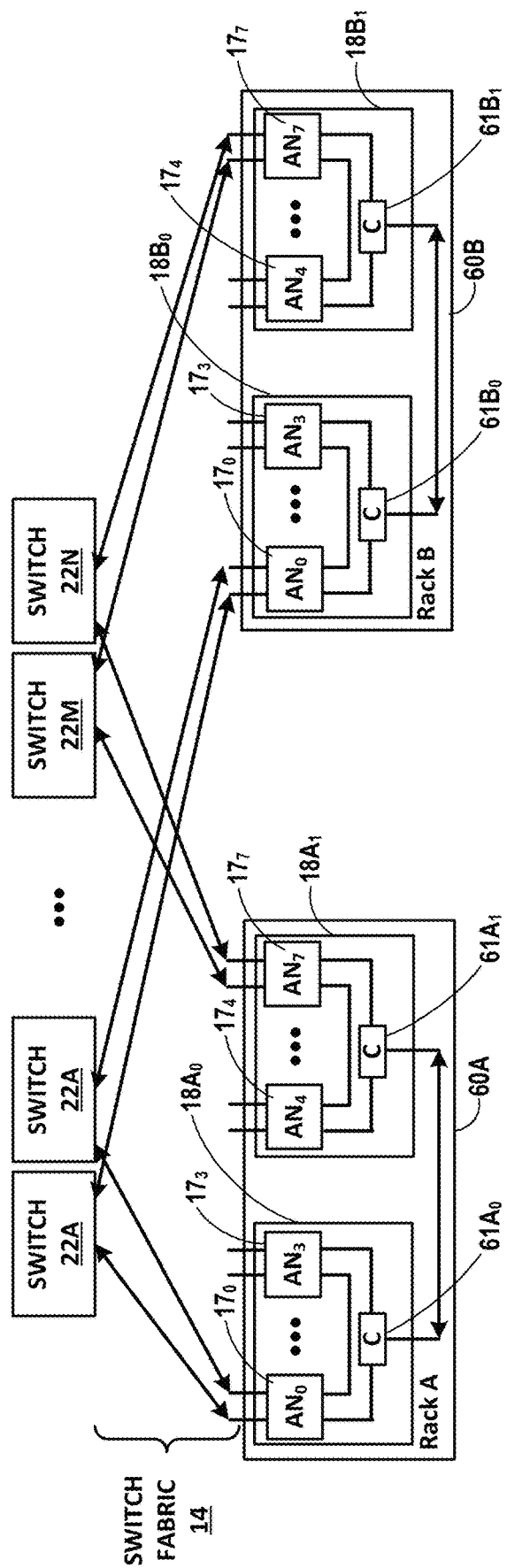

FIG. 13A and FIG. 13B are block diagrams illustrating an example arrangement of a plurality of logical racks connected to a plurality of example core switches, in accordance with one or more aspects of the present disclosure. In the example of FIG. 13A, logical rack 60A and logical rack 60B ("logical racks 60") are connected, via switch fabric 14, to any number of core switches 22 (i.e., core switch 22A through core switch 22N, intended to represent any number of core switches 22). Each of logical racks 60 includes a plurality of access node cards 18, which may each be implemented as a circuit board that includes a plurality of access nodes 17 and one or more retimer/cross-point devices 61 to aggregate links between access nodes 17 within each access node card 18. Each access node card 18 may correspond to the access node groups of FIGS. 2-6, and although described as access node "cards," one or more of cards 18 may be implemented in any other appropriate fashion. In the example of FIG. 13A, each of logical racks 60 includes four access node cards 18 (e.g., logical rack 60A includes access node card 18A-0 through access node card 18A-3). Each of access node cards 18 includes four access nodes 17 (e.g., access node card 18A-0 includes access node 17-0 through access node 17-3). Accordingly, in the example of FIG. 13A, each of logical racks 60 includes a total of sixteen access nodes 17.

In the example of FIG. 13B, each of logical racks 60 includes two access node cards 18 (e.g., logical rack 60A includes access node card 18A-0 and access node card 18A-1), and each of access node cards 18 includes four access nodes 17 (e.g., access node card 18A includes access node 17-0 through access node 17-3). Accordingly, each of logical racks 60 in FIG. 13B includes a total of eight access nodes 17. In other examples, each of logical racks 60 could include any number of access node cards 18 and each of access node cards 18 could include any number of access nodes 17. Further, each of access node cards 18 may also include an on-board processor and SSDs (not shown), as well as other devices and/or circuitry. And as in FIG. 13A, each access node card 18 in FIG. 13B may correspond to the access node groups of FIGS. 2-6, and/or may be implemented in any appropriate fashion.

Each of access nodes 17 illustrated in FIG. 13A and FIG. 13B may include two types of ports: local ports and global ports. Local ports connect access nodes 17 within each logical rack 60. Global ports connect access nodes 17 to core switches 22. In one example, each of access nodes 17 may have eight global ports, each connected to one of core switches 22. In some examples, connectivity of logical racks 60 to core switches 22 may be symmetric. In some examples, each of logical racks 60 may include eight or sixteen access nodes 17.

In the example of FIG. 13A and FIG. 13B, a number of types of failures may occur that impact the connectivity among access nodes 17, and between access nodes 17 and core switches 22. For instance, failures within logical racks 60 may include a failure of the path between access node cards 18, or a failure of one or more of retimer/cross-point devices 61 or one or more access nodes 17 within access node cards 18. When any such failure within a logical rack occurs, that failure may impact connectivity between multiple access nodes 17 within an access node card. Further, failures between logical racks 60 and one or more core switches 22 may occur (e.g., a failure of connecting wires between one or more an access node 17 to core switches 22, failure of an optical transceiver, failure of an optical permutation device, or a failure of any of core switches 22). In such examples, connectivity from logical racks 60 to one or more core switches 22 may be impacted.

As described herein, one or more logical racks 60 may transfer data between access nodes 17 in different logical racks 60 using shared information about failed data paths. For instance, with reference to the example of FIG. 13A, logical rack 60A determines information about connectivity between each of access nodes 17 within logical racks 60A and each of core switches 22. Such information may include information about the degree to which the path between each of access nodes 17 and each of core switches 22 has connectivity. Logical rack 60A may detect the failure in any appropriate manner, and may include detecting a failure of any access nodes 17 resulting from a reset or a software reboot, or detecting a failure in a connection between access nodes 17, or a failure of one or more of retimer/cross-point devices 61. In some examples, a failure may be detected as a result of signal loss or as a local or remote fault. A failure may be detected quickly (e.g., on the order of 100 ns or less) in some cases if a serializer/deserializer phase locked loop inside the fabric port group 170 (see FIG. 10) becomes out-of-sync.

Similarly, logical rack 60B may determine information about connectivity between each of access nodes 17 within logical rack 60B and core switches 22 and detect any failures. Such information may correspondingly include information about the degree to which the path between each of access nodes 17 within logical racks 60B has connectivity to each of core switches 22. Logical rack 60A and logical rack 60B may share the determined information about the paths and use the information when transferring data from, for example, access node 17-0 within logical rack 60A to access node 17-12 within logical rack 60B. In such an example, access node 17-0 may spray data over multiple paths between access node 17-0 within logical rack 60A and access node 17-12 within logical rack 60B, but may avoid spraying data on those paths that have been identified as a failed path or otherwise identified as lacking connectivity.

Figure 14A:
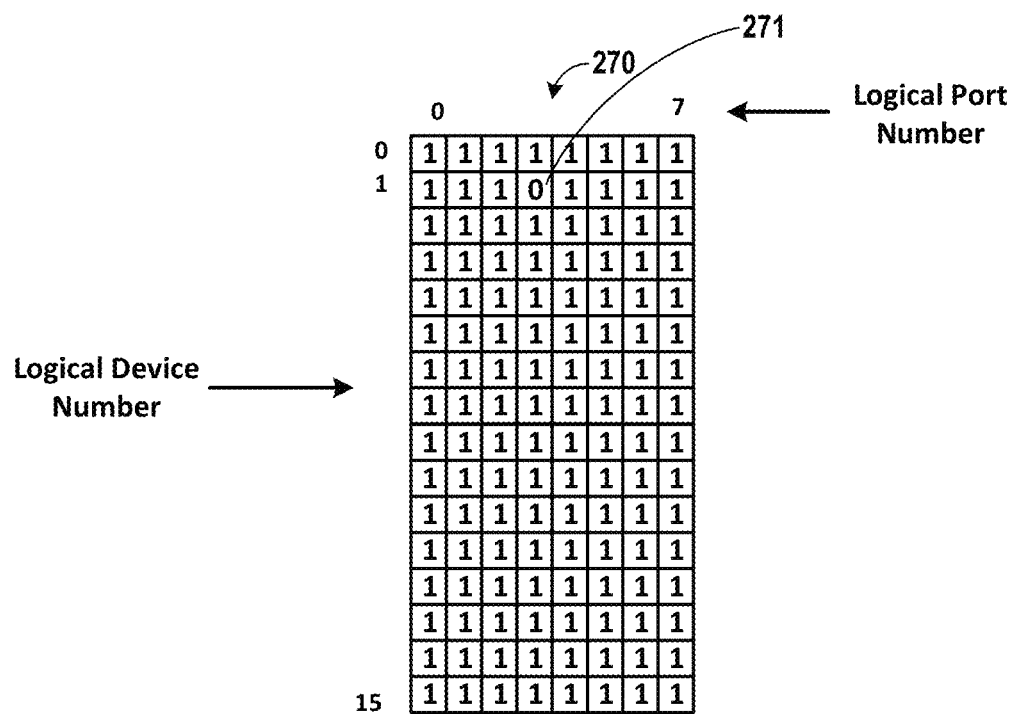
FIG. 14A and FIG. 14B are conceptual diagrams illustrating example global port health vectors associated with an example logical rack, in accordance with one or more aspects of the present disclosure.

FIG. 14A is a conceptual diagram illustrating an example global port health vector associated with an example logical rack, in accordance with one or more aspects of the present disclosure. In general, each access node 17 may maintain a local representation of its view of the global port health vector, and may continuously update its global port health vector responsive to health status information received from other access nodes in grant replies. For example, each access node may send path failure information in the form of global port health vector 270, or a subset thereof, in each reply to a grant request. Upon receipt, the requesting access node extracts global port health vector 270 from the grant reply and utilizes the information to influence forwarding of packets to the destination access node associated with the particular requested FCP tunnel. Other mechanisms may be used to distribute and update global port health vector 270 across access nodes.

The example of FIG. 14A illustrates a matrix, or global port health vector 270, of connectivity information associated with, for example, logical rack 60A of FIG. 13A. In this example, each of the sixteen access nodes 17 illustrated in logical rack 60A of FIG. 13A (access node 17-1 through access node 17-15) are represented by a row within global port health vector 270 (illustrated as a matrix in FIG. 14A). In the example of FIG. 13A, each of access nodes 17 within logical rack 60A was described as including eight ports, and each port is represented by a column within global port health vector 270. Accordingly, global port health vector 270 corresponding to logical rack 60A of FIG. 13A may be represented by a 16×8 matrix, with each cell within the matrix including information about the status or health of a port on one of access nodes 17 within logical rack 60A.

Each cell within global port health vector 270 may be a single bit of information that indicates whether the port for a given access node, as represented by the corresponding row and column within global port health vector 270, is healthy (e.g., "1") or failed ("0"). Although a single bit for each port is used in the example of FIG. 14A, in other examples, additional information might be provided (e.g., degrees of failure) using more than one bit for each port. Further, although illustrated as a matrix of information, global port health vector 270 of FIG. 14A may alternatively be represented through a single bit vector (e.g., a one-dimensional vector) having a length of 128 bits. In general, each port corresponds to connectivity path to a different one of core switches 22, but in some examples, more than one port might be associated with the same core switch.

In accordance with one or more aspects of the present disclosure, logical rack 60A may generate global port health vector 270. For instance, with reference to the example of FIG. 13A and FIG. 14A, each of access nodes 17 collects information about the validity, health, or connectivity of each of its global ports. Logical rack 60A (i.e., logic or a device within logical rack 60A) collects information from each of access nodes 17 within logical rack 60A. Logical rack 60A generates global port health vector 270 based on the information collected from (or published by) each of access nodes 17 within logical rack 60A. Alternatively, or in addition, global port health vector 270 may be generated based on other information about the validity, health, or connectivity of global ports within logical rack 60A, including administrator input.

Each of access nodes 17 may limit, based on information maintained by each access node within global port health vector 270 as learned from other access nodes via received grant replies, the paths within switch fabric 14 over which data packets are sprayed when data is transferred to a destination device. For instance, still referring to FIG. 13A and FIG. 14A, access node 17-1 (not specifically shown in FIG. 13A) within logical rack 60A seeks to transfer data to access node 17-15 within logical rack 60B. Access node 17-1 consults global port health vector 270 for logical rack 60A, which it may maintain locally and continuously update responsive to grant replies received from other access nodes, to determine the current health status of each of the global ports in logical rack 60A. Access node 17-1 determines that its port 3 has a failed path status, since the value of the corresponding cell within global port health vector 270 is "0," as shown in FIG. 14A. A forwarding block within access node 17-1 (e.g., SF 30 of FIG. 7A) may determine, based on the failed path information reflected in global port health vector 270 for logical rack 60A, that the request rate limiter should be adjusted. In some examples, the adjustment may be made based on the proportion of the number of set (i.e., "1") bits in global port health vector 270 relative to the number of all bits within the global port health vector 270 (e.g., number of set bits÷maximum possible set bits). Accordingly, access node 17-1 sends, to access node 17-15 over switch fabric 14, a request message that includes the calculated request rate limiter, which takes into account the failed path indicated in vector 270.

Access node 17-15 receives the request message and consults its own global port health vector (not shown) for logical rack 60B, to determine the current health of the ports in logical rack 60B. The access nodes and ports represented by global port health vector for logical rack 60B are different than those represented by the global port health vector 270 for logical rack 60A shown in FIG. 14A. Therefore, while the global port health vector for logical rack 60B may have the same dimensions as the global port health vector 270 for logical rack 60A, the data will not likely be the same.

In a manner similar to that described in connection with access node 17-1, a forwarding block within access node 17-15 determines, based on any failed path information reflected the global port health vector for logical rack 60B, whether a grant data rate limiter should be adjusted. If any of the stream state or paths represented by the global port health vector for logical rack 60B are down or failed, access node 17-15 may adjust the grant data rate limiter. In some examples, a forwarding block within access node 17-15 may, in a manner similar to that described above, calculate the grant data rate limiter based on the proportion of set bits (representing valid paths) to the maximum number of set bits in the global port health vector for logical rack 60B. Adjusting rate limiters in the manner described (both by the source and destination access nodes), may help ensure that access node 17-1 does not make requests faster than it can transmit and that access node 17-15 does not generate grant packets faster than it can receives the data.

Access node 17-15 generates a grant message. If any of the stream state or data paths represented by the global port health vector for logical rack 60B are down or failed, access node 17-15 inserts the global port health vector 270 for logical rack 60B in the grant message.

Access node 17-1 receives a grant packet or grant message from destination access node 17-15, authorizing the data transfer. A grant receiver block within access node 17-1 extracts any global port health vector for logical rack 60B included within the grant message. Access node 17-1 identifies, based on its local global port health vector (i.e., global port health vector 270 for logical rack 60A) and the remote global port health vector (i.e., the global port health vector extracted from the grant message) any failed paths. Access node 17-1 transfers data to access node 17-15 by spraying data over multiple paths within switch fabric 14, but access node 17-1 avoids spraying data over the path corresponding to port 3 of access node 17-1, since global port health vector 270 of FIG. 14A identifies that path as failed.

In some examples, the grant receiver block within access node 17-1 includes the extracted global port health vector for logical rack 60B with FCP data packets in order to influence the FCP spray engine in the source rack (e.g., SF 30 and SX 32 of FIG. 7A). In such examples, the global port health vector may be used to select the hardware nexthop structure within the forwarding block of the source access node 17-1 (e.g., by SX 32) so as to influence packet spraying in hardware when the packet is forwarded.

Figure 14B:
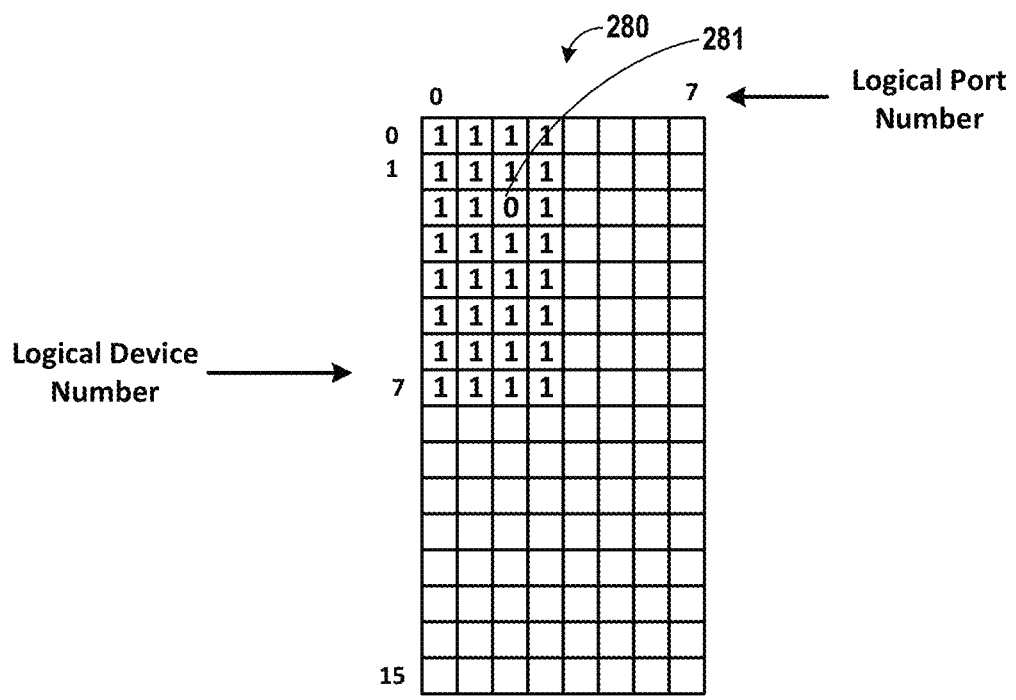

The techniques illustrated in the examples described herein may apply on a per-tunnel basis. For instance, adjusting rate limiters by both the source and destination access nodes may apply to a single FCP tunnel. Different rate limiters may apply to other FCP tunnels or to FCP tunnels established between other access nodes. Similarly, use of both the local and remote global port health vectors (i.e. global port health vectors for logical racks 60A and 60B, respectively), may also apply on a per-tunnel basis, and might only be used to influence how packets for the corresponding tunnel. For other tunnels established in response to a request and grant message, a different set of global port health vectors may apply, and therefore may influence, in a different manner, how packets are sprayed. FIG. 14B is a conceptual diagram illustrating an example global port health vector associated with an example logical rack, in accordance with one or more aspects of the present disclosure. The example of FIG. 14B illustrates a matrix, or global port health vector 280, of connectivity information associated with, for example, logical rack 60A of FIG. 13B. The example of FIG. 14B differs from that of FIG. 14A in that global port health vector 280 represents connectivity information for a logical rack that has eight access nodes 17 (corresponding to logical rack 60A of FIG. 13B) rather than sixteen access nodes 17 (corresponding to logical rack 60A of FIG. 13A). Accordingly, FIG. 14B has data for only eight rows, as opposed to the sixteen rows of FIG. 14A. Further, in FIG. 14B, each of the access nodes 17 in FIG. 13B includes only four global ports. Therefore, global port health vector 280 of FIG. 14B has data for only four columns, as opposed to the eight columns of FIG. 14A. As in FIG. 14A, each cell of global port health vector 280 in FIG. 14B may be a single bit of information that indicates whether the port for a given access node, as represented by the corresponding row and column within global port health vector 280 is healthy (e.g., "1") or failed ("0").

In the example of FIG. 14B, global port health vector 280 could be represented by an 8×4 matrix, as opposed to the larger 16×8 matrix. Although global port health vector 280 may be represented by a smaller data structure than global port health vector 270, both global port health vector 270 and global port health vector 280 may, in some examples, be implemented using a fixed sized matrix, where the fixed size matrix corresponds to the maximum number of access nodes 17 and global ports for each of access nodes 17 within a logical rack. In other words, the 16×8 matrix illustrated in both FIG. 14A and FIG. 14B may, in some examples, represent the largest matrix needed for any implementation of a logical rack. In other examples, a larger or smaller fixed-size matrix may be used.

Figure 14C:
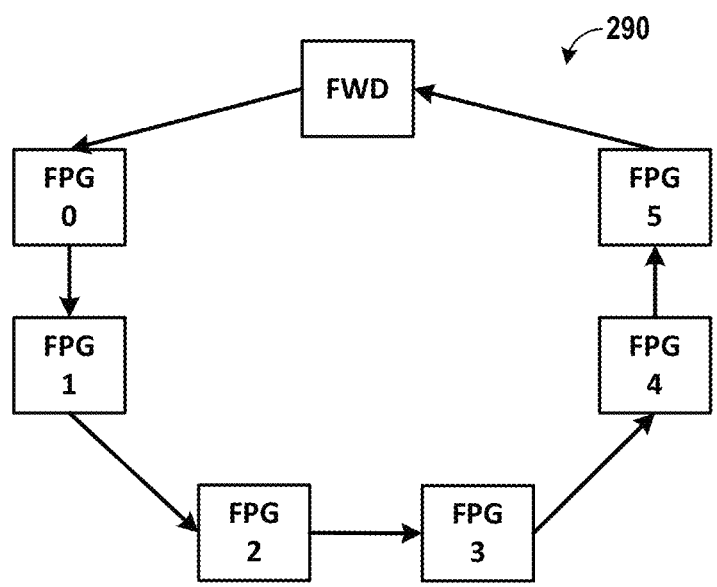
FIG. 14C is a conceptual diagram illustrating a ring structure used to inform fabric port group blocks about link failures, in accordance with one or more aspects of the present disclosure.

FIG. 14C is a conceptual diagram illustrating a ring structure used to inform fabric port group blocks about link failures, in accordance with one or more aspects of the present disclosure. In some examples, failure detection and populating data structures such as global port health vector 270 and global port health vector 280 may be performed based on sharing information among access nodes 17.

For instance, in the example of FIG. 14C, a broadcast ring 290 is illustrated that, in some examples, includes all ports within each fabric port group 170 and forwarding block 172 of each of the access nodes 17 (see FIG. 10). Such a ring 290 may be a separate on-chip network used to propagate information about link or path failures. For instance, forwarding block 172 may initiate a transaction on the broadcast ring 290 by placing a fabric port group stream number and status information on the ring. After a device comes out of reset and software activates the broadcast ring 290, forwarding block 172 initiates transactions (filling up the pipeline) on the bus. Each of fabric port group 170 may then advertise its stream state (e.g., global health port vector) in the appropriate or matching slot number. In the example shown, ring 290 has a size of seven bits.

Figure 14D:
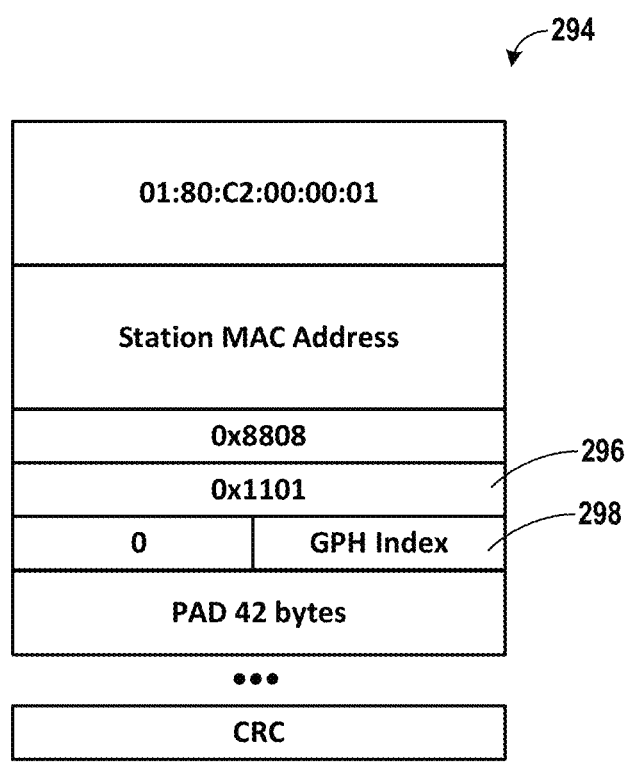
FIG. 14D is a conceptual illustration of a fault signal frame structure, in accordance with one or more aspects of the present disclosure
Figure 15A:
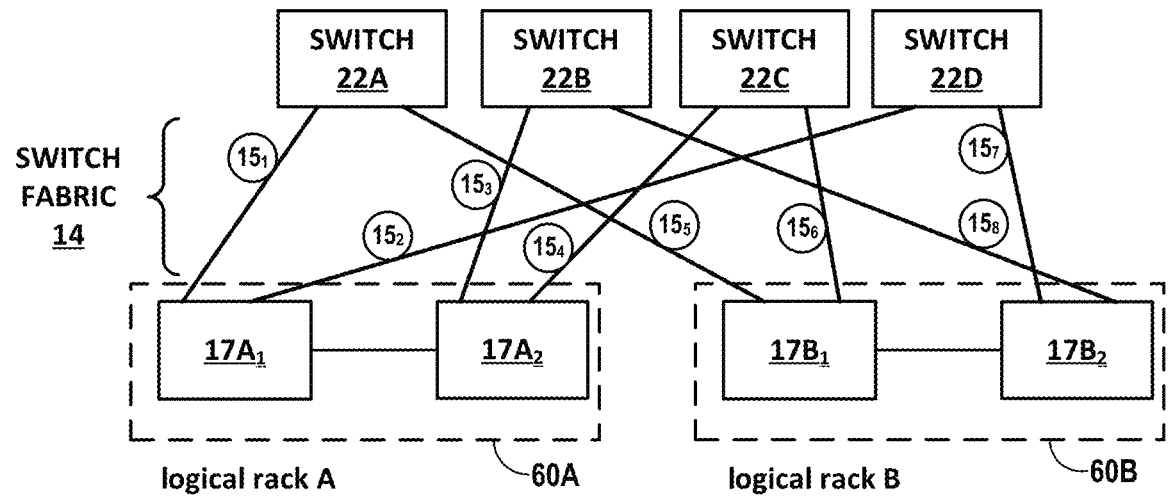
FIG. 15A and FIG. 15B are conceptual diagrams illustrating an example system in which information about port health is used to affect the manner in which data is transferred from one access node to another access node, in accordance with one or more aspects of the present disclosure.
Figure 15B:
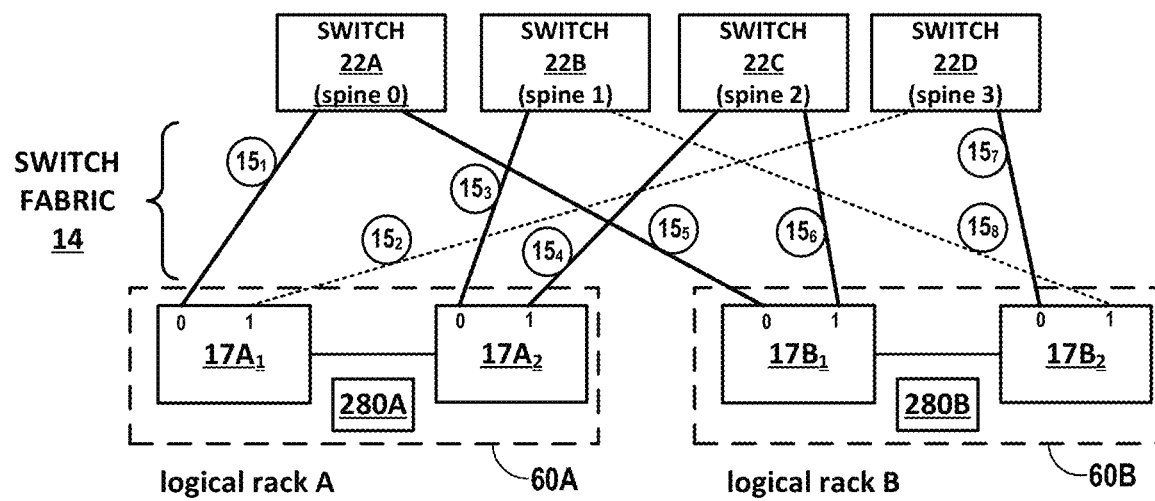

FIG. 14D is a conceptual illustration of a fault signal frame structure, in accordance with one or more aspects of the present disclosure. In some examples, when a spine link to an access node 17 goes down, the access node 17 sends a fault signal frame 294 is to other access nodes 17 within the same network or same rack, so that those other access nodes 17 can update their global health port vector. For instance, as illustrated in FIG. 14D, a fault signal frame may be constructed as a 64-byte Ethernet frame that includes a MAC Control field 296 and User Data field 298. In the example shown, the Opcode field 296 is set to a specific value (e.g., 0x1101 in the example shown), so that the receiving node is able to identify the frame 294 as a fault signal frame. Further, a portion of the User Data field 298 is used for a global port health vector. In the example illustrated in FIG. 14D, the global port health vector is 7 bits in length, and 0s are assigned to the remaining portion of the User Data field 298. FIG. 15A and FIG. 15B are conceptual diagrams illustrating an example system in which information about port health is used to affect the manner in which data is transferred from one access node to another access node, in accordance with one or more aspects of the present disclosure. FIG. 15A and FIG. 15B each include two logical racks 60. Each logical rack includes two access nodes 17 (access node 17A-1 and access node 17A-2 within logical rack 60A and access node 17B-1 and access node 17B-2 within logical rack 60B). Each of access nodes 17 is connected to two core switches 22 over switch fabric 14 (i.e., each access node includes two ports). In some examples, switch fabric 14 may be used for a logical tunnel that includes all paths between a source node (e.g., access node 17A-1) and a destination node (e.g., access node 17B-2) using FCP protocol. Valid and operable paths 15 within switch fabric 14 are represented by solid lines. Failed paths 15 within switch fabric 14 are represented by dotted lines (e.g., path 15-2 and path 15-8 are failed paths in FIG. 15B).

Data may be transferred between access nodes 17 using FCP protocol. For instance, in the example of FIG. 15A, access node 17A-1 receives one or more IP packets (from a source server device, not shown) which are to be delivered to a destination server device (also not shown) connected to access node 17B-2. Access node 17A-1 seeks permission to transfer data to access node 17B-2 by sending, over switch fabric 14, one or more FCP request packets to access node 17B-2, requesting that a specified number of bytes be transferred over switch fabric 14. In response, access node 17B-2 sends, over switch fabric 14, one or more FCP grant packets to access node 17A-1 after reserving egress bandwidth.

Access node 17A-1 may send data to access node 17B-2 by spraying FCP data packets over all possible paths 15 from access node 17A-1 to access node 17B-2. For instance, in the example of FIG. 15A, access node 17A-1 sprays FCP packets using path 15-1 and path 15-2 to core switch 22A and core switch 22D, respectively. Access node 17A-1 also sprays FCP packets using path 15-3 and path 15-4 (to core switch 22B and core switch 22C, respectively). To spray packets using paths 15-3 and 15-4, access node 17A-1 sprays FCP data packets to SX components within access node 17A-2, and those SX components within access node 17A-2 then spray packets over path 15-3 and path 15-4 (see, e.g., FIG. 8). Access node 17B-2 receives the FCP data packets from core switches 22 (and from DX components within access node 17B-1), and reorders the FCP data packets as needed.

In the example of FIG. 15B, and in accordance with one or more aspects of the present disclosure, logical racks 60 may determine global port health vectors 280 for source and destination racks. For instance, with reference to FIG. 15B, logical rack 60A generates global port health vector 280A, which may be similar to global port health vector 270 and/or global port health vector 280 described in connection with FIG. 14A and FIG. 14B, respectively. Since logical rack 60A has two access nodes 17, and each of access nodes 17 has two ports connecting to one of core switches 22, global port health vector 280A may be implemented as a matrix with two rows and two columns, or alternatively, is a four-bit quantity. In the example of FIG. 15B, logical rack 60A determines that path 15-2 is a failed path and/or has lost connectivity. Logical rack 60A stores information in global port health vector 280A reflecting that the port of access node 17A-1 connected to path 15-2 is not operable. In one example, logical rack 60A determines that the global port health vector 280A for logical rack 60A is the four-bit quantity {0111}, with the leftmost bit corresponding to switch 22D, and each bit to the right of the left most bit corresponds to switch 22C, switch 22B, and switch 22A, respectively. Accordingly, the four-bit global port health vector 280A quantity indicates that the path to switch 22D is a failed path, since the corresponding bit has a value of "0.".

Similarly, logical rack 60B generates a global port health vector 280B, also with two rows and two columns. Logical rack 60B determines that path 15-8 is a failed path and/or has lost connectivity. Logical rack 60B stores information in global port health vector 280B reflecting that the port of access node 17B-2 connected to path 15-8 is not operable. In one example, logical rack 60B determines that the global port health vector 280B for logical rack 60B determines that the global port health vector 280B for logical rack 60B is the four-bit quantity {1101}, again with the leftmost bit corresponding to the switch 22D and the rightmost bit corresponding to switch 22A. Global port health vector 280B therefore indicates that the path to switch 22B is a failed path, since the corresponding bit in global port health vector 280B has a value of "0."

In the example described, global port health vectors 280A and 280B are described as being generated by logical racks 60. Alternatively, or in addition, each access node 17 within logical rack 60A may generate and/or maintain a local representation of global port health vector 280A, and similarly, each access node 17 within logical rack 60B may maintain a local representation of global port health vector 280B.

Access node 17A-1 and access node 17B-2 may exchange FCP request and grant packets. For instance, in the example of FIG. 15B, access node 17A-1 seeks permission to transfer data to access node 17B-2 by sending, over switch fabric 14, one or more FCP request packets to access node 17B-2. The FCP request packets may specify the amount of data expected to be transferred to access node 17B-2, and may further include request rate information reflecting the failed path 15-2. In response, access node 17B-2 determines, based on the FCP request packets and further based on global port health vector 280B, whether to grant the request and how much egress bandwidth to reserve. For example, in the example of FIG. 15B, if all paths to access node 17B-2 were healthy, then access node 17B-2 may be able to accept traffic from access node 17A-1 at a high rate. However, since path 15-8 is failed, access node 17B-2 might not be able to accept traffic at such a high rate. Accordingly, access node 17B-2 may determine a lower egress bandwidth for data sent by access node 17A-1. Also, the request rate information included within the FCP request packets (i.e., reflecting that path 15-2 has failed) may be used to determine a lower egress rate. As described above, request rate information may be determined based on the proportion of healthy paths to the maximum number of paths.

Based on the described information, access node 17B-2 determines the egress rate and sends, over switch fabric 14, one or more FCP grant packets to access node 17A-1. Access node 17B-2 also reserves the appropriate egress bandwidth. The FCP grant packets include global port health vector 280B, or information derived from global port health vector 280B. The FCP grant packets may also include information about the reserved egress bandwidth.

Access node 17A-1 may limit, based on information received within the FCP grant packet, paths over which access node 17A-1 sprays FCP packets to access node 17B-2. For instance, continuing with the example of FIG. 15B, access node 17A-1 receives the FCP grant packets. Access node 17A-1 identifies, based on the information in global port health vector 280A and further based on the information derived from global port health vector 280B included within the FCP grant packets, available paths to access node 17B-2. For example, access node 17A-1 determines, based on its own global port health vector 280A, that path 15-2 is a failed path. Access node 17A-1 also determines, based on the information derived from global port health vector 280B included within the FCP grant packets, that path 15-8 is a failed path. In one example, access node 17A-1 (e.g., SX 32) may make such a determination by performing a logical AND operation of global port health vectors 280A and 280B. In the example described above, global port health vector 280A is {0111} and global port health vector 280B is {1101}, so the result of the AND operation is {0101}, indicating that switches 22B and 22D should be avoided when packets are sprayed in the example of FIG. 15B.

Accordingly, access node 17A-1 determines that when spraying packets to access node 17B-2, access node 17A-1 will not use either path 15-2 (to switch 22D) or path 15-3 (to switch 22B). Path 15-2 is avoided because global port health vector 270A has identified that path as failed. Path 15-3 is avoided because global port health vector 280B has identified path 15-8 as failed, and if any data is sent along path 15-3, that data will not be able reach access node 17B-2 over path 15-8. Accordingly, access node 17A-1 sprays FCP packets to access node 17B-2, but in doing so, access node 17A-1 avoids path 15-2 and path 15-3 (which avoids path 15-8). In the example described, access node 17A-1 identifies failed paths based on global port health vector 280A and further based on path information received in the FCP grant packets. In some examples, access node 17A-1 and/or logical rack 60A may, when receiving FCP grant packets, update global port health vector 280A based on the path information received in the FCP grant packets. For instance, logical rack 60A (or one or more access nodes 17 within rack 60A) may update global port health vector 280A to include information about any failed paths reflected in the FCP grant packets but not reflected in global port health vector 280A. In other examples, however, logical rack 60A might not update global port health vector 280A in this manner.

FIG. 16A and FIG. 16B are tables illustrating how each logical rack 60 may configure a global port health vector index for each stream in each logical rack, and use the mapping to compute weights for WECMP nexthop. In some examples, such as in the mapping illustrated in FIG. 16A, the mapping can be configured so that the format for both a local global port health vector and a remote global port health vector (e.g., global port health vectors 280A and 280B) may have essentially the same meaning. For instance, for access node 17A-1, two ports are illustrated in FIG. 15B (port "0" and port "1"), each serving as a spine link (e.g., connected to a switch 22). Port 0, corresponding to stream number 0, is connected to switch 22A (corresponding to spine 0) and therefore has a GPH Index of 0, as illustrated in the table of FIG. 16A. Port 1 of access node 17A-1, corresponding to stream number 1, is connected to switch 22D (corresponding to spine 3), and therefore has a GPH Index of 1 as illustrated in the table of FIG. 16A. Stream number 2 corresponds to an intra-rack link to access node 17A-2. Access node 17A-2 is connected to spine 1 and spine 2, so stream number 2 has GPH indices of 1 and 2, again as illustrated in FIG. 16A. A similar pattern is applied in the table of FIG. 16A to each of the other access nodes 17.

In the example described in connection with FIG. 15B, global port health vectors 280A and 280B were determined, and a logical AND operation was applied to these GPH vectors to generate the bit vector {0101}. Before applying this result to the nexthop structure, logical rack 60A (or one or more access nodes 17 within logical rack 60A) maps each global port health vector to an index to reverse the GPH index mapping described above. For instance, as illustrated in FIG. 16B, each index value in the GPH vector resulting from the AND operation represents one of the spines 0 through 3. Each is mapped to the index as shown in the table of FIG. 16B. After the applying the mapping illustrated by the table of FIG. 16B, the original bit vector {0101} is translated to {1001}. From this result, one or more of access nodes 17 within logical rack A may compute weights for WECMP nexthop, calculating the weights as follows:

index[0]+index[1]=>1    Member 0 weight:

index[2]+index[3]=>1    Member 1 weight:

In some examples, WECMP nexthop logic may use these weights for FCP spray purposes in place of programmed weights in the nexthop. For ECMP logic, the design will not, in some examples, send packets to stream 1, which is connected to spine 3 (switch 22D).

Although primarily described in terms of limiting use of failed data paths between a source network device and a destination network device, techniques in accordance with one or more aspects of the present disclosure may be used for diagnostic purposes. For example, such techniques might be used to determine whether forwarding tables are programmed correctly, and may be used to correct forwarding tables or systems and/or software that update forwarding tables. The information about failed paths as described herein can also be used pursuant to an adaptive routing procedure, where, for example, congested routes are flagged by a destination device so that the source device knows to avoid using the congested route.

Figure 17:
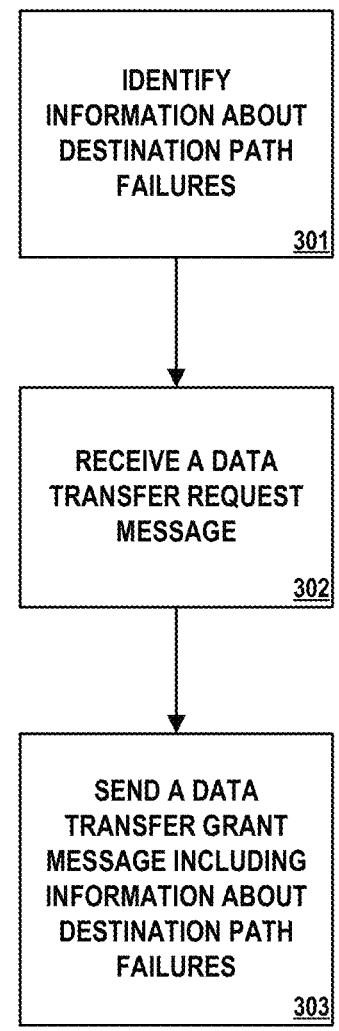
FIG. 17 is a flow diagram illustrating operations performed by an example destination access node in accordance with one or more aspects of the present disclosure.

FIG. 17 is a flow diagram illustrating operations performed by an example destination access node in accordance with one or more aspects of the present disclosure. FIG. 17 is described below within the context of access node 17B-2 of FIG. 15B. In other examples, operations described in FIG. 17 may be performed by one or more other components, modules, systems, or devices. Further, in other examples, operations described in connection with FIG. 17 may be merged, performed in a difference sequence, omitted, or may encompass additional operations not specifically illustrated or described.

Access node 17B-2 may identify information about destination path failures (301). For instance, in the example of FIG. 15B, access node 17B-2 determines that path 15-8 is a failed path and/or has lost connectivity. Access node 17B-2 or logical rack 60B stores information in global port health vector 280B reflecting that the port of access node 17B-2 connected to path 15-8 is not operable.

Access node 17B-2 may receive a data transfer request message (302). For instance, in the example of FIG. 15B, access node 17A-1 seeks permission to transfer data to access node 17B-2 by sending, over switch fabric 14, one or more request packets to access node 17B-2. Access node 17B-2 receives the request packets. In response, access node 17B-2 determines, based on the request packets and further based on global port health vector 280B, whether to grant the request and how much egress bandwidth to reserve. If all paths to access node 17B-2 are healthy, then access node 17B-2 may be able to accept traffic from access node 17A-1 at a high rate. If some paths are not healthy (e.g., path 15-8), access node 17B-2 might not be able to accept traffic at such a high rate. Accordingly, access node 17B-2 may determine a lower egress bandwidth for data sent by access node 17A-1.

Access node 17B-2 may send a data transfer grant message including information about destination path failures (303). For instance, in the example of FIG. 15B, access node 17B-2 determines the egress rate and sends, over switch fabric 14, one or more grant packets to access node 17A-1. Access node 17B-2 also reserves the appropriate egress bandwidth. The grant packets include global port health vector 280B, or information derived from global port health vector 280B.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in the referenced figures in order to avoid obscuring such concepts.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A network system comprising:
   a plurality of servers, including a source server and a destination server;
   a switch fabric comprising a plurality of core switches; and
   a plurality of access nodes configured to forward packets between the servers, wherein each of the access nodes is coupled to a subset of the servers and to a subset of the core switches, and wherein the plurality of access nodes includes a source access node coupled to the source server and a destination access node coupled to the destination server,
   wherein, when communicating a packet flow of packets between the source server and the destination server, the source access node is configured to spray the packets of the packet flow across a plurality of data paths to the destination access node, and
   wherein the destination access node is configured to:
      identify information about failures of one more of a plurality of destination paths, wherein each of the destination paths is a path between the destination access node and one of the core switches,
      receive a data transfer request message originating at the source access node, wherein the data transfer request message identifies an amount of data that the source access node has requested to transfer, and
      responsive to receiving the request message, send a data transfer grant message destined for the source access node, wherein the grant message includes a vector specifying port health information for each of the plurality of destination paths, wherein the vector identifies which of the plurality of destination paths are inoperable.

2. The network system of claim 1, wherein the source access node is further configured to:
   receive the data transfer grant message;
   identify, based on the vector specifying port health information included within the data transfer grant message, a set of failed data paths to the destination access node, and
   wherein to spray the packets of the packet flow, the source access node sprays the packets over a subset of all data paths to the destination access node, wherein the subset of all data paths excludes the set of failed data paths.

3. The network system of claim 1, wherein the source access node is further configured to:
   identify information about source path failures between the source access node and one of the core switches;
   receive the data transfer grant message;
   identify, based on the vector specifying port health information included within the data transfer grant message and further based on the information about source path failures, a set of failed data paths to the destination access node; and
   wherein to spray the packets of the packet flow, the source access node sprays packets over a subset of all data paths to the destination access node, wherein the subset of all data paths excludes the set of failed data paths.

4. The network system of claim 3, wherein the source access node is further configured to:
   determine a request rate limiter based on how many data paths from the source access node are not identified as failed data paths, and further based on a count of all data paths from the source access node.

5. The network system of claim 3, wherein the destination access node is further configured to:
determine a grant data rate limiter based on how many data paths from the destination access node are not identified as failed data paths, and further based on a count of all data paths from the destination access node.

6. The network system of claim 3, wherein the data transfer request message includes information about a request rate, and wherein the destination access node is further configured to:
reserve, based on the information about the request rate and further based on the vector specifying port health information, bandwidth for a data transfer from the source device.

7. The network system of claim 6, wherein the information about the request rate is based on information about source path failures.

8. The network system of claim 1, wherein the vector specifying port health information includes a multi-dimensional array having a first dimension corresponding to each of the plurality of access nodes, and a second dimension corresponding to network interface ports on each of the plurality of access nodes.

9. The network system of claim 1, wherein the destination path that are inoperable failures include at least one of:
a failure of at least one of the plurality access nodes, or
a failure of a link between at least one of the access nodes and at least one of the core switches.

10. The network system of claim 1, wherein the source access node is configured to:
identify information about source path failures between the source access node and the core switches; and
perform, based on the information about source path failures, diagnostic testing.

11. A method comprising:
spraying, by a source access node coupled to a source server, packets of a packet flow across a plurality of data paths to a destination access node coupled to a destination server, wherein the source access node and the destination access node are each included within a plurality of access nodes configured to forward packets between the source server and the destination server, and wherein each of the plurality of access nodes is coupled to a subset of a plurality of core switches;
identifying, by the destination access node, information about failures of one or more of a plurality of destination paths, wherein each of the destination paths is a path between the destination access node one of the plurality of core switches;
receiving, by the destination access node, a data transfer request message originating at the source access node, wherein the data transfer request message identifies an amount of data that the source access node has requested to transfer; and
responsive to receiving the request message, sending, by the destination access node, a data transfer grant message destined for the source access node, wherein the grant message includes a vector specifying port health information for each of the plurality of destination paths, wherein the vector identifies which of the plurality of destination paths are inoperable.

12. The method of claim 11, further comprising:
receiving, by the source access node, the data transfer grant message; and
identifying, by the source access node and based on the vector specifying port health information included within the data transfer grant message, a set of failed data paths to the destination access node, and
wherein spraying the packets of the packet flow includes spraying the packets over a subset of all data paths to the destination access node, wherein the subset of all data paths excludes the set of failed data paths.

13. The method of claim 11, further comprising:
identifying, by the source access node, information about source path failures between the source access node and the core switches;
receiving, by the source access node, the data transfer grant message; and
identifying, by the source access node and based on the vector specifying port health information included within the data transfer grant message and further based on the information about source path failures, a set of failed data paths to the destination access node, and
wherein spraying the packets of the packet flow includes spraying packets over a subset of all data paths to the destination access node, wherein the subset of all data paths excludes the set of failed data paths.

14. The method of claim 13, further comprising:
determining, by the source access node, a request rate limiter based on how many data paths from the source access node are not identified as failed data paths, and further based on a count of all data paths from the source access node.

15. The method of claim 13, further comprising:
determining, by the destination access node, a grant data rate limiter based on how many data paths from the destination access node are not identified as failed data paths, and further based on a count of all data paths from the destination access node.

16. The method of claim 13, wherein the data transfer request message includes information about a request rate, the method further comprising:
reserving, by the destination access node and based on the information about the request rate and further based on the vector specifying port health information, bandwidth for a data transfer from the source device.

17. The method of claim 16, wherein the information about the request rate is based on information about source path failures.

18. A system comprising:
a source access node coupled to a source server and coupled to a first plurality of core switches; and
a destination access node coupled to a destination server and coupled to a second plurality of core switches, wherein the second plurality of core switches includes at least one of the core switches in the first plurality of core switches, and wherein the destination access node is configured to:
identify information about failures of one or more of a plurality of destination paths, wherein each of the destination paths is a path between the destination access node and one of the second plurality of core switches,
receive a data transfer request message originating at the source access node, wherein the data transfer request message includes an amount of data that the source access node has requested to transfer, and
responsive to receiving the request message, send a data transfer grant message destined for the source access node, wherein the grant message identifies a vector specifying port health information for each of the plurality of destination paths, wherein the vector identifies which of the plurality of destination paths are inoperable.

19. The system of claim 18, wherein the source access node is configured to:
   receive the data transfer grant message;
   identify, based on the vector specifying port health information included within the data transfer grant message, a set of failed data paths to the destination access node; and
   spray packets over a subset of all data paths to the destination access node, wherein the subset of all data paths excludes the set of failed data paths.

20. The system of claim 18, wherein the source access node is configured to:
   identify information about source path failures between the source access node and the core switches;
   receive the data transfer grant message;
   identify, based on the vector specifying port health information included within the data transfer grant message and further based on the information about source path failures, a set of failed data paths to the destination access node; and
   spray packets over a subset of all data paths to the destination access node, wherein the subset of all data paths excludes the set of failed data paths.

* * * * *